(12) United States Patent
Strutton et al.

(10) Patent No.: US 10,339,541 B2
(45) Date of Patent: Jul. 2, 2019

(54) SYSTEMS AND METHODS FOR CREATING AND INSERTING APPLICATION MEDIA CONTENT INTO SOCIAL MEDIA SYSTEM DISPLAYS

(75) Inventors: Michael J. Strutton, Villa Rica, GA (US); Paulo Delgado, Atlanta, GA (US); Slain J. Wilde, Nashville, TN (US); Chad Estes, Decatur, GA (US); Benjamin Turner, Hampton, GA (US); John Schult, Buford, GA (US); John Maxwell, Athens, GA (US); Jason C. Reynolds, Covington, GA (US); Bryan S. Pocius, Woodside, NY (US); Horace Williams, II, Atlanta, GA (US); John B. Nolt, Atlanta, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 74 days.

(21) Appl. No.: 13/018,225

(22) Filed: Jan. 31, 2011
(Under 37 CFR 1.47)

(65) Prior Publication Data

US 2011/0213670 A1    Sep. 1, 2011

Related U.S. Application Data

(63) Continuation-in-part of application No. 12/859,675, filed on Aug. 19, 2010.
(Continued)

(51) Int. Cl.
*G06Q 30/02* (2012.01)
*H04L 12/58* (2006.01)

(52) U.S. Cl.
CPC ......... *G06Q 30/02* (2013.01); *G06Q 30/0241* (2013.01); *G06Q 30/0277* (2013.01); *H04L 51/066* (2013.01)

(58) Field of Classification Search
CPC .............. H04L 51/066; G06Q 30/0241; G06Q 30/0242; G06Q 30/0246; G06Q 30/0276; G06Q 30/0277
(Continued)

(56) References Cited

U.S. PATENT DOCUMENTS 5,749,081 A    5/1998  Whitels
6,363,392 B1   3/2002  Halstead et al.
(Continued)

FOREIGN PATENT DOCUMENTS

WO    WO 2012/058408    5/2012

OTHER PUBLICATIONS

How to Write Advertisements that Sell, author unknown, from System, the magazine of Business, dated 1912, downloaded from http://library.duke.edu/digitalcollections/eaa_Q0050/ on Feb. 21, 2015.*
(Continued)

*Primary Examiner* — Scott D Gartland
(74) *Attorney, Agent, or Firm* — Invoke

(57) ABSTRACT

Systems and methods for delivering application media content to multiple social media systems (SMSs) for display to SMS members. The method includes the steps of providing initial application media content to respective SMSs. Once a respective SMS member interacts with the initial content, a social relationship management system (SRMS) receives indication from an SMS of such interaction, and retrieves a unique application media file relating to application media content. The unique application media file is then applied to an application media container file that overcomes certain formatting protocols and requirements of the SMS and
(Continued)

*Exemplary Social Relationship Management System Environment* enables transmission and delivery of the application media content to the SMS. The application media content is then delivered to the SMS member on the SMS through the application media container file.

27 Claims, 35 Drawing Sheets

Related U.S. Application Data

(60) Provisional application No. 61/299,855, filed on Jan. 29, 2010, provisional application No. 61/235,277, filed on Aug. 19, 2009.

(58) Field of Classification Search
USPC ........... 705/14.4, 14.41, 14.45, 14.61, 14.66, 705/14.72, 14.73
See application file for complete search history.

(56) References Cited

U.S. PATENT DOCUMENTS

| | | |
|---|---|---|
| 6,636,861 B1 | 10/2003 | Stack |
| 7,599,935 B2 | 10/2009 | La et al. |
| 7,873,988 B1 | 1/2011 | Issa et al. |
| 7,974,983 B2 | 7/2011 | Goeldi |
| 8,214,272 B2 | 7/2012 | Glassman |
| 8,230,062 B2 | 7/2012 | Newton |
| 8,296,380 B1 | 10/2012 | Kelly et al. |
| 8,312,056 B1 | 11/2012 | Peng et al. |
| 8,402,057 B2 | 3/2013 | Shin |
| 8,447,852 B1 | 5/2013 | Penumaka et al. |
| 8,473,422 B2 | 6/2013 | Shen et al. |
| 8,510,164 B2 | 8/2013 | Newton et al. |
| 8,554,635 B2 | 10/2013 | England et al. |
| 8,606,792 B1 | 12/2013 | Jackson |
| 8,607,295 B2 | 12/2013 | Bhatia et al. |
| 8,620,718 B2 | 12/2013 | Varghese et al. |
| 8,631,473 B2 | 1/2014 | Bhatia et al. |
| 8,635,674 B2 | 1/2014 | Bhatia et al. |
| 8,650,587 B2 | 2/2014 | Bhatia et al. |
| 8,706,548 B1 | 4/2014 | Blume et al. |
| 8,843,610 B2 | 9/2014 | Newton |
| 8,856,056 B2 | 10/2014 | Di et al. |
| 8,856,165 B1 | 10/2014 | Cierniak |
| 9,117,058 B1 | 8/2015 | Ansari et al. |
| 2001/0040889 A1 | 11/2001 | Matsuzaki et al. |
| 2002/0032037 A1 | 3/2002 | Segawa |
| 2002/0069106 A1 | 6/2002 | Shopsowitz |
| 2003/0063072 A1 | 4/2003 | Brandenberg |
| 2003/0120735 A1* | 6/2003 | Capiel ................... H04L 29/06 709/206 |
| 2003/0187801 A1 | 10/2003 | Chase et al. |
| 2004/0003270 A1 | 1/2004 | Bourne et al. |
| 2004/0083133 A1 | 4/2004 | Nicholas et al. |
| 2004/0167926 A1 | 8/2004 | Waxman et al. |
| 2004/0168077 A1 | 8/2004 | Waxman et al. |
| 2004/0249815 A1 | 12/2004 | Lee |
| 2005/0018611 A1 | 1/2005 | Chan et al. |
| 2005/0044049 A1 | 2/2005 | Okayama et al. |
| 2005/0055341 A1 | 3/2005 | Haahr et al. |
| 2005/0091202 A1 | 4/2005 | Thomas |
| 2005/0097359 A1 | 5/2005 | Speare et al. |
| 2005/0119977 A1 | 6/2005 | Raciborski |
| 2006/0026655 A1 | 2/2006 | Perez |
| 2006/0074915 A1 | 4/2006 | Bhandarkar et al. |
| 2006/0085419 A1 | 4/2006 | Rosen |
| 2006/0143081 A1 | 6/2006 | Argaiz |
| 2006/0173788 A1 | 8/2006 | Nath et al. |
| 2006/0173957 A1 | 8/2006 | Robinson et al. |
| 2006/0229990 A1 | 10/2006 | Shimoji et al. |
| 2006/0248045 A1 | 11/2006 | Toledano et al. |
| 2006/0282328 A1 | 12/2006 | Gerace et al. |
| 2006/0294134 A1 | 12/2006 | Berkhim et al. |
| 2007/0043617 A1 | 2/2007 | Stein et al. |
| 2007/0067210 A1 | 3/2007 | Rishell et al. |
| 2007/0073937 A1* | 3/2007 | Feinberg ................ G06F 9/445 710/62 |
| 2007/0100779 A1 | 5/2007 | Levy et al. |
| 2007/0121843 A1 | 5/2007 | Atazky et al. |
| 2007/0124432 A1 | 5/2007 | Holtzman et al. |
| 2007/0150335 A1 | 6/2007 | Arnett et al. |
| 2007/0214097 A1 | 9/2007 | Parsons et al. |
| 2007/0250468 A1 | 10/2007 | Pieper |
| 2007/0256033 A1* | 11/2007 | Hiler .................. G06F 17/3089 715/860 |
| 2007/0297641 A1 | 12/2007 | Criddle et al. |
| 2008/0073936 A1 | 3/2008 | Jeng |
| 2008/0086439 A1 | 4/2008 | Brough et al. |
| 2008/0097923 A1 | 4/2008 | Kim et al. |
| 2008/0104679 A1* | 5/2008 | Craig ................... 726/4 |
| 2008/0109245 A1 | 5/2008 | Gupta |
| 2008/0109306 A1* | 5/2008 | Maigret et al. ............ 705/14 |
| 2008/0114755 A1 | 5/2008 | Wolters et al. |
| 2008/0116255 A1 | 5/2008 | Hilbert et al. |
| 2008/0168079 A1 | 7/2008 | Smith et al. |
| 2008/0184135 A1 | 7/2008 | Washburn et al. |
| 2008/0184138 A1 | 7/2008 | Krzanowski et al. |
| 2008/0189254 A1 | 8/2008 | Cancel et al. |
| 2008/0208911 A1 | 8/2008 | Lee |
| 2008/0222295 A1 | 9/2008 | Robinson et al. |
| 2008/0248815 A1 | 10/2008 | Busch |
| 2008/0294624 A1 | 11/2008 | Kanigsberg et al. |
| 2008/0313000 A1 | 12/2008 | Degeratu et al. |
| 2008/0319918 A1 | 12/2008 | Forlai |
| 2009/0006192 A1 | 1/2009 | Martinez et al. |
| 2009/0006371 A1 | 1/2009 | Denoue et al. |
| 2009/0006388 A1 | 1/2009 | Ives et al. |
| 2009/0012760 A1 | 1/2009 | Schunemann |
| 2009/0017804 A1 | 1/2009 | Sarukkai et al. |
| 2009/0037412 A1 | 2/2009 | Bard et al. |
| 2009/0048904 A1 | 2/2009 | Newton et al. |
| 2009/0049070 A1 | 2/2009 | Steinberg |
| 2009/0063284 A1 | 3/2009 | Turpin et al. |
| 2009/0070412 A1 | 3/2009 | D'Angelo et al. |
| 2009/0112833 A1 | 4/2009 | Marlow |
| 2009/0112841 A1 | 4/2009 | Devarakonda et al. |
| 2009/0119173 A1 | 5/2009 | Parsons et al. |
| 2009/0125420 A1 | 5/2009 | Zhang |
| 2009/0144392 A1 | 6/2009 | Wang et al. |
| 2009/0157511 A1 | 6/2009 | Spinnell et al. |
| 2009/0164904 A1 | 6/2009 | Horowitz et al. |
| 2009/0172773 A1 | 7/2009 | Moore |
| 2009/0198487 A1 | 8/2009 | Wong et al. |
| 2009/0215469 A1 | 8/2009 | Fisher |
| 2009/0216741 A1 | 8/2009 | Thrall et al. |
| 2009/0222348 A1 | 9/2009 | Ransom et al. |
| 2009/0222551 A1 | 9/2009 | Neely |
| 2009/0254529 A1 | 10/2009 | Goldentouch |
| 2009/0259550 A1 | 10/2009 | Mihelich |
| 2009/0265221 A1 | 10/2009 | Woods et al. |
| 2009/0319518 A1 | 12/2009 | Koudas et al. |
| 2010/0063961 A1 | 3/2010 | Guiheneuf et al. |
| 2010/0070448 A1 | 3/2010 | Omoigui |
| 2010/0070517 A1 | 3/2010 | Ghosh et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0121857 A1 | 5/2010 | Elmore et al. |
| 2010/0125563 A1 | 5/2010 | Nair et al. |
| 2010/0146144 A1 | 6/2010 | Audenaert et al. |
| 2010/0159965 A1* | 6/2010 | Pascal ................ H04L 12/5835 455/466 |
| 2010/0218128 A1 | 8/2010 | Bonat et al. |
| 2010/0228617 A1 | 9/2010 | Ransom et al. |
| 2010/0250330 A1 | 9/2010 | Lam et al. |
| 2010/0280860 A1 | 11/2010 | Iskold |
| 2010/0306049 A1 | 12/2010 | Kakade et al. |
| 2010/0312769 A1 | 12/2010 | Bailey et al. |
| 2010/0318613 A1 | 12/2010 | Souza et al. |
| 2010/0332330 A1 | 12/2010 | Goel et al. |
| 2010/0332962 A1 | 12/2010 | Hammer et al. |
| 2011/0004692 A1 | 1/2011 | Occhino et al. |

(56) References Cited

U.S. PATENT DOCUMENTS

| | | |
|---|---|---|
| 2011/0047479 A1 | 2/2011 | Ghosh |
| 2011/0055017 A1 | 3/2011 | Solomon et al. |
| 2011/0066844 A1 | 3/2011 | O'Toole, Jr. |
| 2011/0078188 A1 | 3/2011 | Li et al. |
| 2011/0082858 A1 | 4/2011 | Yu et al. |
| 2011/0099070 A1 | 4/2011 | Eliason |
| 2011/0112899 A1 | 5/2011 | Strutton et al. |
| 2011/0125550 A1 | 5/2011 | Erhart et al. |
| 2011/0131504 A1 | 6/2011 | Shustef |
| 2011/0145064 A1 | 6/2011 | Anderson et al. |
| 2011/0153412 A1 | 6/2011 | Novikov et al. |
| 2011/0179061 A1 | 7/2011 | Chilakamarri et al. |
| 2011/0181906 A1 | 7/2011 | Grueneberg et al. |
| 2011/0191417 A1 | 8/2011 | Rathod |
| 2011/0202606 A1 | 8/2011 | Agarwal et al. |
| 2011/0231478 A1 | 9/2011 | Wheeler et al. |
| 2011/0258560 A1 | 10/2011 | Mercuri et al. |
| 2011/0264736 A1 | 10/2011 | Zuckerberg et al. |
| 2011/0265011 A1 | 10/2011 | Taylor et al. |
| 2011/0270649 A1 | 11/2011 | Kerho |
| 2011/0282943 A1 | 11/2011 | Anderson et al. |
| 2011/0288917 A1 | 11/2011 | Wanek et al. |
| 2011/0307312 A1 | 12/2011 | Goeldi |
| 2011/0307791 A1 | 12/2011 | Pierre et al. |
| 2011/0313996 A1 | 12/2011 | Strauss et al. |
| 2011/0320542 A1 | 12/2011 | Bendel et al. |
| 2012/0036006 A1 | 2/2012 | Mauro |
| 2012/0042020 A1 | 2/2012 | Kolari et al. |
| 2012/0047011 A1 | 2/2012 | Rippetoe et al. |
| 2012/0054120 A1 | 3/2012 | Hjelm et al. |
| 2012/0109751 A1 | 5/2012 | Binenstock et al. |
| 2012/0109777 A1 | 5/2012 | Lipsitz et al. |
| 2012/0110464 A1 | 5/2012 | Chen et al. |
| 2012/0150989 A1 | 6/2012 | Portnoy et al. |
| 2012/0158476 A1 | 6/2012 | Neystadt et al. |
| 2012/0158494 A1 | 6/2012 | Reis et al. |
| 2012/0167137 A1 | 6/2012 | Wong et al. |
| 2012/0185544 A1 | 7/2012 | Chang et al. |
| 2012/0185764 A1 | 7/2012 | Ball et al. |
| 2012/0226713 A1 | 9/2012 | Park et al. |
| 2012/0233258 A1 | 9/2012 | Vijayaraghavan et al. |
| 2012/0253885 A1 | 10/2012 | Newton |
| 2012/0290431 A1 | 11/2012 | Tedjamulia et al. |
| 2012/0290432 A1 | 11/2012 | Tedjamulia et al. |
| 2013/0014137 A1 | 1/2013 | Bhatia et al. |
| 2013/0014222 A1 | 1/2013 | Bhatia et al. |
| 2013/0014223 A1 | 1/2013 | Bhatia et al. |
| 2013/0035982 A1 | 2/2013 | Zhang et al. |
| 2013/0060864 A1 | 3/2013 | Ehms et al. |
| 2013/0073378 A1 | 3/2013 | Naveh et al. |
| 2013/0080264 A1 | 3/2013 | Umeda |
| 2013/0132437 A1 | 5/2013 | Park et al. |
| 2013/0166379 A1 | 6/2013 | Ehindero et al. |
| 2013/0179217 A1 | 7/2013 | Newton |
| 2013/0291060 A1 | 10/2013 | Moore |
| 2013/0325733 A1 | 12/2013 | Wu et al. |
| 2014/0074551 A1 | 3/2014 | Setayesh et al. |
| 2014/0074844 A1 | 3/2014 | Subramanian et al. |
| 2014/0074856 A1 | 3/2014 | Rao |
| 2014/0082070 A1 | 3/2014 | Chakraborty et al. |
| 2014/0114959 A1 | 4/2014 | Sankhla et al. |
| 2014/0173641 A1 | 6/2014 | Bhatia et al. |
| 2014/0173643 A1 | 6/2014 | Bhatia et al. |
| 2014/0180788 A1 | 6/2014 | George et al. |
| 2014/0365275 A1 | 12/2014 | Newton |
| 2016/0063442 A1 | 3/2016 | Bennett et al. |

OTHER PUBLICATIONS

History of OOH, downloaded from http://www.oaaa.org/OutofHomeAdvertising/HistoryofOOH.aspx# on Mar. 13, 2015.*

HTML, from Wikipedia, downloaded from https://en.wikipedia.org/w/index.php?title=HTML&oldid=410415700 on May 10, 2016, and dated Jan. 27, 2011.*

Sullivan, Danny, Analysis: Which URL Shortening Service Should You Use?, dated Apr. 4, 2009, downloaded Jul. 4, 2016 from https://web.archive.org/web/20090405074950/http://searchengineland.com/analysis-which-url-shortening-service-should-you-use-17204.*

20 Really Short URL Shorteners, by Webmasterish, dated Mar. 4, 2009, downloaded from http://singlefunction.com/10-really-short-url-shorteners/ on Jul. 4, 2016.*

Purdy, Kevin, Make Your Own URL Shortening Service, dated Aug. 14, 2009, downloaded from http://lifehacker.com/5335216/make-your-own-url-shortening-service on Jul. 4, 2016.*

ShortURL.com screenshot, indicating "Free Short URLs since 1999", downloaded from http://www.shorturl.com/ on Jul. 4, 2016.*

Final Office Action for U.S. Appl. No. 12/880,882, dated Jan. 13, 2014.

Non-Final Office Action for U.S. Appl. No. 12/563,529 dated Mar. 25, 2014.

Final Office Action dated May 22, 2014 for U.S. Appl. No. 13/105,713.

Towards a New Multimedia Paradigm, Hoogeveen, ED-Media 95 Proceedings. 2005.

Non-Final Office Action for U.S. Appl. No. 12/563,529, dated Jul. 22, 2013.

Non-Final Office Action for U.S. Appl. No. 12/563,529, dated Sep. 8, 2011.

Final Office Action for U.S. Appl. No. 12/563,529, dated Nov. 7, 2013.

Final Office Action for U.S. Appl. No. 12/563,529, dated Apr. 6, 2012.

Non-Final Office Action for U.S. Appl. No. 12/880,882, dated May 23, 2013.

Non-Final Office Action for U.S. Appl. No. 12/859,675, dated Aug. 1, 2012.

Final Office Action for U.S. Appl. No. 12/859,675, dated Dec. 31, 2012.

Christina Warren, How To: Measure Social Media ROI, Oct. 27, 2009, pp. 4-24. http://mashable.com/2009/10/27/social-media-roi/.

Justin Perkins, Is It Worth It? An ROI Calculator for Social Network Campaigns, Jul. 24, 2007, pp. 1-17, http://frogloop.com/social-network-calculator.

Non-Final Office Action for U.S. Appl. No. 13/105,713, dated Aug. 2, 2013.

Non-Final Office Action for U.S. Appl. No. 13/105,713, dated Nov. 8, 2012.

Final Office Action for U.S. Appl. No. 13/105,713, dated Apr. 11, 2013.

Non-Final Office Action dated Dec. 2, 2013 for U.S. Appl. No. 13/105,713.

Non-Final Office Action dated Dec. 5, 2014 for U.S. Appl. No. 13/267,772.

Non-Final Office Action dated Dec. 18, 2014 for U.S. Appl. No. 12/859,675.

Notice of Allowance and Fee(s) Due dated Jan. 22, 2015 for U.S. Appl. No. 12/880,882.

Corrected Notice of Allowance and Fee(s) Due dated Feb. 24, 2014 for U.S. Appl. No. 12/880,882.

Non-final Office Action dated Jul. 30, 2014 for U.S. Appl. No. 12/880,882.

Final Office Action dated Sep. 9, 2014 for U.S. Appl. No. 12/563,529.

Non-final Office Action dated Apr. 8, 2015 for U.S. Appl. No. 13/195,677.

Damien, "The How to Guide to Add Facebook Social Plubins to Your WordPress Site", Apr. 28, 2010, from maketecheasier (downloaded Mar. 28, 2015 from http://www.maketecheasier.com/howto-guide-to-add-facebook-social-plugin-to-your-site/).

Non-Final Office Action dated Apr. 14, 2015 for U.S. Appl. No. 12/563,529.

Advisory Action dated Dec. 21, 2015 for related U.S. Appl. No. 13/195,677.

Non-final Office Action dated Feb. 1, 2016 for related U.S. Appl. No. 12/859,675.

Adverstising agency, from Wikipedia, downloaded from https://en.wikipedia.org/wiki/Adverstising_agency on Jan. 21, 2016.

(56) References Cited

OTHER PUBLICATIONS

Butler, Christopher, A Practical Guide to Social Media, dated May 28, 2009 and published by Newfangled.com, downloaded from https://www.newfangled.com/a-practical-guide-to-social-media/ on Jan. 26, 2016 (hereinafter Butler).
Short Message Service, from Wikipedia, downloaded from https://en.wikipedia.org/wiki/Short_Message_Service_on Jan. 25, 2016.
Non-final Office Action dated Mar. 10, 2016 for related U.S. Appl. No. 13/267,772.
Final Office Action dated Oct. 5, 2015 for related U.S. Appl. No. 13/195,677.
Final Office Action dated Jun. 24, 2015 for U.S. Appl. No. 12/859,675.
Non-final Office Action dated Jun. 17, 2015 for U.S. Appl. No. 13/105,713.
Final Office Action dated Jul. 1, 2015 for U.S. Appl. No. 13/267,772.
Notice of Allowance and Fee(s) Due dated Aug. 5, 2015 for U.S. Appl. No. 12/563,529.
Non-final Office Action dated May 3, 2016 for related U.S. Appl. No. 13/195,677.
Final Office Action dated May 20, 2016 for related U.S. Appl. No. 13/105,713.
Final Office Action dated Jul. 8, 2016 for related U.S. Appl. No. 12/859,675.
20 Really Short URL Shorteners, by Webmasterish, at SingleFunction.com, downloaded from http://singlefunction.com/20-reallyshort-url-shorteners/, on Jul. 4, 2016 and dated Mar. 4, 2009.
Sullivan, Danny, URL Shorteners: Which Shortening Service Should You Use?, at SearchEngineland.com, downloaded from https://web.archive.org/web/20090405074950/http:1/searchengineland.com/analysis-which-url-shortening-service-should-youuse-17204 on Jul. 4, 2016, dated Apr. 4, 2009, Archived on Apr. 5, 2009.
Purdy, Kevin, Make Your Own URL Shortening Service, at lifehacker.com, downloaded from http:1/lifehacker.com/5335216/make-your-own-url-shortening-service, on Jul. 4, 2016 and dated Aug. 14, 2009.
ShortURL.com, author unknown, downloaded from http://www.shorturl.com on Jul. 4, 2016 (hereinafter ShortURL screenshot).
Ningthoujam, Palin, URL Toolbox: 90+ URL Shortening Services, from Mashable, downloaded from http://mashable.com/2008/02/01_/uri-shortening-services/ on Jul. 5, 2016, dated Jan. 2008.
Meta refresh, from Wikipedia, dated Jan. 16, 2006, downloaded Jul. 5, 2016 from https://en.wikipedia.org/w/index.php?title=Meta_refresh&oldid=35429258.
Meta refresh, from Wikipedia, dated Jun. 4, 2009, downloaded Jul. 5, 2016 from https://em.wikipedia.org/w/index.php?title=Meta_refresh&oldid=294423886.
Final Office Action dated Sep. 19, 2016 for related U.S. Appl. No. 13/267,772.
Final Office Action dated Oct. 26, 2016 for related U.S. Appl. No. 13/195,677.
McNay; Enterprise content management: an overview; Published in: Professional Communication Conference, 2002. IPCC 2002. Proceedings. IEEE International; Date of Conference: 2002; pp. 396-402; IEEE Xplore.
Koskinen; Social software for industrial interaction; Published in: Proceeding OZCHI '06 Proceedings of the 18th Australia conference on Computer-Human Interaction: Design: Activities, Artefacts and Environments; 2006; pp. 381-384; ACM Digital Library.
Galindo, Luis Angel, et al., The Social Network Behind Telecom Networks, downloaded from http://www.w3.org/2008/09/msnws/papers/telefonica-business-operator.pdf on Aug. 30, 2018 (Year: 2009).

\* cited by examiner

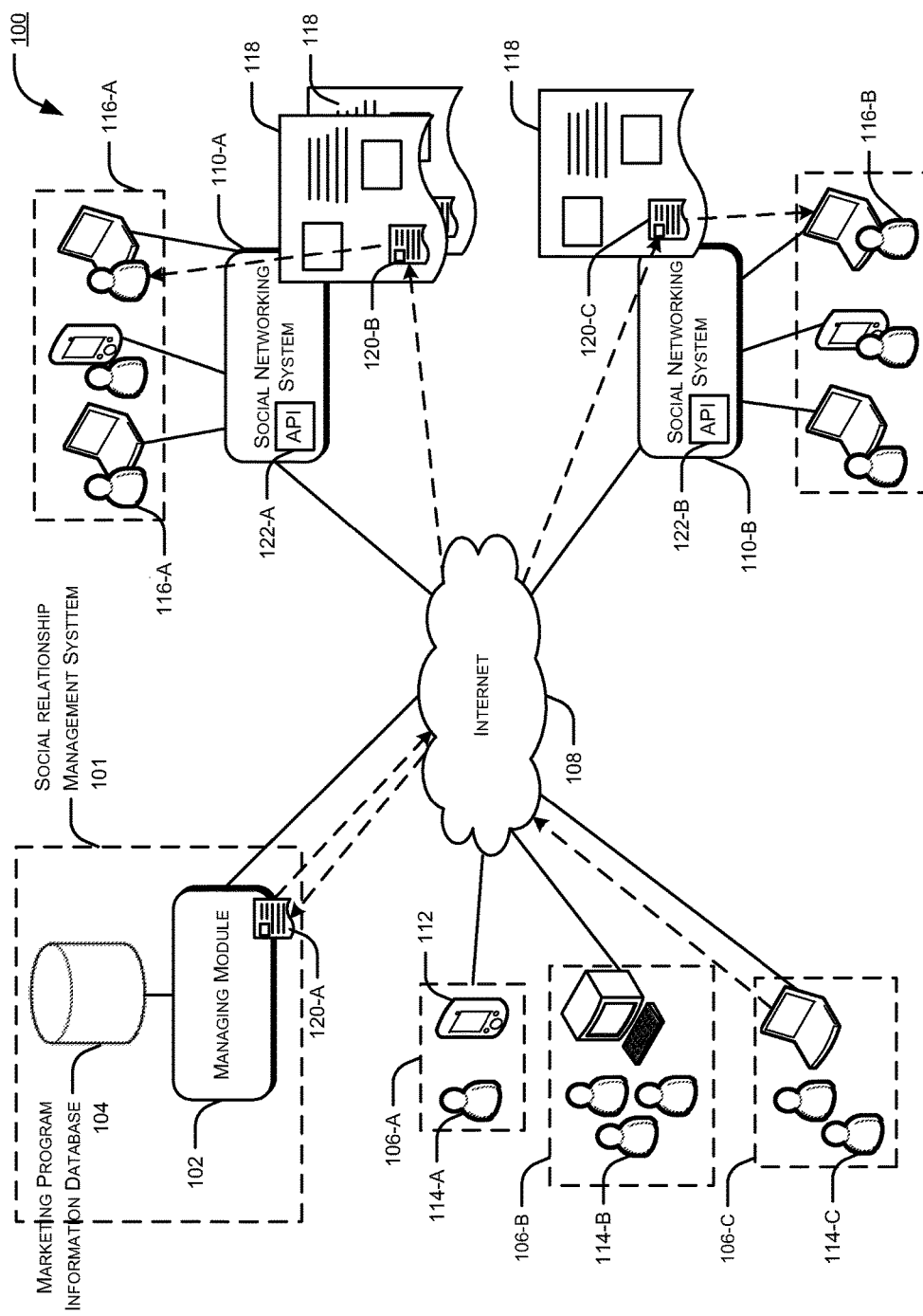
FIG. 1 - Exemplary Social Relationship Management System Environment

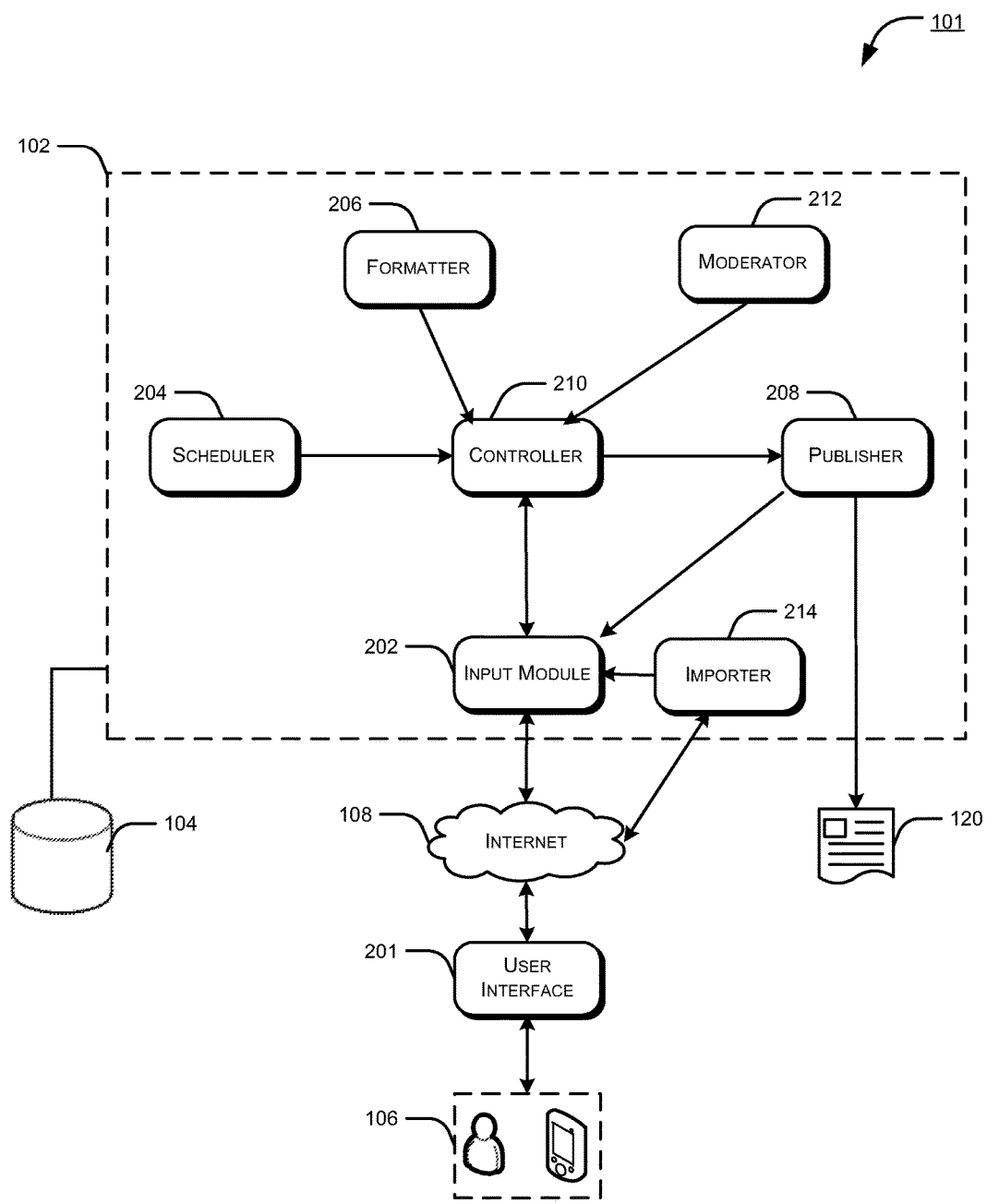
FIG. 2 – *Exemplary Social Relationship Management System Architecture*

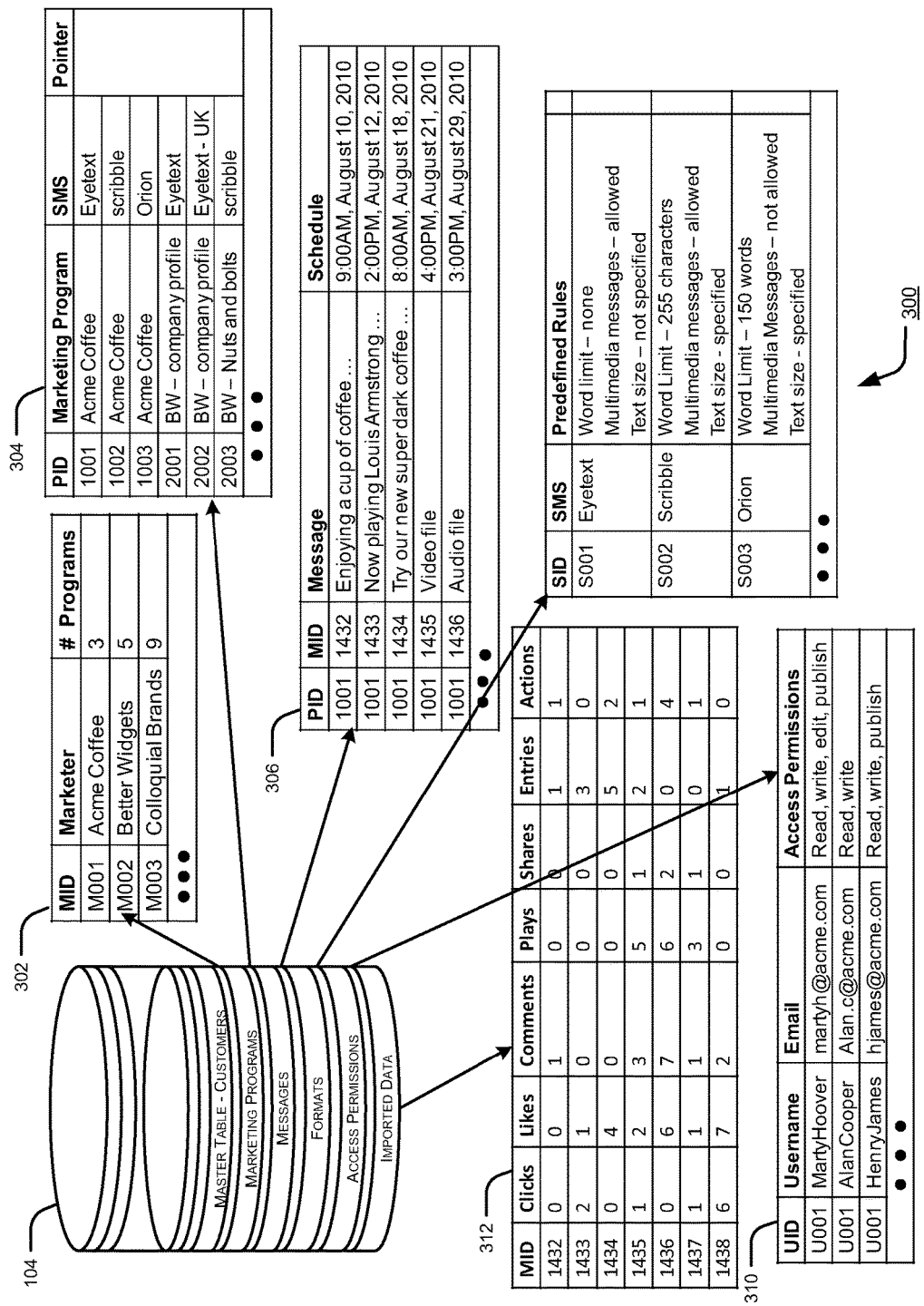
FIG. 3 – Exemplary Marketing Program Information Database Schema

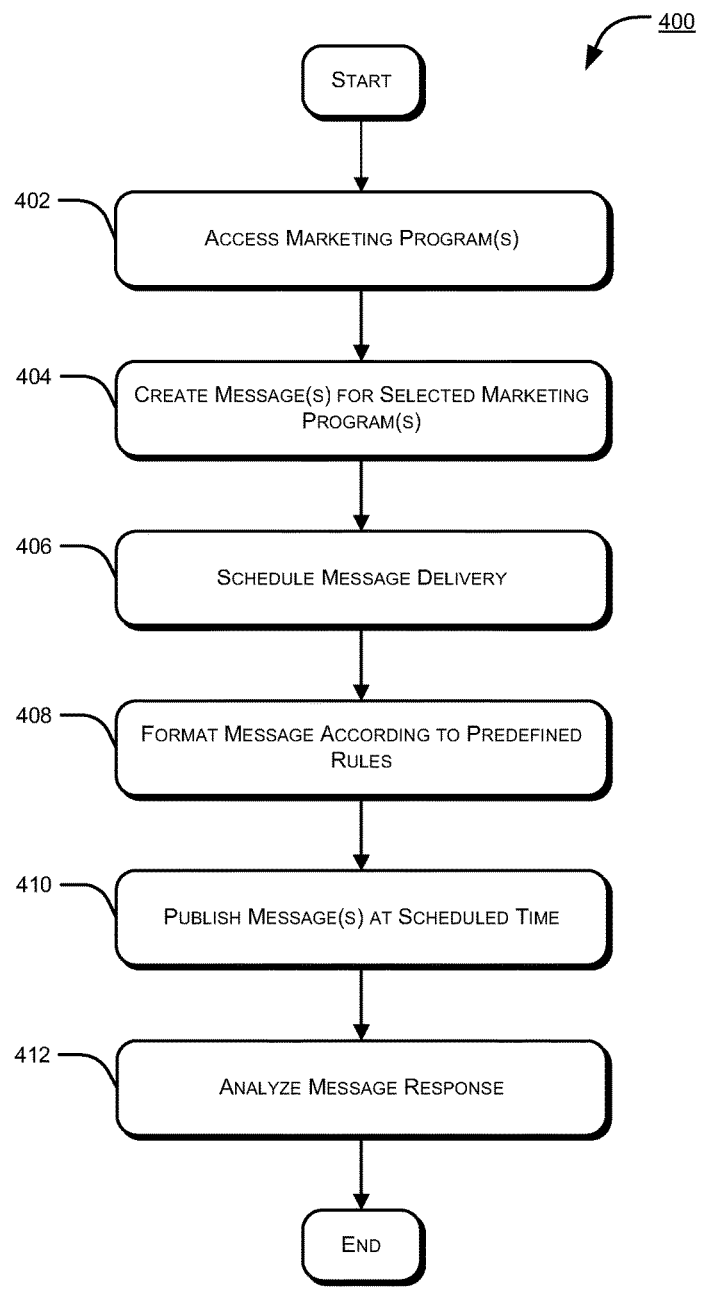
FIG. 4 – Exemplary Marketing Program Management Process

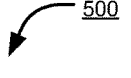
FIG. 5 – Exemplary Sign in Screen
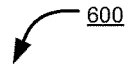
FIG. 6 – Exemplary Marketing Program Addition Screen

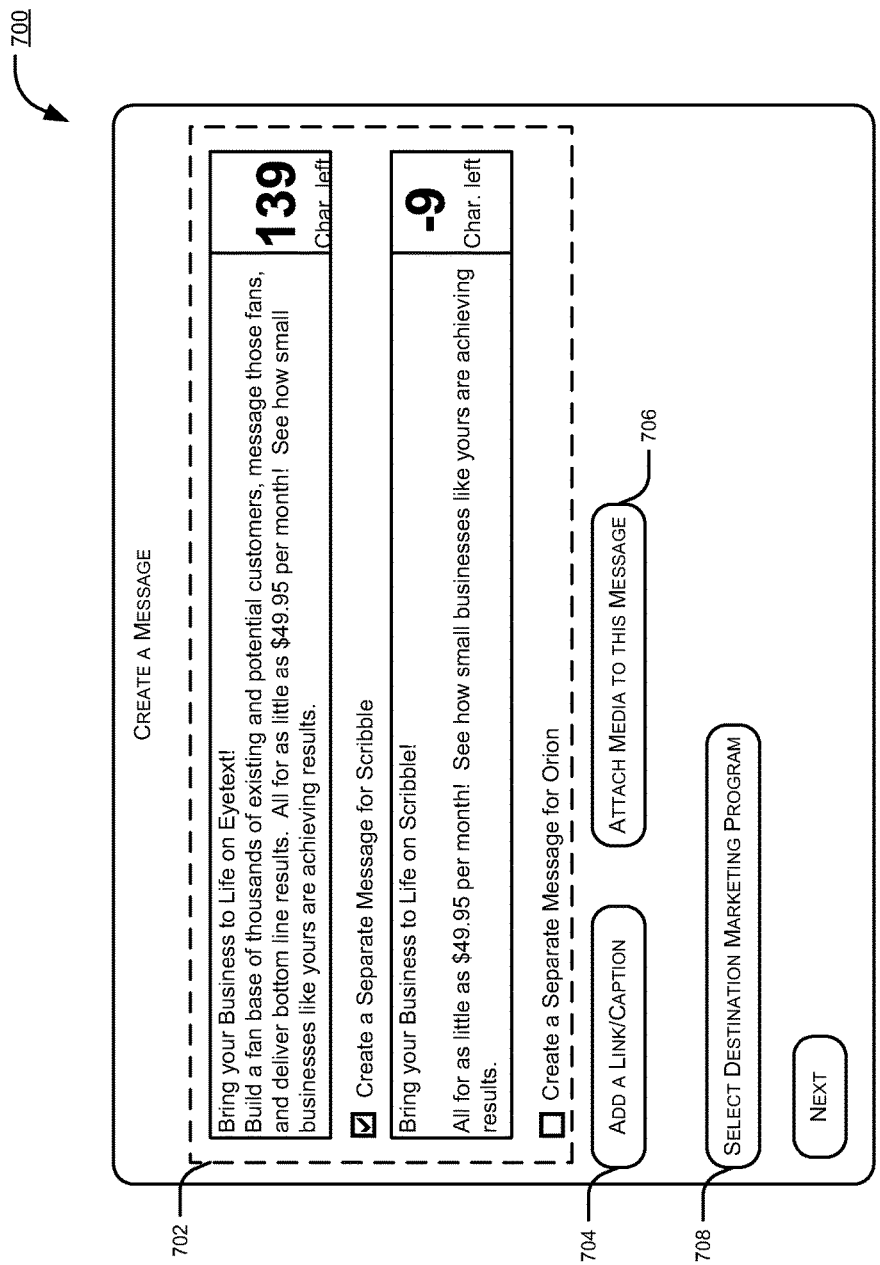
FIG. 7 – Exemplary Message Creation Screen

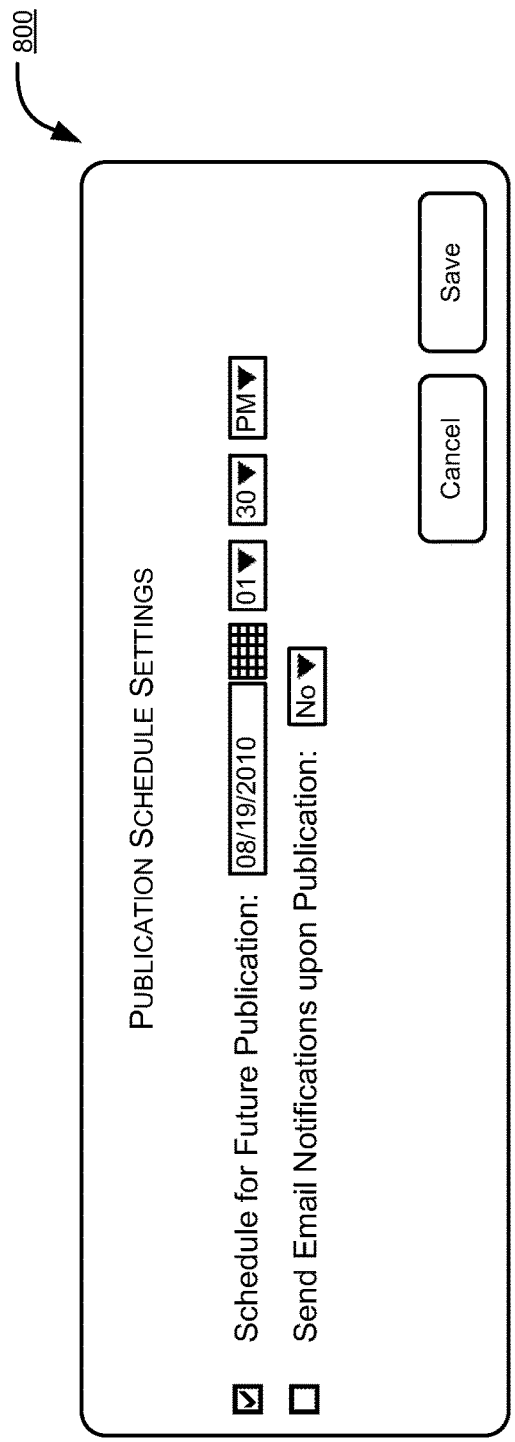
FIG. 8 – Exemplary Message Scheduling Screen

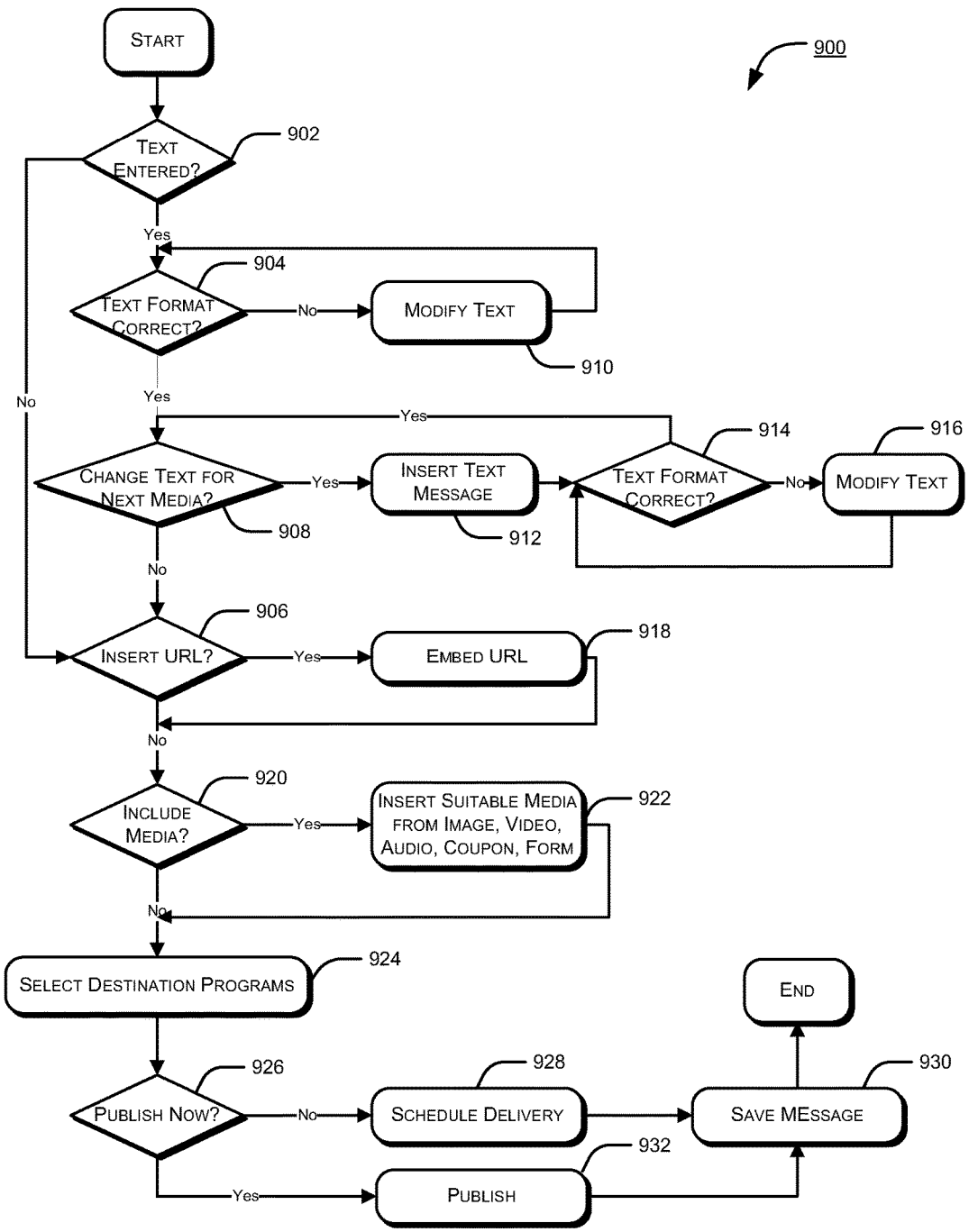
FIG. 9 – Exemplary Message Creation Process

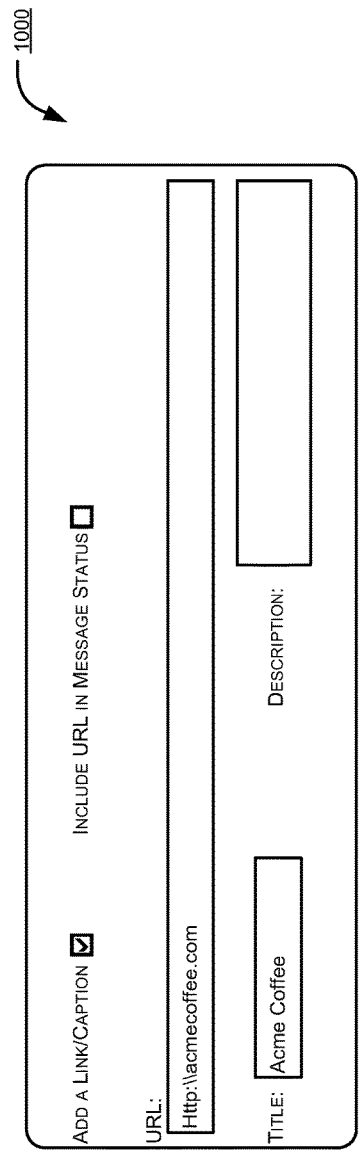
FIG. 10 – Exemplary Caption Screen
FIG. 11 – Exemplary Media Screen

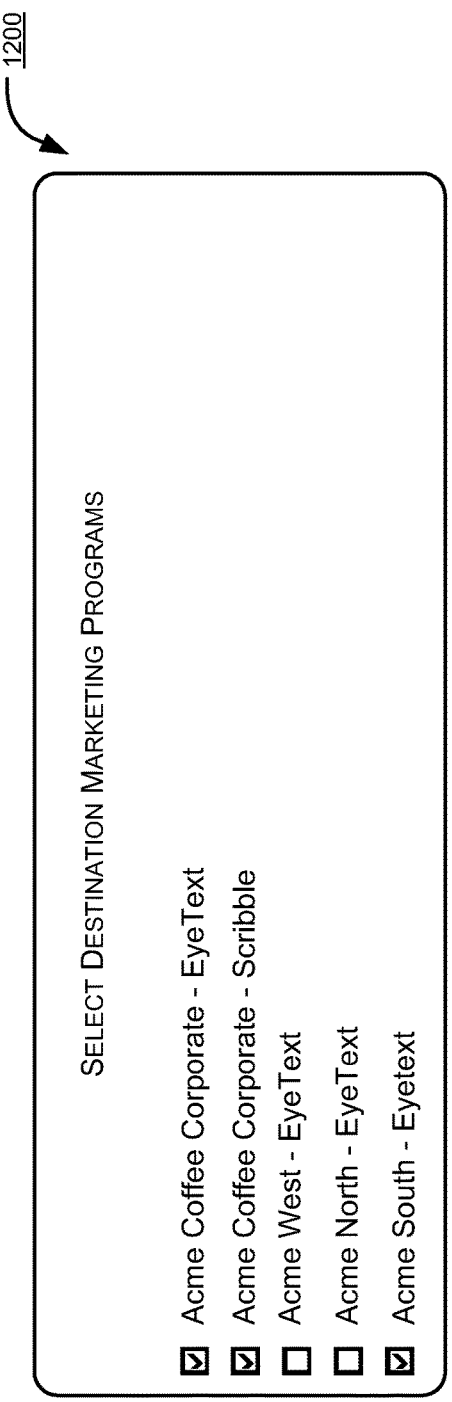
FIG. 12 – Exemplary Destination Marketing Program Selection Screen

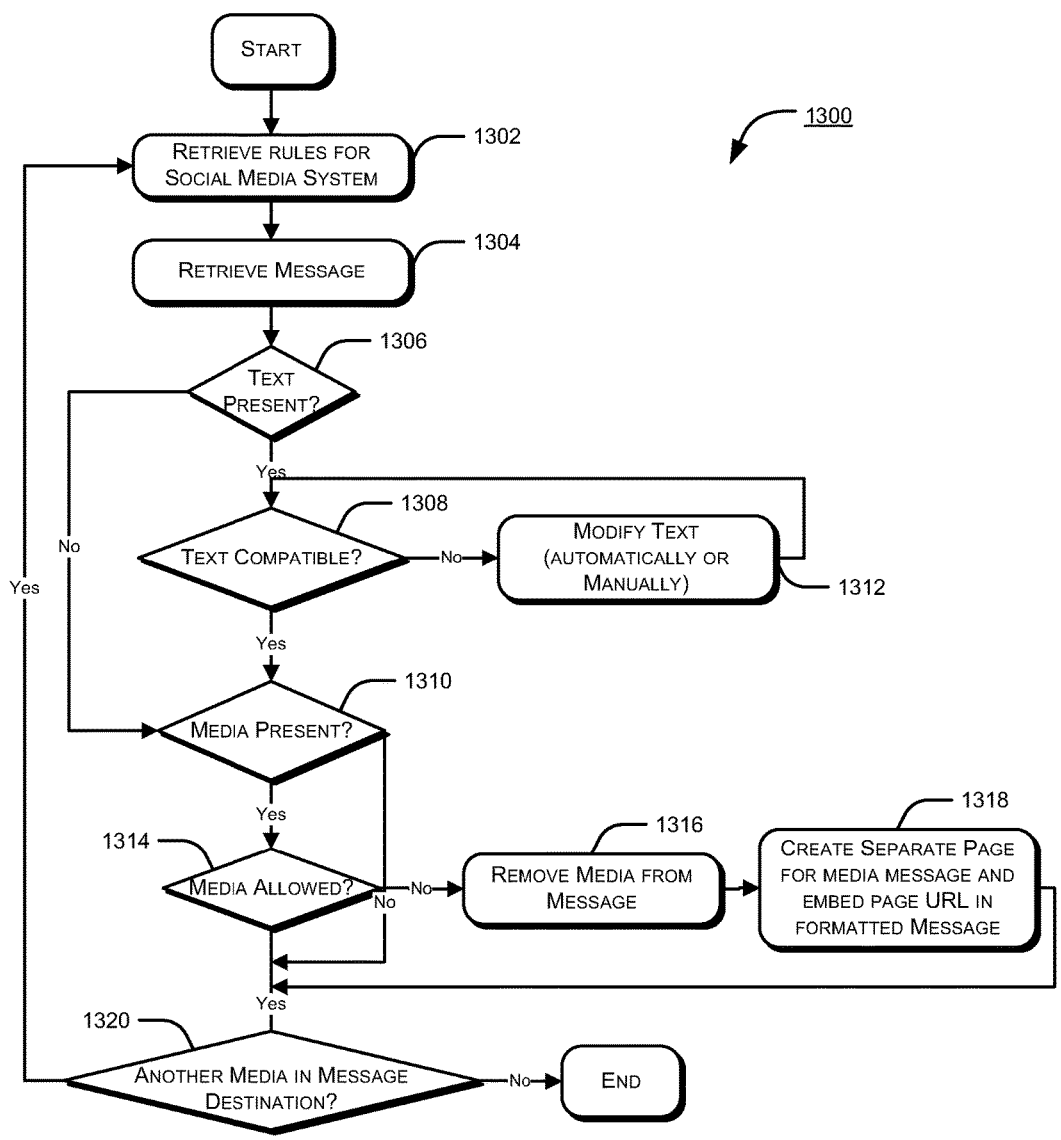
FIG. 13 – Exemplary Message Customization Flow

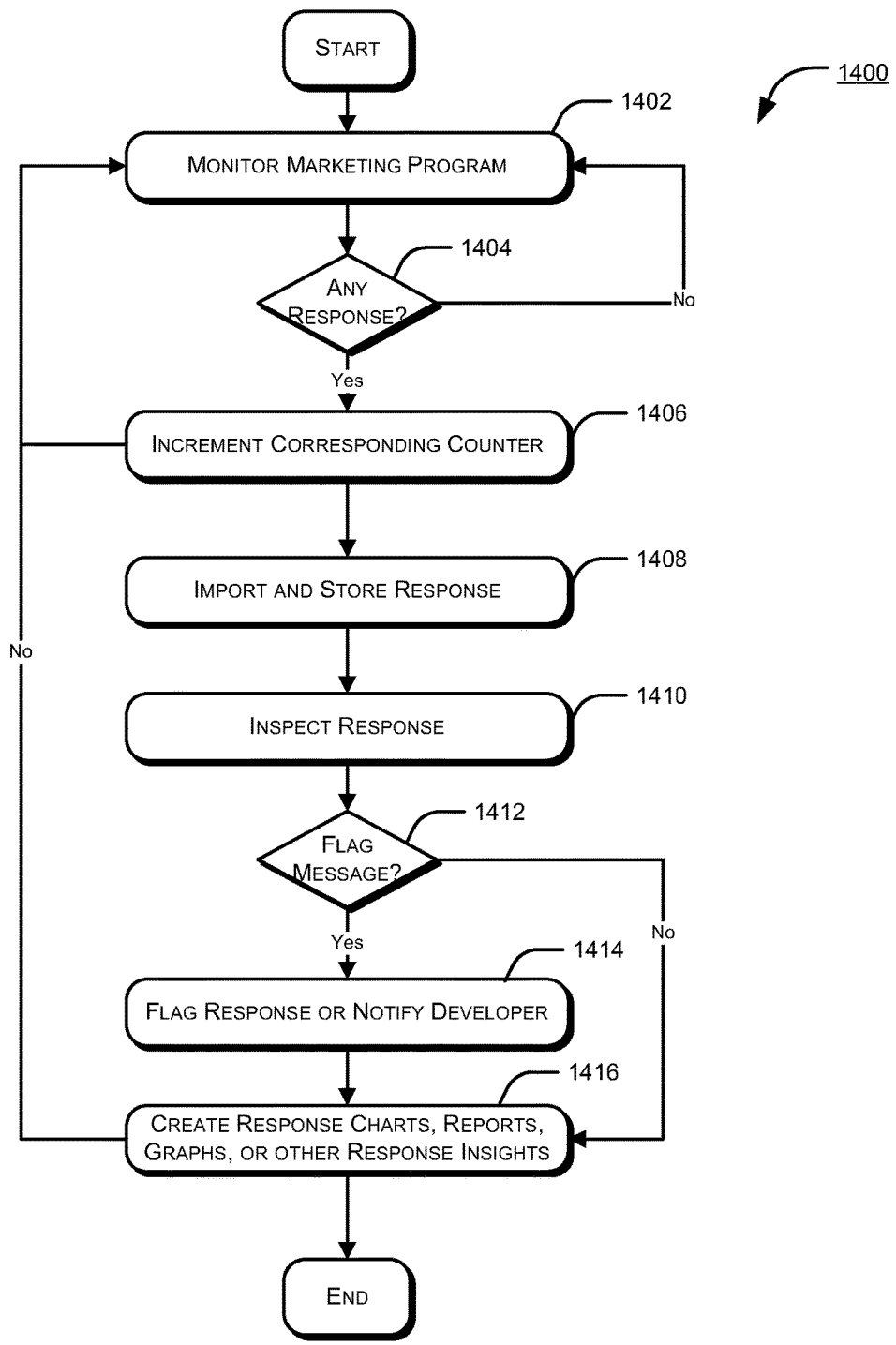
FIG. 14 – Exemplary Insight Analysis Flow

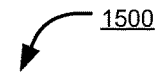
Word Lists
| S.N. | Name | Description | Words |
|---|---|---|---|
| 1 | Acme Coffee | Mention of company name | 5 |
| 2 | Competitive Keywords | Mention of competitors | 20 |
| 3 | Abusive Keywords | Offensive words | 100 |
| 4 | Service Keywords | Service related words | 20 |
| 5 | Product Keywords | These are products discuss | 30 |
| 6 | Positive words and Phrases | Flag for positive feedback | 50 |
Create a New word list
FIG. 15 – Exemplary Word List Screen

ACME Coffee

| Unpublished | Published | Moderation | | Create a new Post | Administration |

Marketing Program: [Acme Coffee - North ▼]

[Update Word List]

| Yours | Fans | Flagged | Hidden | Removed |

Current EyeText Messages

| | When | Message | Comments | Likes | Flags |
|---|---|---|---|---|---|
| 1 | 1 months | I really like astrocoffee better | 6 | 0 | 1 |
| 2 | 2 months | This coffee is the *#@* | 3 | 0 | 1 |
| 3 | 6 months | I'm digging the coffee, love that *#@* | 1 | 0 | 2 |
| 4 | 8 months | The bagels here are #*@! | 1 | 0 | 1 |
| 5 | 8 months | Via Jorge http://google.com | 2 | 1 | 1 |
| 6 | 10 months | http:/foo.com | 0 | 0 | 1 |
| 7 | 10 months | #!*@ | 1 | 0 | 1 |

FIG. 16 – Exemplary Moderation Screen

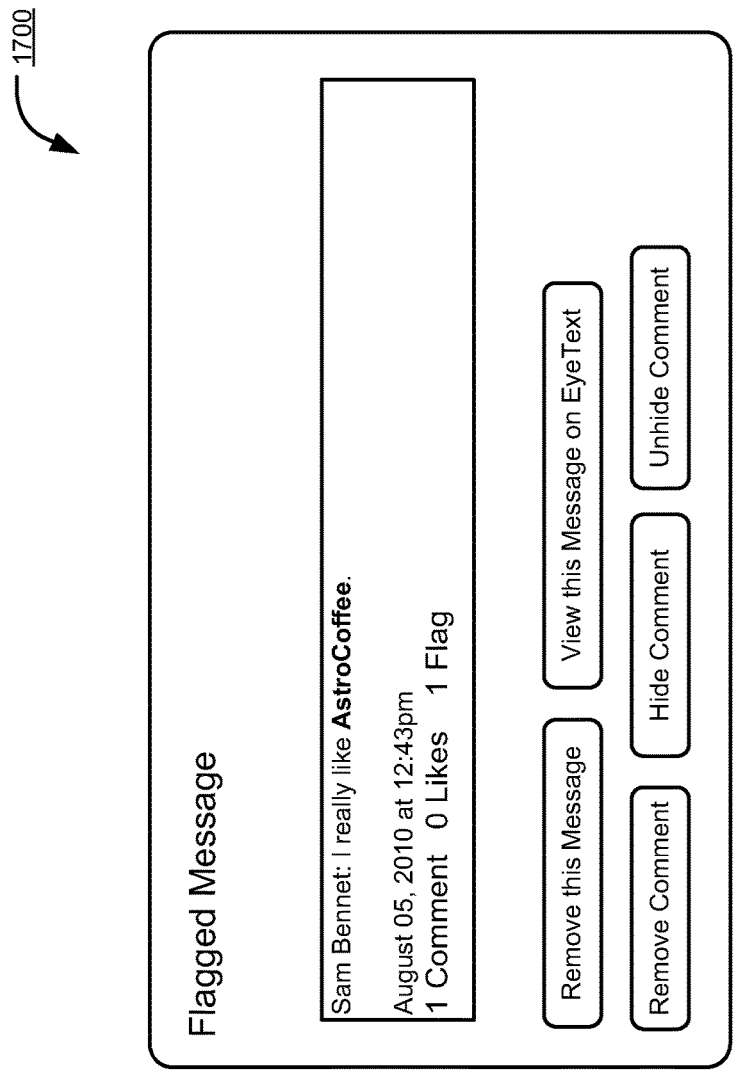
FIG. 17 – Exemplary Flagged Message Screen

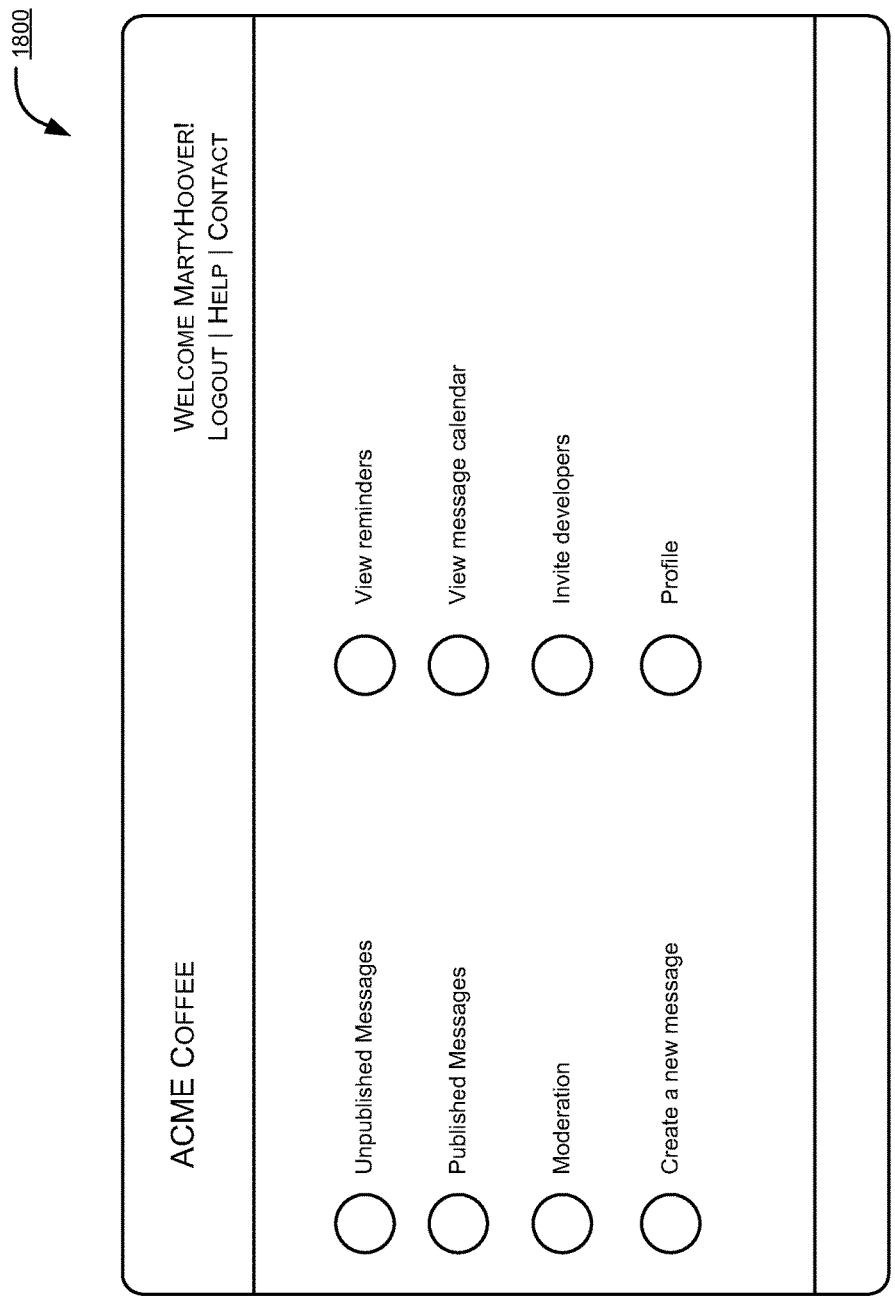
FIG. 18 – Exemplary Homepage Screen

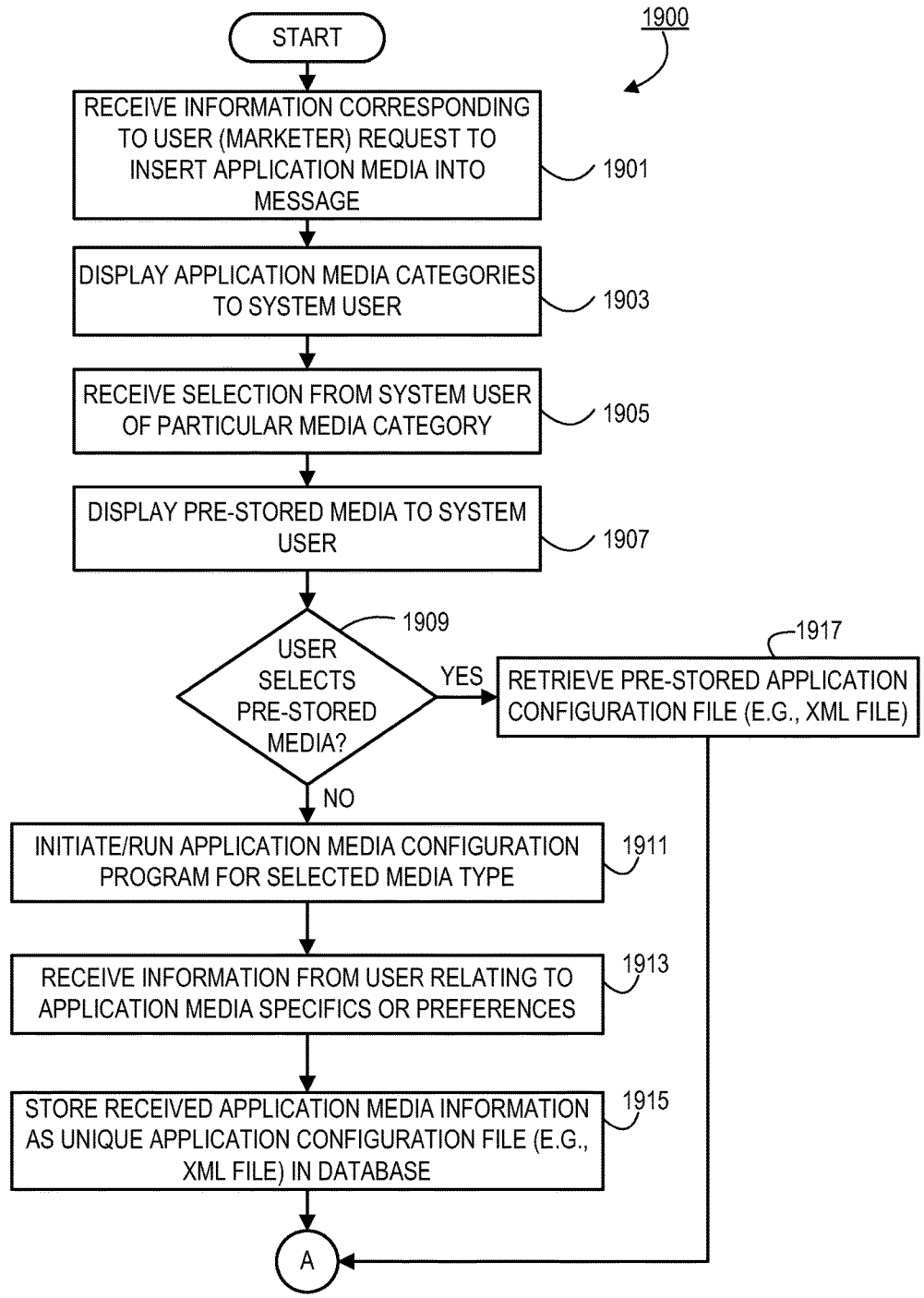
FIG. 19A – Exemplary Process for Inserting Application Media into Message

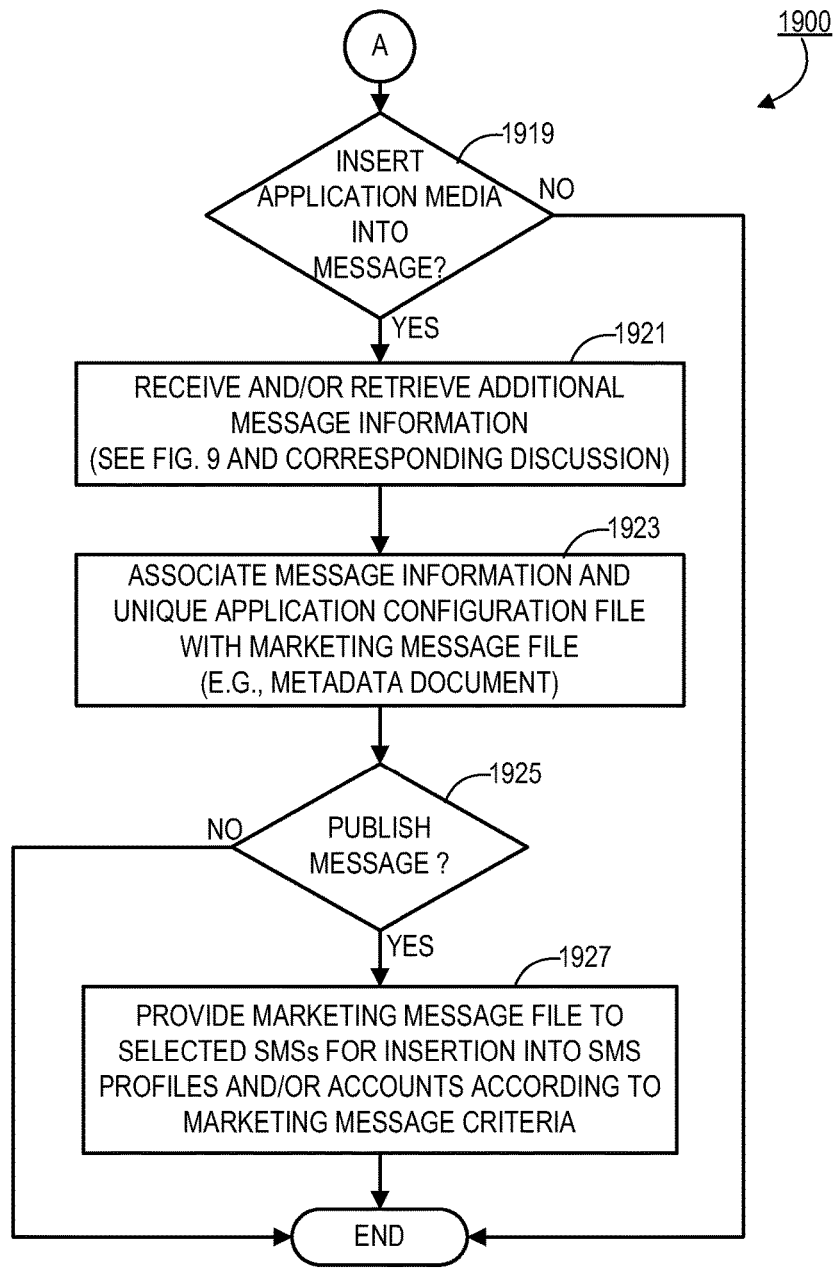
FIG. 19B — Exemplary Process for Inserting Application Media into Message

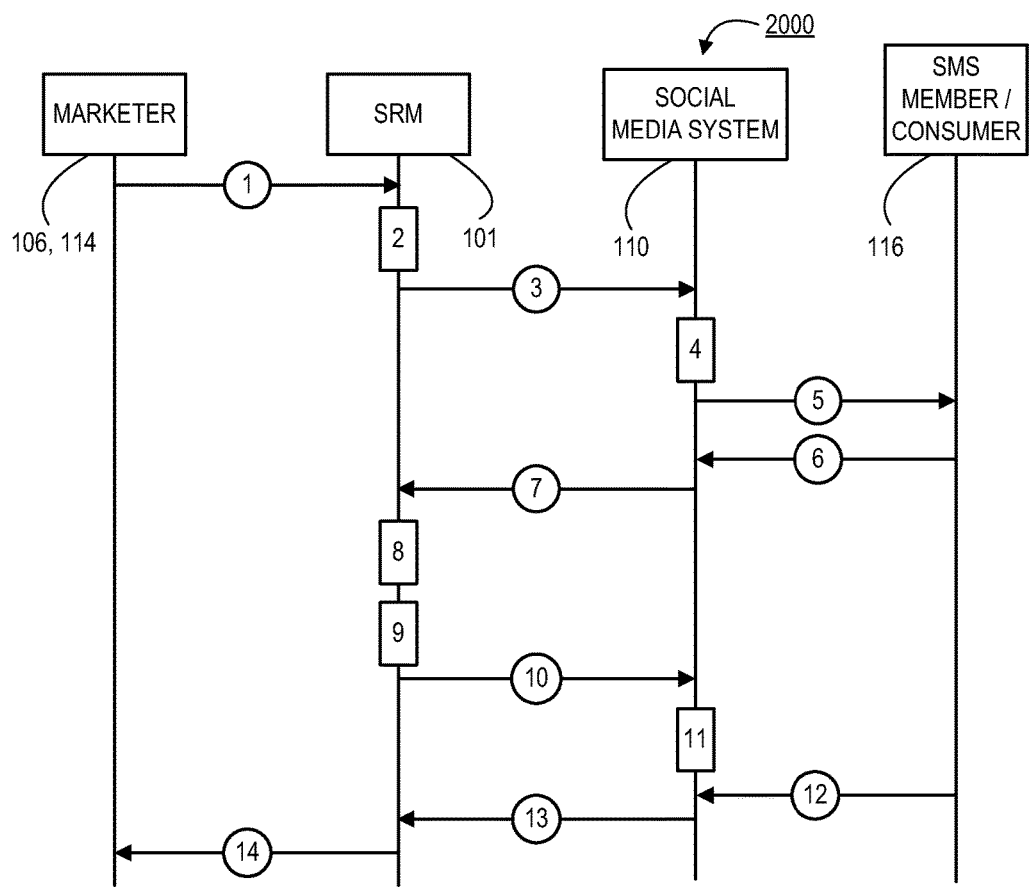
FIG. 20 – Sequence Diagram Showing Interactions Between Various System Components

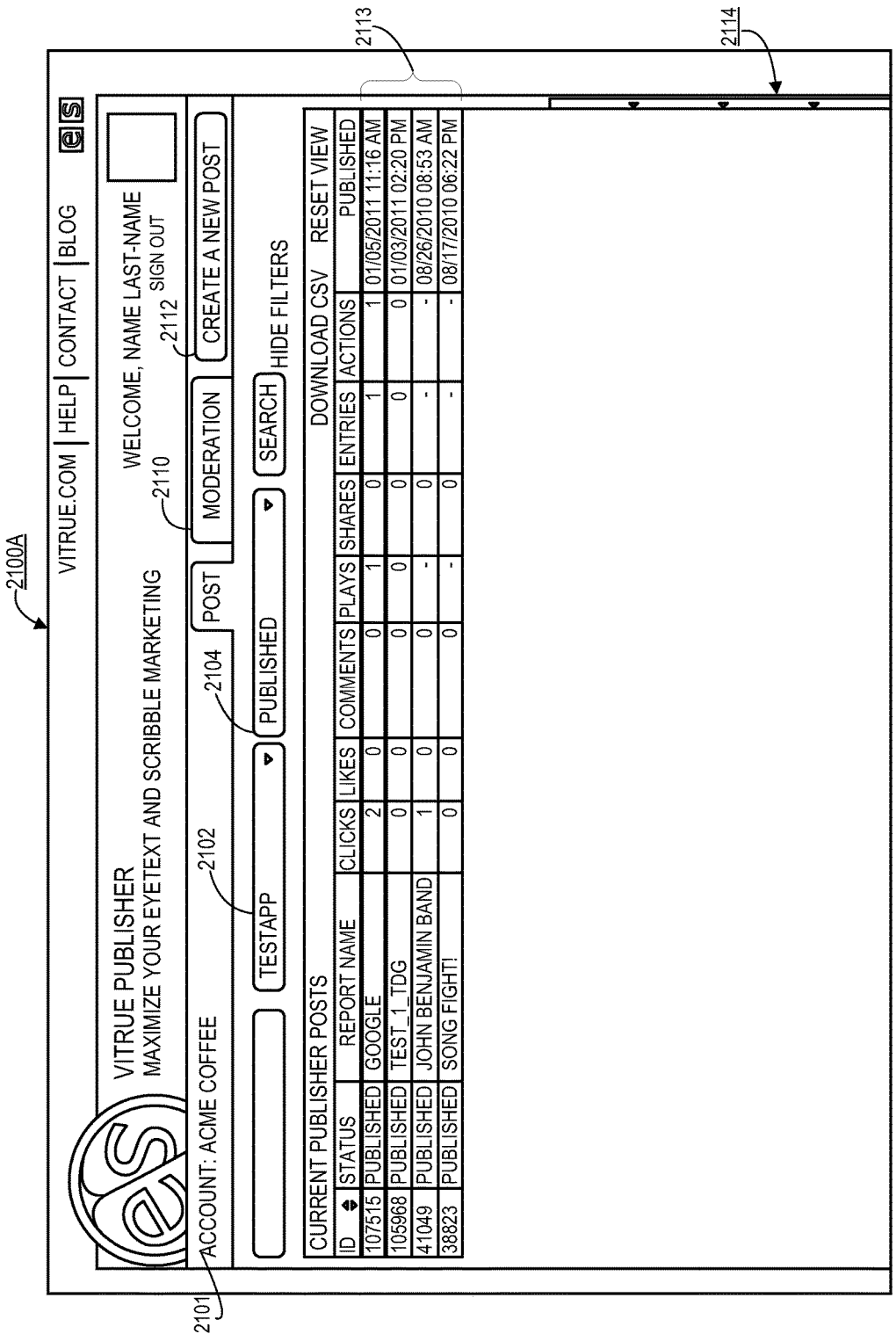
FIG. 21A – Exemplary Marketing Program Summary Screen

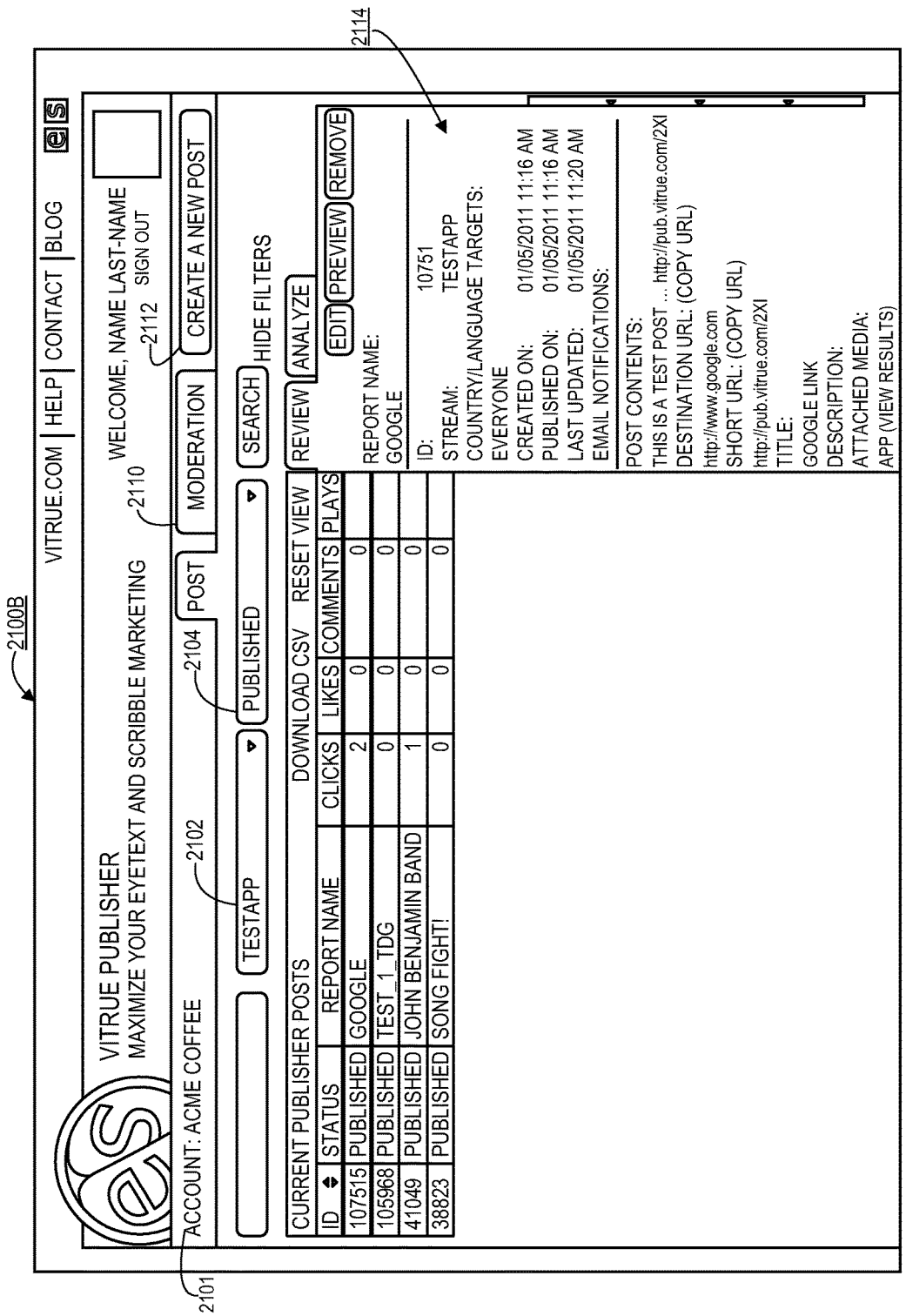
FIG. 21B – Exemplary Marketing Program Summary Screen

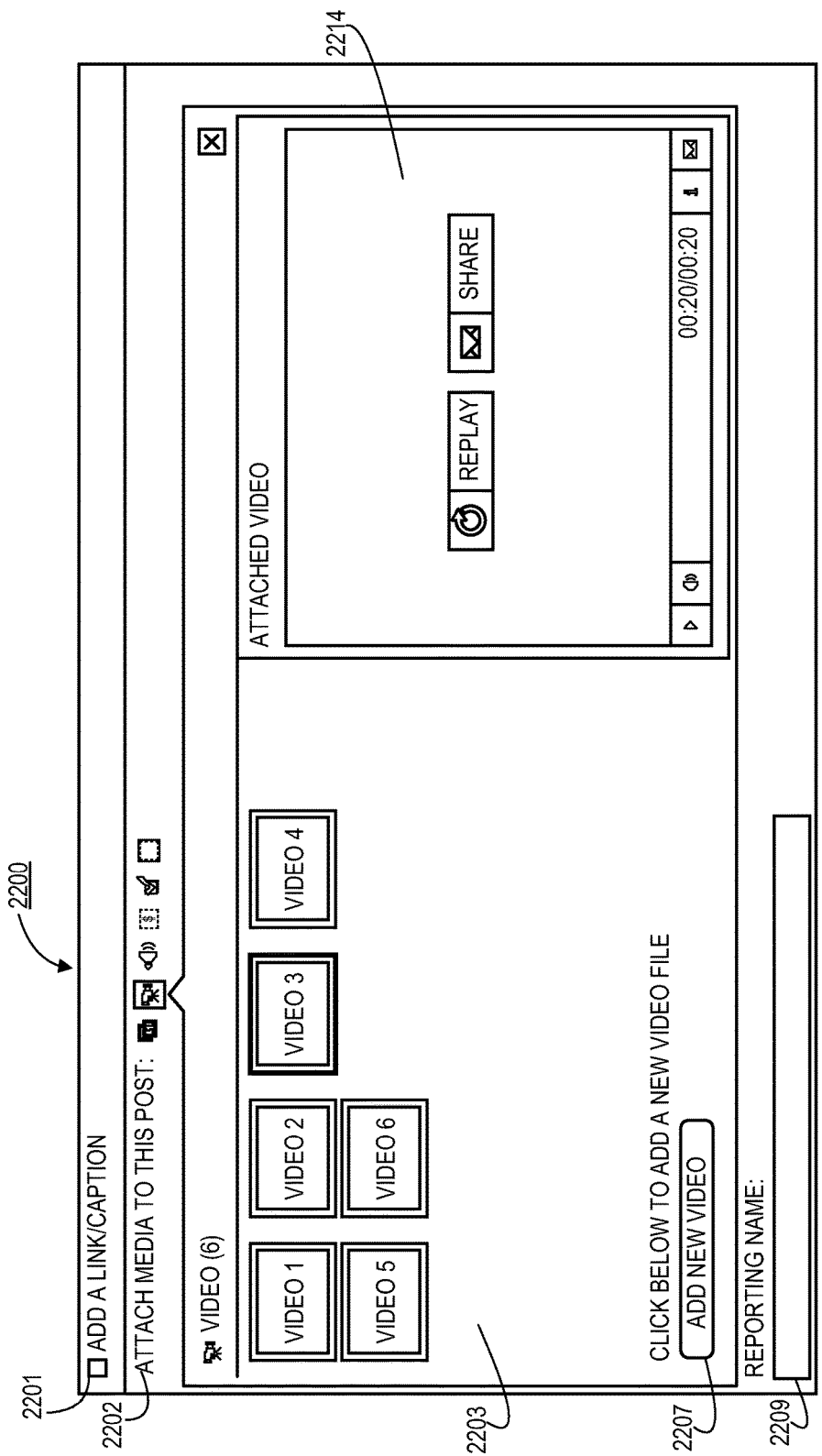
FIG. 22 – Exemplary Application Media (Video) Insertion Screen

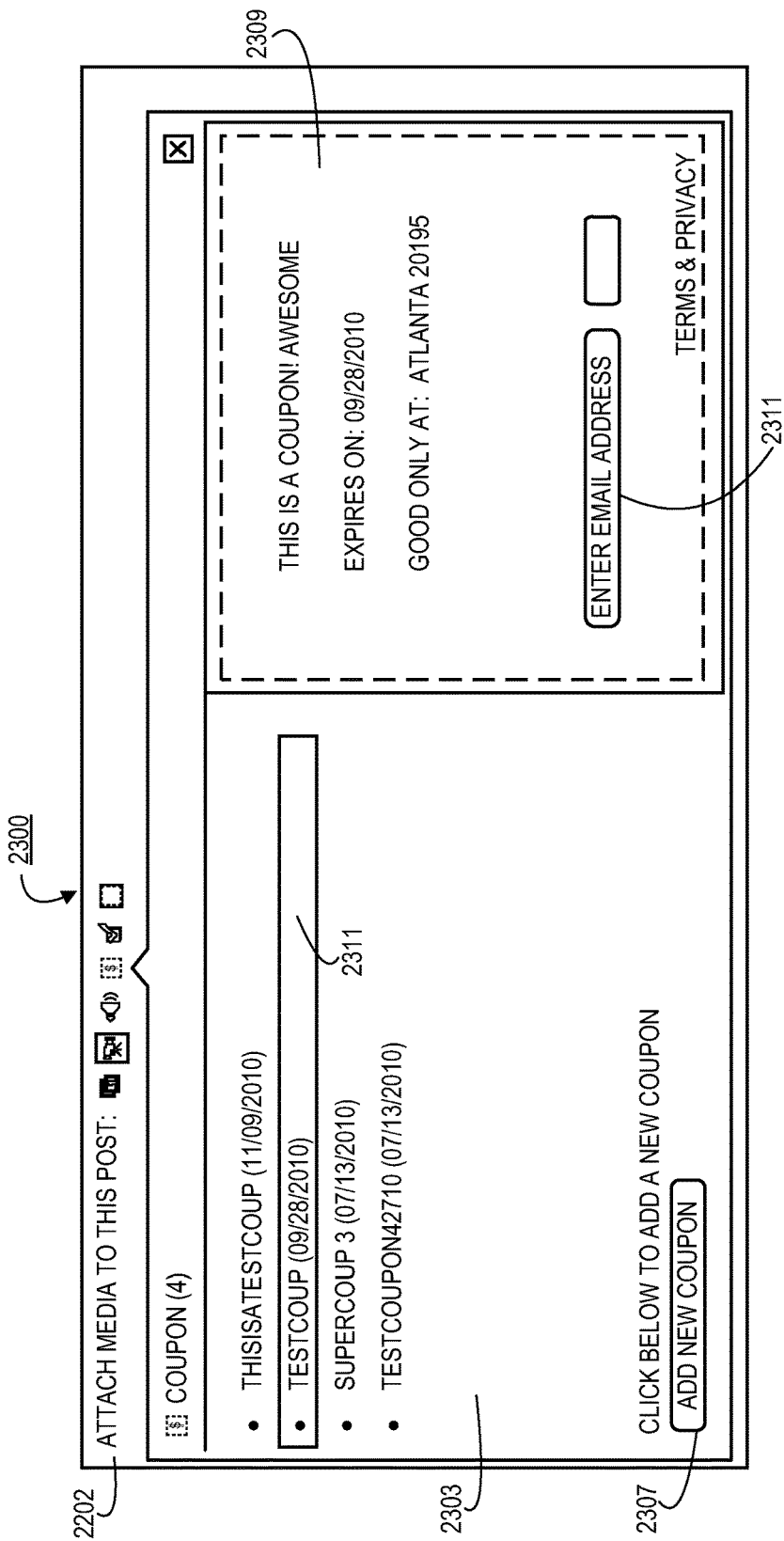
FIG. 23 – Exemplary Application Media (Coupon) Insertion Screen

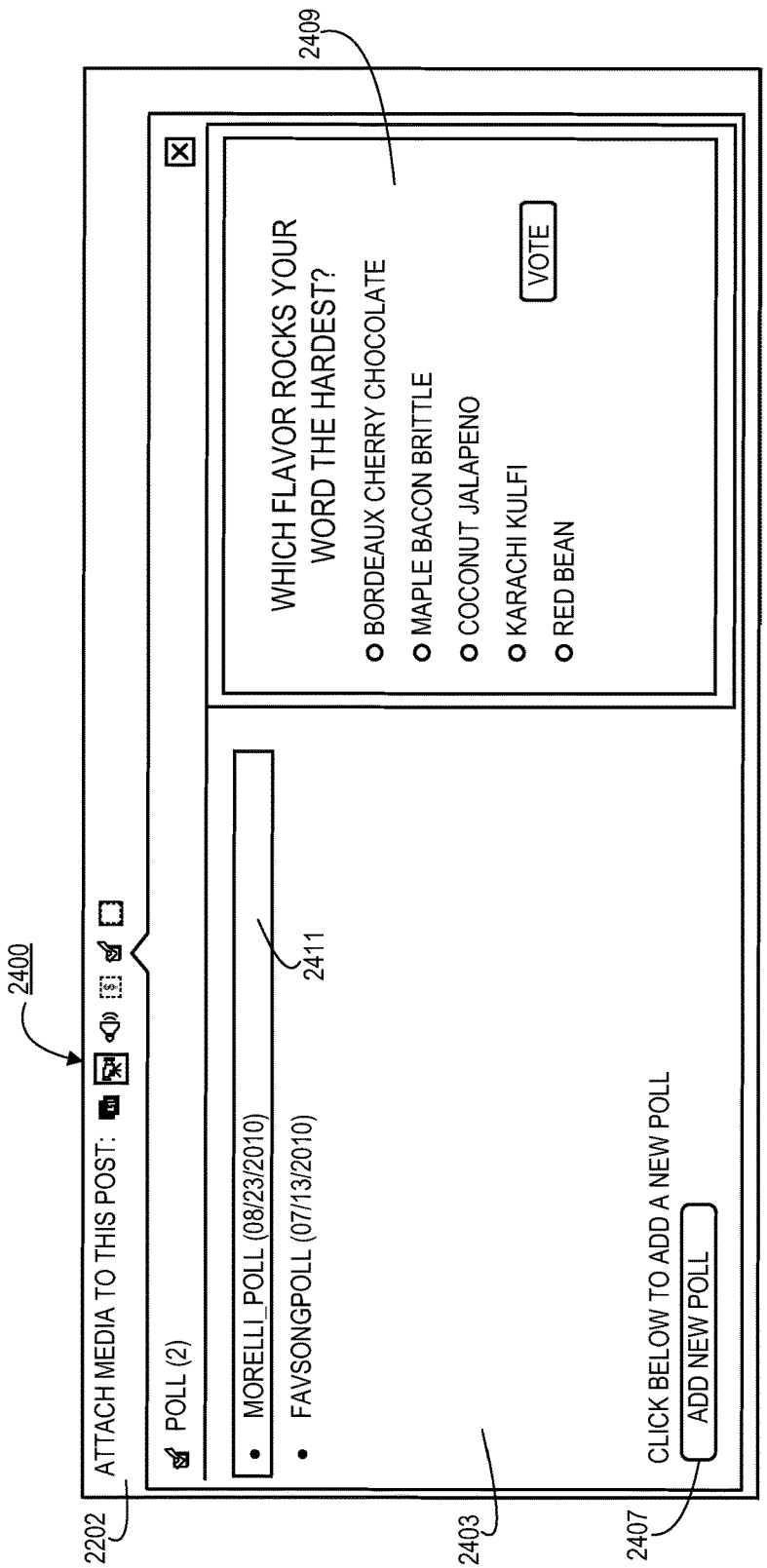
FIG. 24 – *Exemplary Application Media (Pre-stored Marketing Poll) Insertion Screen*

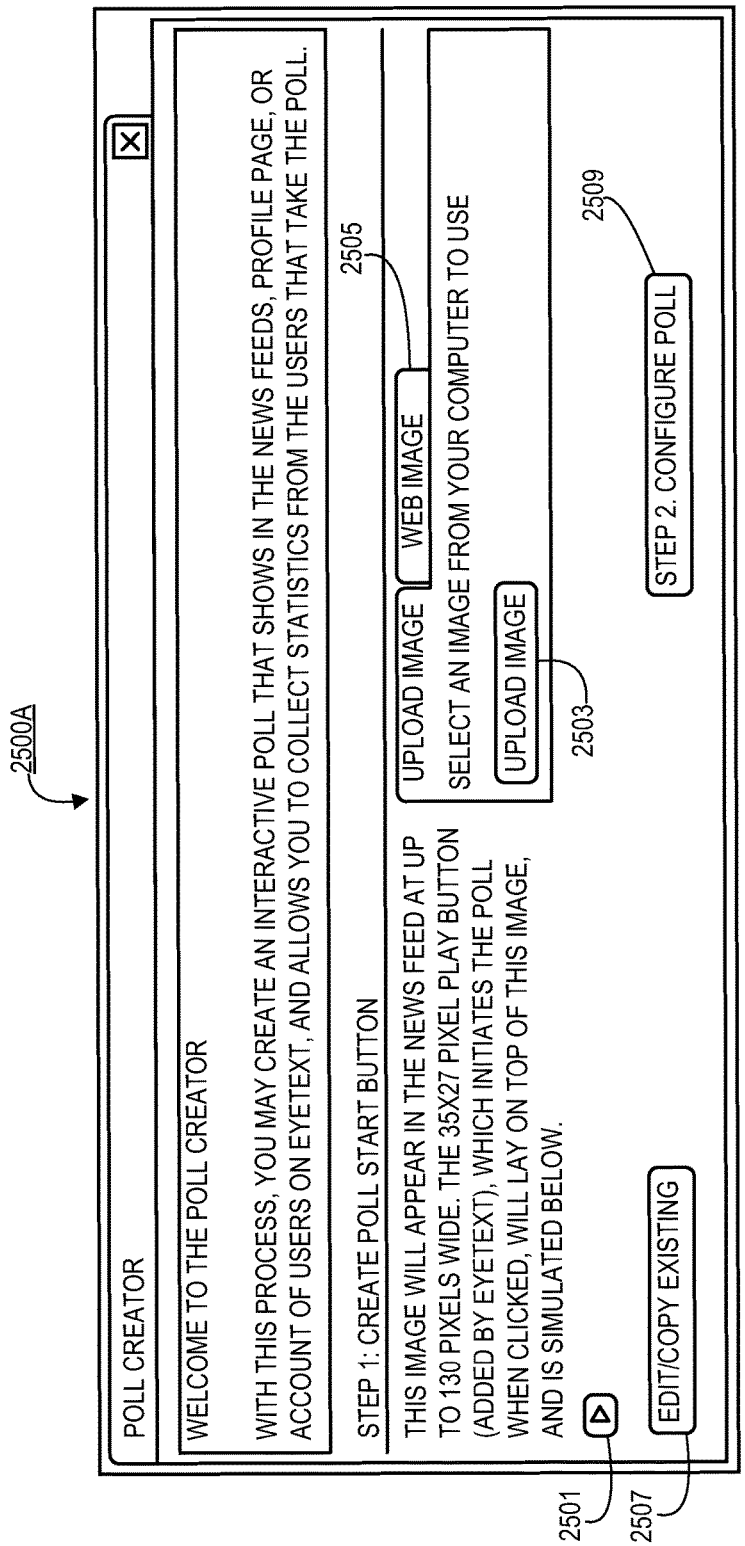
FIG. 25A – Exemplary Custom Marketing Poll Insertion Screen

FIG. 25B – Exemplary Custom Marketing Poll Creation Screen

POLL CREATOR

STEP 2: CREATE POLL

QUESTION & ANSWERS | START VIEW | RESULTS VIEW

POLL QUESTION & ANSWERS

WHAT IS YOUR POLL QUESTION?

WHICH FLAVOR ROCKS YOUR WORLD THE HARDEST?

☐ WILL USERS BE ALLOWED TO SELECT MORE THAN ONE ANSWER?
☑ RANDOMIZE THE ORDER OF THE ANSWERS FOR EACH USER?
☑ ASK IF THE USER WANTS TO BE EMAILED THE FINAL RESULTS?

EXPIRATION

INDICATE IF YOUR POLL CAN EXPIRE.
◉ NONE  ○ FIXED  ○ DYNAMIC

DYNAMIC TEXT

☐ WILL THIS POLL REQUIRE CUSTOMIZATION WHEN PUBLISHED?

ENTER YOUR ANSWER CHOICES BELOW. BLANK ANSWERS WILL NOT BE INCLUDED

BORDEAUX CHERRY CHOCOLATE ✕
MAPLE BACON BRITTLE ✕
COCONUT JALAPENO ✕
KARACHI KULFI ✕
RED BEAN
+

BACK | STEP 3. PREVIEW & SAVE

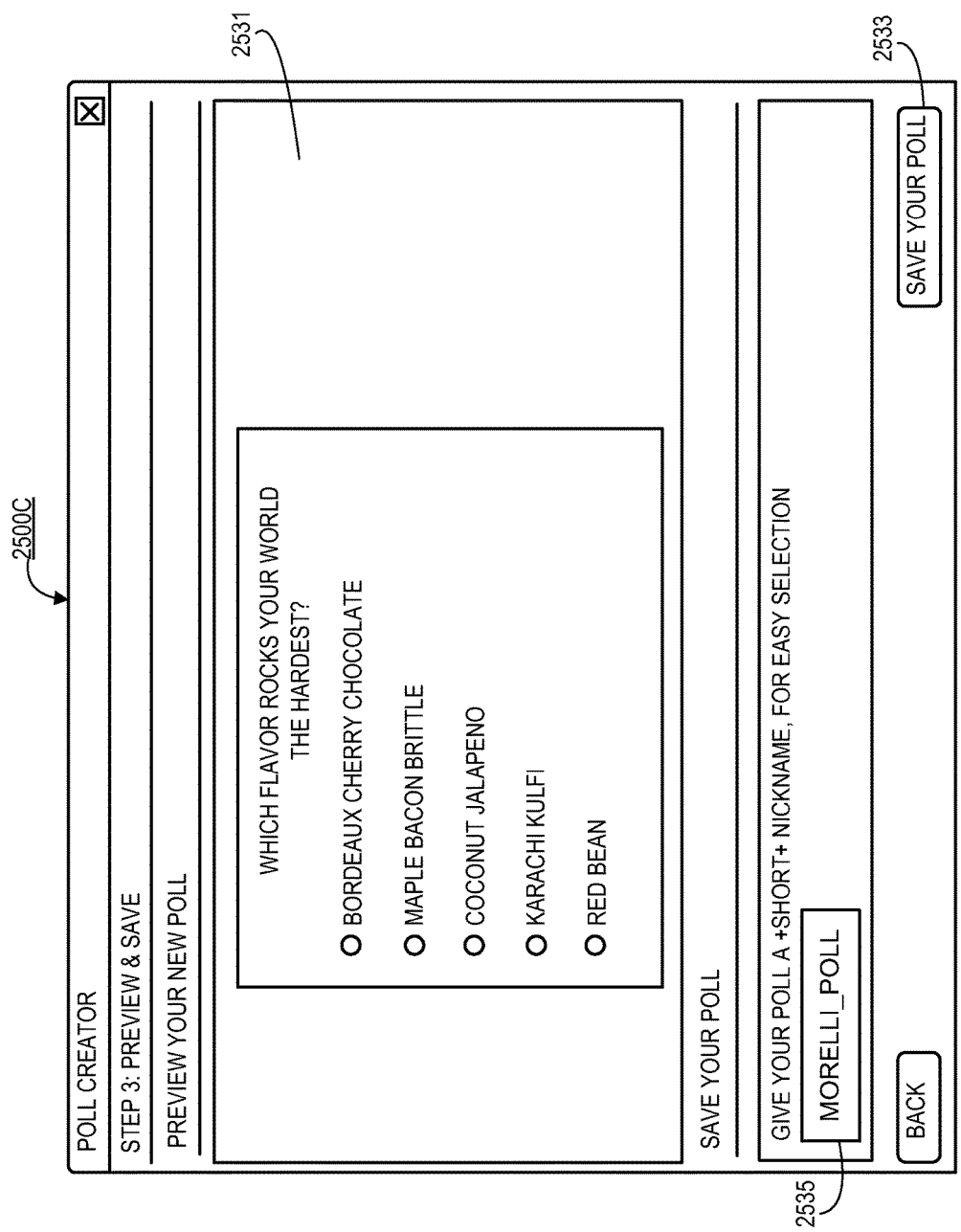
FIG. 25C – Exemplary Custom Marketing Poll Preview/Save Screen

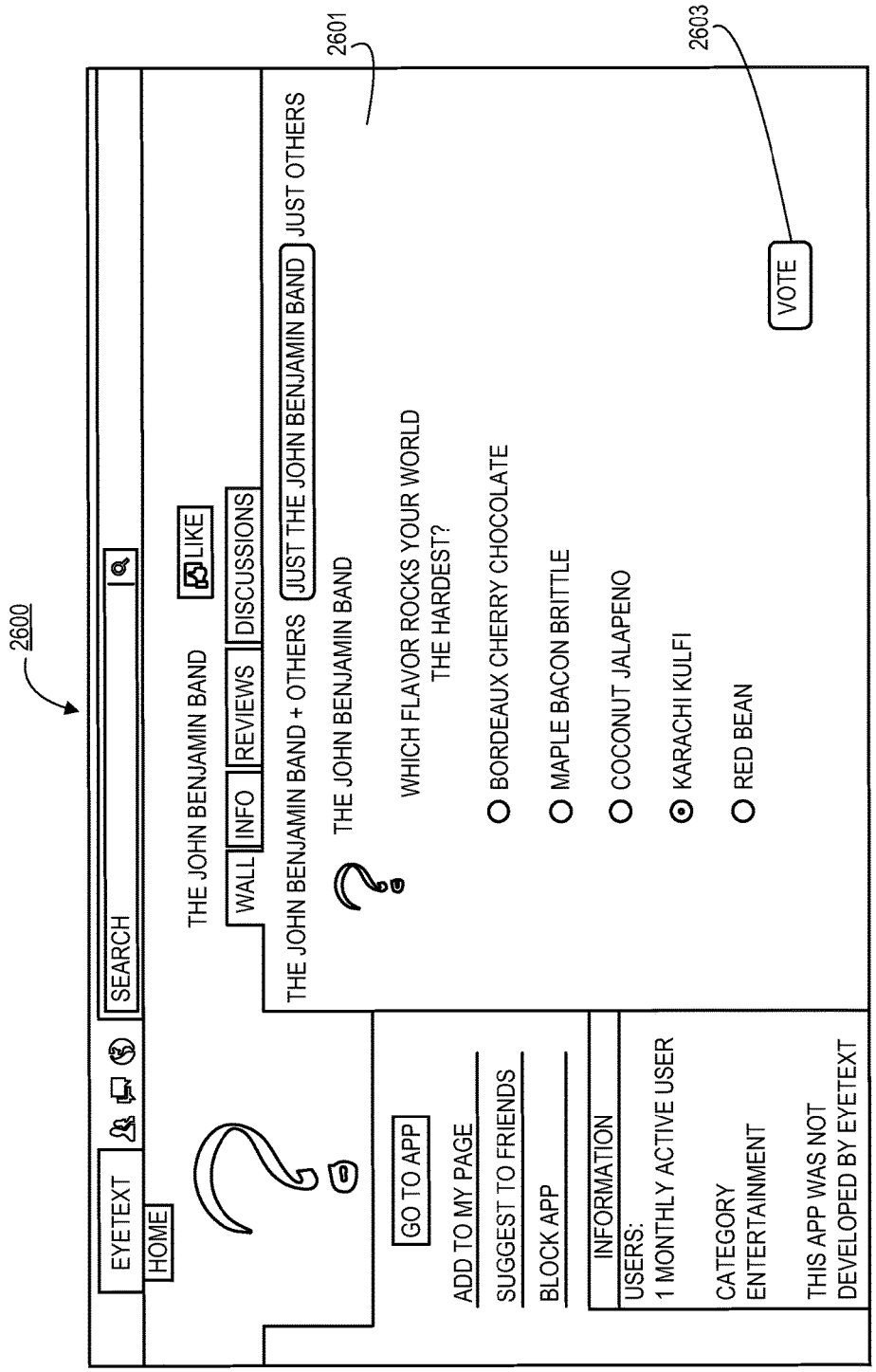
FIG. 26 – Exemplary Social Media System Profile Page Displaying Poll

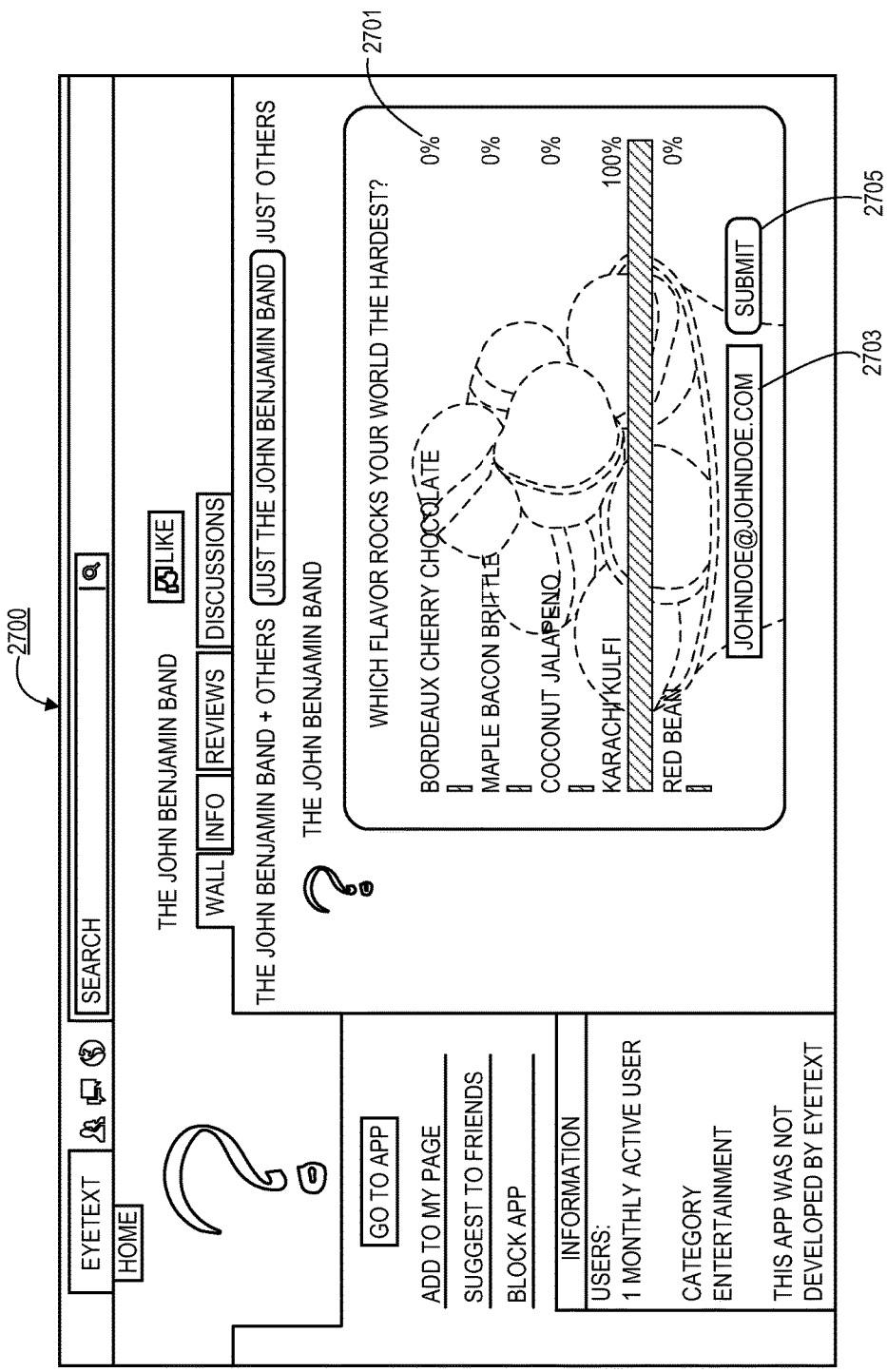
FIG. 27 – Exemplary Social Media System Profile Page Displaying Response to Poll

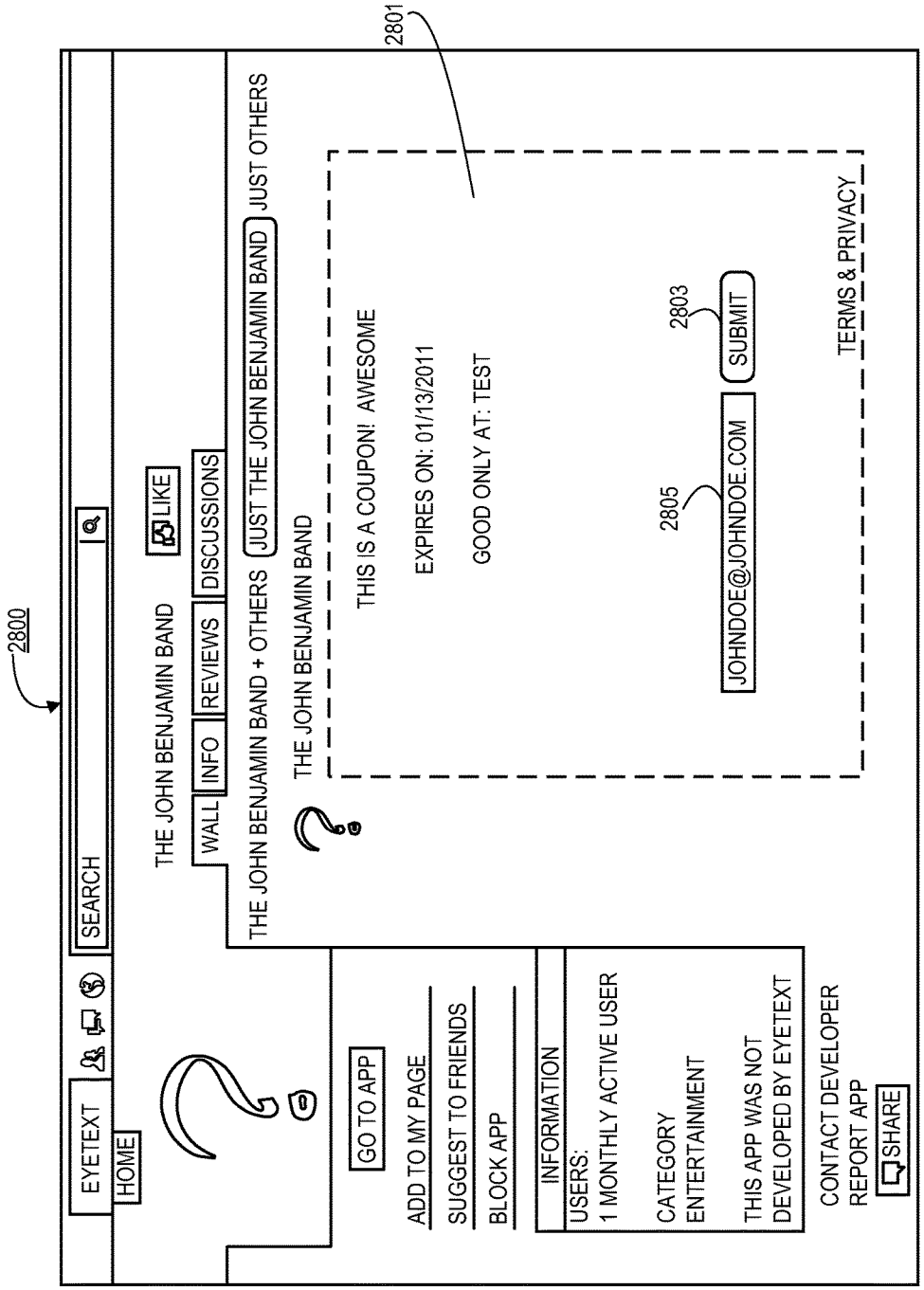
FIG. 28 – Exemplary Social Media System Profile Page Displaying Coupon

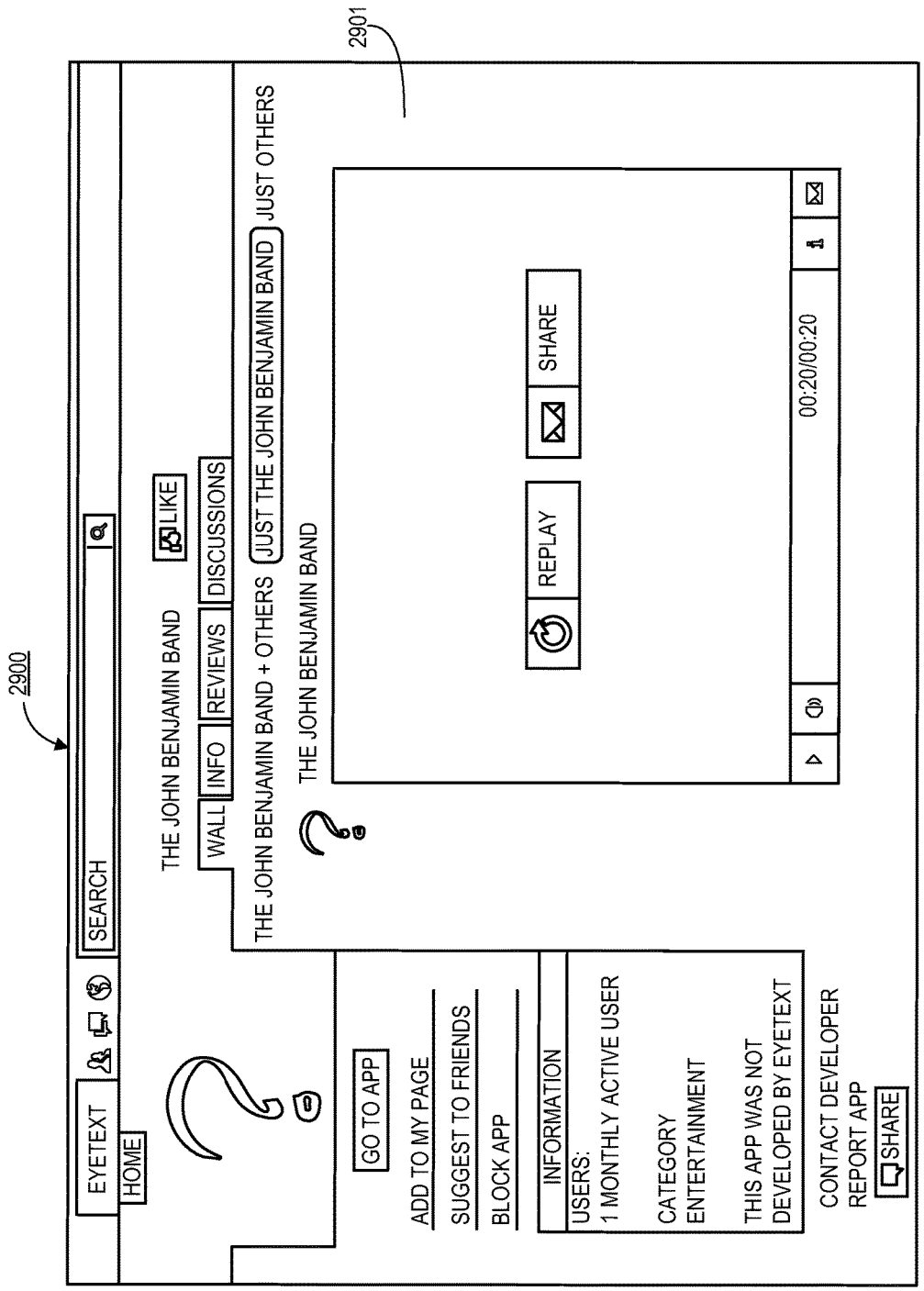
FIG. 29 – *Exemplary Social Media System Profile Page Displaying Video*

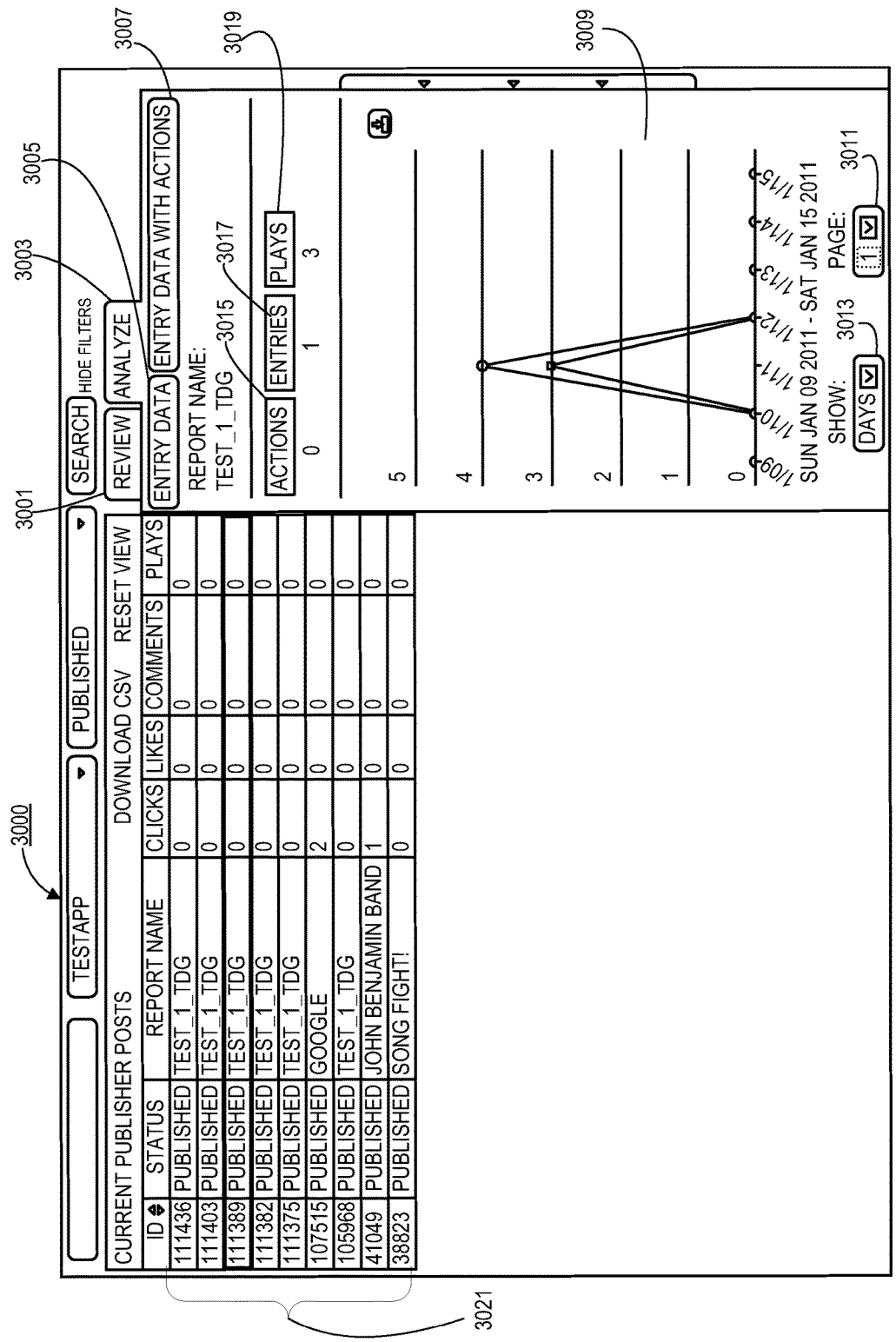
FIG. 30 – Exemplary SRM Analysis Screen

| response | email | created_at | ip |
|---|---|---|---|
| Karachi Kulfi 1 | johndoe@johndoe.com | 2011-01-05 16:24:38 UTC | |

FIG. 31 – Exemplary View of Consumer Analytics Extracted by SRM

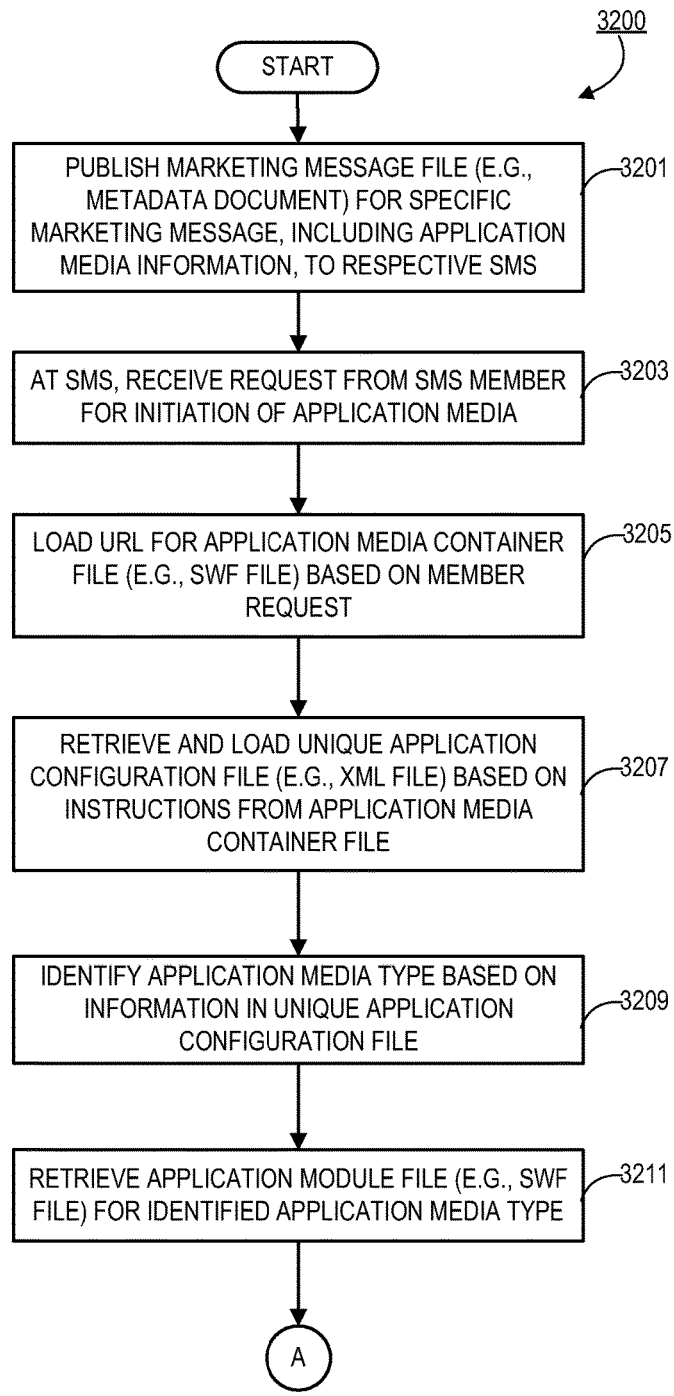
FIG. 32A – Exemplary Process for Displaying Application Media to Social Media System Members

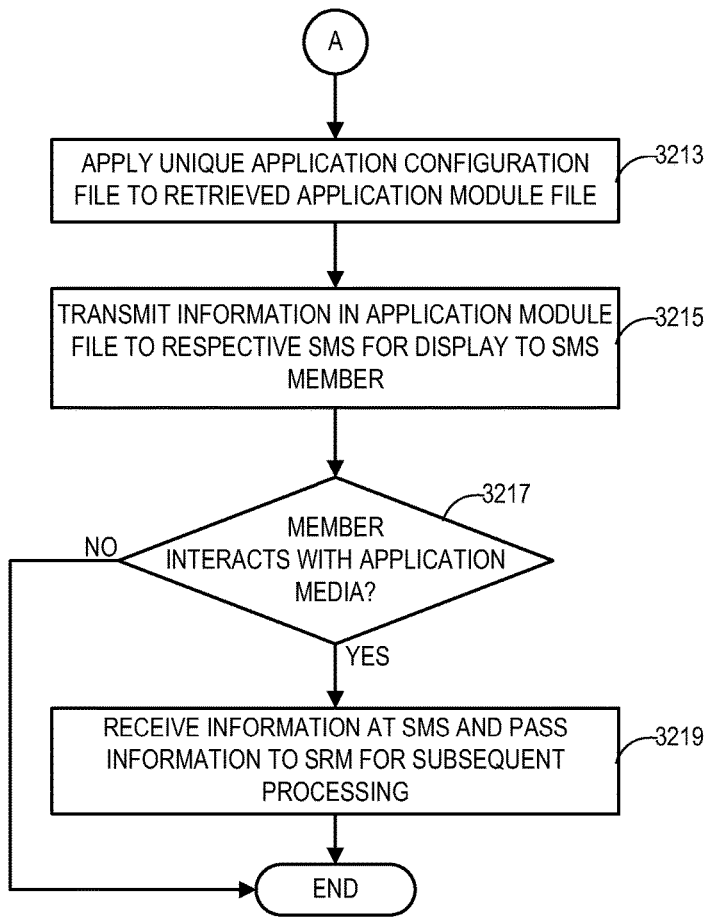
FIG. 32B – Exemplary Process for Displaying Application Media to Social Media System Members

SYSTEMS AND METHODS FOR CREATING AND INSERTING APPLICATION MEDIA CONTENT INTO SOCIAL MEDIA SYSTEM DISPLAYS

CROSS-REFERENCE TO RELATED APPLICATIONS

This application is a continuation-in-part application, and claims the benefit of and priority under 35 U.S.C. § 120 to U.S. patent application Ser. No. 12/859,675 filed Aug. 19, 2010 and entitled "Systems and Methods for Managing Marketing Programs on Multiple Social Media Systems", which in turn claimed the benefit of and priority under 35 U.S.C. § 119(e) to U.S. Provisional Patent Application No. 61/235,277 filed Aug. 19, 2009, and entitled "Social Relationship Manager System and Method." In addition, the present application also claims benefit under 35 U.S.C. § 119(e) of U.S. Provisional Patent Application No. 61/299,855, filed Jan. 29, 2010, and entitled "Wall Apps". All of the above-referenced applications are hereby incorporated by reference as if set forth herein in their entireties.

TECHNICAL FIELD

The present application relates generally to social media systems, and more particularly to methods and systems that support the practice of marketing on social media systems.

BACKGROUND

The popularity of social media websites or portals, such as Facebook®, Twitter®, LinkedIn®, MySpace®, Buzz®, and others has increased markedly in recent years, compelling marketers and advertisers to analyze the potential of these channels for different types of marketing and advertising. These portals not only provide a platform for individual users to interact, but also present organizations, groups, and communities with potential marketing tools, such as Facebook® pages, or Twitter® handles relating to their products or services, enabling marketers to interact with followers, fans, employees, or consumers/members. Marketers can post messages or advertisements on these social media systems as a way to advertise outside of traditional marketing channels. Members, in turn, can respond by clicking on embedded URLs (uniform resource locators), replying to the messages, starting posts based on the messages, or performing other site-specific functions. Further, marketers can embed an organization-specific or campaign-specific URL (webpage address) within the messages, driving users and web traffic to a separate web site.

Even though viral marketing through these social media systems can prove profitable for organizations in terms of additional media coverage, increased click-through rates, greater brand awareness, timely updates, etc., organizations may face difficulties in maintaining and managing more than one marketing campaign or program on an ongoing basis. As referred to herein (and described in greater detail below), a "marketing program" relates to an advertising theme, such as a series of advertisements or messages around a certain time of year (e.g., fall, holiday, summer), certain dates (e.g., Halloween, Christmas, Mother's Day), or certain themes (e.g., back to school, the start of a sporting season). Further, marketing programs may relate generally to a specific marketer, product, or group of products offered by a particular marketer. For example, large corporations with hundreds of different product lines and operations spread worldwide may create separate marketing programs on multiple social media systems for each product line or locality, amounting to thousands of marketing programs. For these corporations, the task of updating and managing these marketing programs with new advertising content on a regular basis can become colossal. Individually updating marketing programs may require efforts from a large number of people.

Further, most social networking systems set their own message formats, rules, and instructions, and use their own technology protocols. This makes it not only difficult but a practical impossibility for marketers to remember the rules associated with the programs and to format the messages accordingly. Specifically there currently exists no effective, streamlined way to insert application media into messages created for the purpose of marketing on social media systems. For example, because most social media systems have strict protocols for uploading content on social media websites, it is practically impossible to effectively generate complex and interactive application media content as well insert such content into messages created for the purpose of marketing on social media systems. As referred to herein, "application media" generally refers to media content with which a user (such as a member of a social media system) may interact. Examples of application media include online quizzes, polls, electronic games, and other media types in which a user may view information relating to the application media, provide information to or interact with the media, and view subsequent or additional content in connection with the media. For example, in the case of a poll, a social media system member may view poll questions, select a particular answer, and view poll results provided by other members. Application media may generally be contrasted with conventional multimedia content, such as videos, audio files, static graphic images, and the like, because such multimedia content does not enable rich interaction between the content and an end user (member). It will be understood and appreciated, however, that some forms of multimedia that enable dynamic user interaction may also be classified as application media.

Additionally, the fact that marketing data, metrics, and other data are on multiple social media platforms makes analysis cumbersome and difficult. Particularly, marketers may find it practically impossible to analyze the success or acceptance of a particular message, or to compare one message or marketing program with another. Currently, no existing service effectively assists marketers and advertisers in managing the marketing programs spread over multiple social media systems.

Therefore, a long-felt but unresolved need exists for a system or method that manages multiple marketing programs on multiple social networking systems. There remains a further need for a system or method that is simple to implement, does not require extensive data analysis, and can be easily configured according to the marketer's or user's preferences to manage any number of marketing programs. There exists yet a further need for a system that enables creation and delivery of messages created for the purpose of marketing on social media systems, wherein the message includes application media or multimedia content.

BRIEF SUMMARY

Briefly described, and according to one embodiment, the present disclosure describes a computer-implemented method for managing one or more marketing programs present on multiple social networking systems. Initially, the method develops a message for at least one marketing program. The message may comprise a text string, multimedia message, or custom file (such as a .swf file that will render on more than one social media platform). Next, delivery of the developed message to the destination marketing programs is scheduled. The method further customizes the message format according to the corresponding social networking systems, before publishing the customized message on the marketing programs at the scheduled time.

Another embodiment of the present disclosure presents a system for managing one or more marketing programs on multiple social media systems. The system includes a user interface that allows one or more developers to develop messages for at least one destination marketing program, and displays system outputs. A scheduler plans message delivery to the destination marketing programs, and a formatter customizes the message format according to the corresponding social media system. The system further includes a publisher for publishing the message on the marketing program at the scheduled time and a database for storing marketing programs, messages published on the marketing programs, message delivery schedules, and message formats acceptable in different social media systems.

Certain embodiments of the disclosure may offer significant technical advantages. For example, certain embodiments may allow marketers or advertisers to maximize click-through rates on the marketing programs by generating interactive and visually stimulating messages from a single platform. According to one exemplary embodiment, the present disclosure allows marketers or advertisers to engage consumers on the consumers' profile webpage in a social media system, without requiring the consumers to leave that page, thus generating maximum involvement which, in turn, can lead to a better experience for both a consumer (member) as well as a marketer.

Further, other embodiments of the system permit simultaneous or scheduled delivery of one message to multiple marketing programs on one social media system or multiple marketing programs on multiple social media systems. Further, other embodiments of the system may analyze insights from different marketing programs to determine the quality of messages, success of posts, and potential improvements in message content to maximize responses, in addition to collecting statistics related to consumer behavior.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment. The drawings are illustrative in nature and are not necessarily drawn to scale.

FIG. 1 is a block diagram illustrating an exemplary environment where embodiments of the present invention are implemented.

FIG. 2 is a block diagram illustrating an exemplary social relationship manager.

FIG. 3 illustrates an exemplary marketing program information database schema.

FIG. 4 is a flowchart illustrating an exemplary method for managing marketing programs on multiple social media systems.

FIG. 5 illustrates an exemplary login screen.

FIG. 6 illustrates an exemplary marketing program addition screen.

FIG. 7 illustrates an exemplary message creation screenshot.

FIG. 8 illustrates an exemplary message scheduler screen.

FIG. 9 is a flowchart illustrating an exemplary method for creating a message.

FIG. 10 illustrates an exemplary URL caption screen.

FIG. 11 illustrates an exemplary media selection screen.

FIG. 12 illustrates an exemplary destination marketing program selection screen.

FIG. 13 is a flowchart illustrating an exemplary method for customizing messages according to a destination social media system.

FIG. 14 is a flowchart illustrating an exemplary method for analyzing insights corresponding to published messages.

FIG. 15 illustrates an exemplary word list screen.

FIG. 16 illustrates an exemplary moderation screen.

FIG. 17 illustrates an exemplary moderated message screen.

FIG. 18 illustrates an exemplary SRM home page screen.

FIG. 19 consisting of FIG. 19A, and FIG. 19B show a flowchart illustrating a process for inserting application media into a message created for the purpose of marketing on social media systems, in accordance with alternative exemplary aspects of the disclosure.

FIG. 20 shows a sequence diagram illustrating computer-implemented method steps involving various components of the overall system and their interactions with each other, in accordance with alternative exemplary aspects of the disclosure.

FIG. 21 consisting of FIG. 21A and FIG. 21B illustrate an exemplary marketing program summary and analysis screen, in accordance with alternative exemplary aspects of the disclosure.

FIG. 22 illustrates an exemplary media selection screen for inserting a video into a message created for the purpose of marketing on social media systems, in accordance with alternative exemplary aspects of the disclosure.

FIG. 23 illustrates an exemplary screen for inserting a coupon into a message created for the purpose of marketing on social media systems, in accordance with alternative exemplary aspects of the disclosure.

FIG. 24 illustrates an exemplary screen for inserting a pre-stored marketing poll into a message created for the purpose of marketing on social media systems, in accordance with alternative exemplary aspects of the disclosure.

FIG. 25 consisting of FIG. 25A, FIG. 25B and FIG. 25C illustrates an exemplary screen for the creation of a custom marketing poll and its insertion into a message created for the purpose of marketing on social media systems, in accordance with alternative exemplary aspects of the disclosure.

FIG. 26 illustrates an exemplary social media profile screen of a consumer who views a marketer's message containing a marketing poll, in accordance with alternative exemplary aspects of the disclosure.

FIG. 27 illustrates an exemplary social media profile screen of a consumer who responds to a marketing poll, in accordance with alternative exemplary aspects of the disclosure.

FIG. 28 illustrates an exemplary social media profile screen of a consumer who collects a coupon from a message created by a marketer, in accordance with alternative exemplary aspects of the disclosure.

FIG. 29 illustrates an exemplary social media profile screen of a consumer with a video attached to a message created by the marketer, in accordance with alternative exemplary aspects of the disclosure.

FIG. 30 illustrates an exemplary SRM analysis screen, containing analytics of consumers' actions, in accordance with alternative exemplary aspects of the disclosure.

FIG. 31 illustrates an exemplary view of consumer analytics extracted from consumers' interactions with a marketer's message, in accordance with alternative exemplary aspects of the disclosure.

FIG. 32 consisting of FIG. 32A and FIG. 32B illustrates an exemplary process for displaying application media to consumers or members on a social media system who are enabled to receive marketing messages from a marketer.

DETAILED DESCRIPTION

For promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. Limitations of scope should be determined in accordance with and as expressed in the claims.

Overview

Embodiments of the present disclosure generally relate to aspects of an electronic (e.g., Internet-accessible) system such as a social relationship management system ("SRM" system or "SRMS" or "social relationship manager system" or "manager") that allows marketers to manage their social media presence by assisting the marketers or advertisers to create, manage, and distribute messages or advertisements associated with one or more marketing programs present on multiple social media systems efficiently from a single user interface. As mentioned previously, a "marketing program" corresponds to a series or grouping of advertisements or messages relating to a particular marketer, product, locality in which a product is offered, etc. Ads or messages associated with a given marketing program may span across many different social media systems, or be directed only to one such system. For example, a large corporation like Sony®, producing hundreds of different products, may develop separate Facebook® pages for each product. Moreover, marketing managers/developers may create different Facebook® corporate pages for each country in which Sony® operates. Similarly, Sony® may have multiple such Buzz® and Twitter® handles. When one considers combinations and permutations of products, locations, and social media, the result can literally be tens of thousands of messages and posts. Managing these messages or posts on a daily basis presents a gargantuan task. The social relationship manager disclosed here simplifies this task by acting as a conduit to enable marketers to interact either directly or indirectly with the marketers' social media systems. Specifically, content developers associated with the marketers can create multiple messages, schedule message delivery, and publish these messages either immediately, or at scheduled times on the social media systems of their associated marketer.

Each social media system has particular standards, rules, and messaging policies, which must be met to operate on that system. For example, some systems may impose a character limit on message text, while other systems may not allow multimedia messages. As used herein, the term "messages" refers to postings, advertisements, or other content published on a social media system. To ensure message compliance with the social media system, an embodiment of the social relationship manager customizes messages for each destination system according to predefined rules. If a destination system does not allow multimedia messages, for example, the manager may not allow a developer to attach media. Alternatively, the manager may simply remove an embedded image or video from a multimedia message before publishing it on the social media system. In order to make formatting decisions, the manager maintains a list of standards and rules pertaining to the social media systems, and compares the message to these standards before publishing the messages. The standards may be updated periodically, if required.

Alternatively, for example, if a certain social media system does not support multimedia messages, the manager may create a separate page with the complete message, and post a text message on the social media system with a link to the complete page. Any user may subsequently select the embedded URL to view the complete multimedia message. In this way, embodiments of the manager allow marketers to build multimedia messages for social media platforms that do not support these messages.

In another embodiment, a marketer has the ability to post complete messages containing application media or multimedia content on the social media system profile page of consumers who are subscribers to a specific group or channel. As referred to herein, a group or channel is a social media page or account that includes members having related interests. For example, a group or channel could be a social media page or account of a local music band, or a retailer selling electronics merchandise. This will allow consumers or members to participate in marketing campaigns without requiring consumers to leave their profile page. The marketer can create a variety of marketing campaigns involving one or a combination of text, polls, banner ads, coupons, videos, or other application media or multimedia content in order to engage consumers. Friends of the consumer who may not already be subscribers of that group or channel can view and appreciate such messages and also the responses of the consumer. In many circumstances, viewing such interactive content evokes interests of the consumer's friends leading them to subscribe to such a group or channel, which in turn, generate additional future consumers for the marketer.

Exemplary Environment

FIG. 1 illustrates an exemplary environment 100 where embodiments of a social relationship manager may operate. The environment 100 includes a social relationship manager (SRM) 101 including a managing module 102 coupled with a database, such as a marketing program information database 104. Clients 106 represented here by individual clients 106-A, 106-B, and 106-C, may access the SRM 101 through a network 108, such as the Internet to publish messages on the social media systems 110. As referred to herein, a "client" represents a marketer, such as a large company or organization, that wishes to utilize the SRM to manage content on its social media systems (SMS). The clients 106 interact with the SRM 101 using one or more computing devices 112 (such as cell phones, PDAs, desktops, laptops, tablets, and notebooks). Developers 114, present on the computing devices 112, can develop messages for one or more marketing programs. As referred to herein, a "developer" represents an individual associated with a client that has access privileges to create advertising content or post to the client's social media system accounts. An example of a developer is an employee of the client within the client's marketing department. Moreover, multiple developers 114 may develop messages simultaneously for the same marketing program or for different programs.

FIG. 1 illustrates one developer 114-A associated with client 106-A, three developers 114-B associated with client 106-B, and two developers 114-C associated with client 106-C. It will be understood that different number of developers 114 are depicted in this figure merely to indicate that the SRM 101 may support one or more developers 114 for a single marketing program or client 106. Moreover, it will be understood that in actual situations the number of developers 114 (e.g., hundreds of developers) associated with a particular client 106 may vary considerably from time to time depending on a number of factors such as organization strength, number of active marketing programs, publishing patterns, and other such factors.

The SRM 101 may be connected to social media systems 110 through the network 108. Moreover, members of the social media systems (such as users 116) can access their respective system 110 through the network 108. As referred to herein, a "member" of a social media system is an end user of the system. Thus, the messages and content created by clients and developers will be generally targeted to social media system members.

As shown in FIG. 1, each social media system 110 includes an application programming interface ("API") 122 that enables embodiments of the present SRM system to interact seamlessly with the social media system. As is understood in the art, an API is an interface that enables the software systems of the social media systems to interact with the software systems of the SRM system. In this way, developers of clients can interact with the SRM system to create advertising content, messages, etc., schedule message delivery amongst many social media systems, and perform other functions without ever directly accessing a social media system. This enables more efficient and centralized management of a plurality of messages across many social media systems. This also enables various contributors with different access levels to coordinate and contribute content to a marketing program based on predetermined settings and rules not necessarily available directly through the social media systems' conventional interface.

In a conventional situation, developers 114 access the social media systems 110 and publish messages/posts relevant to marketing programs on the social media systems. A message may typically include content, such as text, images, video, and the like. Users 116, may reply to the messages, post comments, send messages back to the developer, share messages with other users, etc. The overall purpose of the posts and corresponding user interaction is to create user interest in the marketer's goods or services—similar to traditional advertising. Embodiments of the present system, however, obviate the need for marketers or developers to access marketing programs individually to publish messages. Again, a client is able to manage many different marketing programs, messages associated with those programs, etc., across many different social media systems, or different pages/handles within those systems, all from one convenient user portal. Developers 114 gain access to the SRM 101 through which they can post multiple messages to multiple programs or multiple social media systems 110 at scheduled times or simultaneously. This feature will be illustrated with an example in the following sections.

Developers 114-C for Acme Coffee, a fictitious example company, create one or more marketing programs with one or more corresponding social media pages 118 on the social media systems 110. One social media system, such as system 110-A might carry Acme Coffee's corporate marketing program and two regional marketing programs. Similarly, another corporate marketing program may be active on social media system 110-B. Acme Coffee may want to publish a multimedia message relating to its marketing programs 118 on its corresponding social media system accounts. To do so, the developers 114-C log into the SRM 101 and follow an interactive user interface to create a multimedia message, such as message 120-A. The SRM 101 prompts the developers 114 to either schedule message delivery or publish immediately. The developers 114 may decide to immediately publish on system 110-A, and schedule delivery to the marketing program 118 on system 110-C after two hours (or two days, or three months, etc.). Aspects of the scheduling component of the present system are discussed in greater detail below.

The SRM 101, before delivery, formats the message 120-A according to the destination social media system. For example, the example system shown in FIG. 1 is utilized to create two formatted message copies—one message 120-B compliant with system 110-A and another message 120-C compliant with system 110-B. Subsequently, the SRM 101 saves the formatted messages and delivers message 120-B associated with its respective marketing program(s) on the system 110-A immediately and message 120-C to the system 110-B after the stipulated time. The SRM 101 may notify developers 114 whenever the message 120 is published, or at some time prior to publishing. Moreover, whenever users 116 access the social media system 110, they may be informed of Acme Coffee's publication and can respond to the message, view special offers or coupons, access Acme Coffee's separate corporate web site via a URL, view related multimedia content, etc. The SRM 101 tracks these responses for analysis. These and other features of the SRM 101 will be described in detail with reference to FIGS. 2-10.

Exemplary System

FIG. 2 illustrates an exemplary architecture for an embodiment of the SRM system 101 for managing one or more marketing programs 118 present on multiple social media systems 110 according to embodiments of the present disclosure. As shown, the SRM 101 includes the managing module 102, the marketing program information database 104, and a user interface 201, connected through the Internet 108 to an input module 202 for accepting inputs and displaying system outputs (such as analytics relating to the success of one or more marketing programs and/or individual marketing messages). The managing module 102 further includes a scheduler 204 for scheduling delivery of messages 120, a formatter 206 for customizing message format according to the destination social media system 110, and a publisher 208 for publishing the message on the destination marketing programs 118 at the scheduled time. The managing module 102 may further include a controller 210 that allows collaboration between multiple developers 114, and a moderator 212 to maintain the quality standard of published messages and responses to the published messages. For example, the moderator 212 may scan messages for defamatory or abusive language, names of a particular client's (marketer's) competitors, or embedded URLs, and it then flags any problematic messages, or removes them, or otherwise addresses them as dictated by a system user. The managing module 102 further includes an importer 214 for monitoring and importing message responses from the marketing programs 118 in real time. The importer 214 stores the imported responses in the database 104 for further analysis. Apart from these modules, the managing module 102 may include numerous other modules and databases, which will be described in detail in the following sections.

User Interface and Input Module

The user interface 201 accepts input commands from developers 114, and notifies the developers of system functions related to the input commands. The interface 201 accepts instructions from developers 114 and forwards the instructions to the input module 202 that further utilizes this information. The user instructions may include prompts to login to the system, or other system management instructions, as desired.

Scheduler

The scheduler 204 allows developers 114 to schedule message posts or distribute marketing content with short-term or long term marketing programs. By way of example, the scheduler 204 may allow developers 114 to create multiple messages on a single day and schedule message delivery at precise times in the future. In this way, developers 114 can plan strategies and schedule messages for an entire week, month, or year, etc. in advance. The scheduler 204 operates in conjunction with the publisher 208. The developers 114 schedule message delivery, and the scheduler 204 instructs the publisher 208 to publish the message content to the destination marketing programs 118 at the scheduled time.

The scheduler 204 granularity may be configured as desired. For instance, in some cases, the scheduler 204 may allow developers 114 to select the delivery date; in other cases, the scheduler 204 may allow developers 114 to select both date and time. Further, time selection granularity may also vary. For example, the scheduler 204 may allow time selection from one-hour intervals, half-hour intervals, 15-minute intervals, or some other predetermined arbitrary time interval.

Additionally, the scheduler 204 may repeatedly publish the same message over time. Acme coffee, for instance, may distribute free coffee coupons on the first day of every month. Instead of creating a new coupon every month, a standard coupon may be created once, and scheduled for delivery on the first of every month. Alternatively, Acme Coffee may decide to give away 100 free coffees. In this case, a free coffee coupon may be published every day or every week, until 100 users 116 (i.e., members) respond to the coupon.

Formatter

The formatter 206 ensures that messages adhere to the rules and policies of the destination social media system 110 regarding font size, text type, maximum number of characters allowed, whether multimedia is allowed, and other similar details. Rather than requiring developers 114 to remember such rules, the formatter 206 may allow developers 114 to create a desired message and later check the message for compatibility with the destination media systems. The formatter 206 may subsequently prompt the developer 114 to modify the text according to the rules, automatically modify the text to comply with the rules, or it may automatically ensure corrections, as determined by the system.

Alternatively, the formatter 206 may simply not allow developers 114 to create messages that do not comply with destination system rules. If the character length of certain media system 110 is set to 250 characters, for instance, the formatter 206 may prevent the developer 114 from entering text beyond 250 characters. Similarly, if a certain media system 110 does not allow multimedia messages, instead of permitting the developer 114 to attach media and subsequently informing the developer 114 of the media rules, the formatter 206 may not permit the developer 114 to attach media in the first place, by either hiding or deactivating that option. In one embodiment, if one general message is created for distribution to many different social media systems (each with varying format requirements), then the SRM system may format the message according to each system's requirements, and then prompt the contributor to change or modify the message for each social media system in which the message may be noncompliant.

In addition to rules and requirements mandated by each different social media system, developers 114 or clients may configure rules and thresholds for the different social media systems 110 with which all of the associated developers must comply. The formatter 206 may subsequently assess the messages according to the rules and raise flags, prompt the developer 114 to modify the message, automatically modify the message, or restrict the developers 114 from creating a message that would violate the configured rules.

Further, the formatter 206 may convert any URL that is embedded into a message into a shorter URL. URLs may be shortened for various reasons. For example, for social media systems that impose character limits, adding very long URL links could potentially exhaust valuable message characters. Those skilled in the art will understand that users are more likely to click-through shorter links than longer ones. For these and other reasons, the social relationship manager shortens URLs to a particular format, which redirects the user to the actual URL using a 'Meta Refresh' technology. One advantage of using Meta Refresh to redirect the user to the desired URL is that the user first lands on the link created by the social relationship manager before being redirected to the actual URL. This initial landing allows the social relationship manager to track the number of click-throughs to a site even though the destination URL is not associated with the social relationship manager. Through this tracking, the social relationship manager can gain valuable insights about user behavior, message success, and so on.

According to one embodiment of the present system, the formatter 206 saves the original URL and the shortened URL in a lookup table in the database 104. When a user clicks on the shortened link, the user lands on the short link, and after either a short interval or no interval, the user is redirected to the actual URL.

In yet a further embodiment (and as described in greater detail below), the formatter enables conversion of application media or multimedia content into a format acceptable by a social media system. For example, if a given marketer wishes to post an audiovisual file into personal profile pages (e.g. Facebook® "Walls") of members on a social media system, then the formatter 206 conducts a computer-implemented process to enable such posting. Again, further details are provided below.

Publisher

The publisher 208 receives instructions from the scheduler 204 or directly from the formatter 206 to publish the message associated with its selected destination marketing programs 118 on the corresponding social media systems. As will be understood and appreciated, a message need not necessarily be associated with an overarching marketing program—messages may be separately contained for smaller, "one off" type advertisements. For scheduled messages, message details are stored in the database 104. The publisher 208 retrieves the message along with message details such as an associated marketing program, destination social media system(s), and scheduled delivery time from the database 104 before publishing the message. Moreover, if for any reason, the publisher 208 is unable to publish the message to a particular program, the publisher 208 may generate and circulate an error report to a client and/or its developers. Further, the publisher 208 may be configured to retry publication for a predefined number of times at predefined intervals. The publisher 208 may also be configured to deliver publication notifications to the developer's (or client's) email address, cell phone, or some other delivery mechanism, either before or after publication of the message. It will be understood that other notification techniques are contemplated and within the scope of the present disclosure.

Controller

The controller 210 is utilized to set up collaboration accounts, permitting multiple developers 114 (such as entire marketing team) to collaborate, share, and work together on marketing strategies, campaigns, or even individual messages. For example, in one embodiment, a lead developer associated with a client will control the overall operations of that client's marketing programs, and will correspondingly control access rights and other functions relating to the client's SRM system account. In this circumstance, the lead developer acts as the "client" (e.g., the company) to make decisions regarding the client's marketing efforts on various social media systems. The lead developer with an existing account on the social manager may invite multiple developers 114 to join the team. Upon approval and acceptance of the invitation, new developers 114 may fully participate in development activities. The inviting developer 114 may set access rights for the invited developers 114. For instance, the controller 210 may allow developers 114 to only create; create and edit; or create, edit, and publish, depending on their access rights.

Using the controller 210, team members may set reminders to complete tasks, create marketing calendars, set alerts, edit each other's work, work together on certain messages, or configure notifications for message publication.

Moderator

Because messages are published on social media platforms that are accessible by the general public (i.e., members of those systems), developers 114 cannot always control the content of responses to a message or ancillary comments/posts on the client's social media sites. Thus, it may be important to screen user responses to filter out undesirable language or content. To accomplish that result, the managing module 102 includes a moderator 212, which screens responses to published message and filters content. For example, the moderator 212 may filter abusive words, competitor names, racist language, sexist terms, links, images, videos, audio and any other content deemed undesirable. The moderator 212 performs this function by comparing each response with a database 104 of prohibited words, specially-identified content items, etc., which are updated at regular intervals. The parsing techniques are known to the art and may be used if desired. If the moderator 212 identifies any message with a prohibited word, the moderator 212 may flag the message and notify the developer 114 for action. Alternatively, the moderator 212 may automatically remove the message from the marketing program 118 and send a notification to the developer 114. The developer 114 may consequently decide whether the message should be permanently deleted or reinstated. The filtered content may include URLs on a "no-show" list, where users placed on a "banned" list of persons identified as posting undesirable content.

In addition to harmful content, the moderator 212 may also scan messages for good content, such as praise of client products, interest in specific products, or service appreciation. These messages may also be flagged. Developers may utilize this information to distribute incentives, or loyalty coupons to such users 116. Moreover, these messages may also be utilized to improve product lines, etc.

Importer

The importer 214 extracts information from member/user responses to the messages associated with marketing programs 118 on the social media systems to perform various analytic functions, generate metrics, and provide reports. Obviously, such members have to subscribe to a specific group or channel to receive such messages. As recited previously, a group or channel is a social media page or account that includes members having related interests. In one embodiment, the importer 214 monitors the marketing pages and extracts any responses to a published message. In another embodiment, in which messages (including those containing interactive multimedia content) are published directly on members' social media system accounts or profile pages (e.g., Facebook® "Walls"), the present system enables data collection from those members via the published content. For example, if an interactive poll is posted on a member's profile page (e.g., "Wall"), the member's response may be automatically directed back to the SRM for review by the marketer. Further, the marketer can request (and receive) member-specific information such as the member's email address, contact information, buying preferences, and the like. In yet another embodiment, the overall goal of the member responses and corresponding analytics is to determine the relative success of various marketing programs and messages, and identify helpful information regarding marketing of the client's products.

The importer 214 may also maintain a tracker for counting useful numbers, such as the number of message replies, plays, and the like. This information can serve as inputs to various analytical programs known to those in the art. Further, the actual messages may also be extracted and stored in the database 104 for analysis. Users 116 may present recommendations, suggestions, or interests, and that input will be useful for generating future marketing strategies. Reports, such as interactive charts, and graphs, can be generated on a planned or ad hoc basis.

Moreover, the importer 214 extracts performance information from the marketing programs 118 as a whole or overall, such as the number or fans or followers, as well as new requests and program activity. Based on this information, developers 114 may set alerts for event notification, such as a sudden change in the fan base.

Database Schema

The database 104 stores information about clients, their marketing programs 118 and the associated information, such as published and unpublished messages, and the program metadata, such as the identity of developers 114 and the like. The database also stores message detail information, contributor information, marketing program metrics, and other similar types of information. The database 104 may be refreshed in real-time by the other modules and stale data may be purged as desired. FIG. 3 illustrates an exemplary database schema 300, which may store data in a relational fashion. A typical relational database includes multiple data tables that include pertinent information, each table to which other tables can link. FIG. 3 illustrates some exemplary tables that may be present in the database 104. It will be understood, however, that the number of tables, as well as the data fields and the relations among them may vary depending on the particular embodiment.

The schema 300 includes a master client table 302, which catalogues the active clients 106. This table typically includes unique client IDs, and other useful client details. It will be appreciated that other fields may also be contemplated, within the scope of the present disclosure.

The client table 302 may be associated with one or more marketing program tables, such as marketing program table 304. The database 104 may maintain separate marketing program tables 304 for the clients, or it may store marketing program details in one large table. Here, the schema 300 illustrates a larger table caching details of active marketing programs 118. Some exemplary data fields in this table include unique program IDs, program name, associated social media system, date of activation, date last updated, number of active followers, fan, or members, program description, etc. This table 304 in turn may be associated with a number of message tables 306. The database may maintain separate message tables 306 for each marketing program 118, or may store messages pertaining to a client in one single table. This table 306 stores information relating to individual messages, such as unique message IDs, message titles, message description, message type, creation date and time, publication date and time, targeted geographical region, embedded URL, author, message content, type of message content, associated converted content etc. Other data fields may also be contemplated, such as count of responses, likes, comments, shares, and plays, flags; response messages; or number of revisions.

In addition to these tables, the database 104 may include other tables and data fields that the managing module 102 may utilize in certain embodiments. The database 104, for instance, may include a table, such as format table 308 that stores information about different formatting standard rules and policies adopted by the active social media system 110. Exemplary fields of this table may be social media system ID, social media system name, required format, best practices, etc. The database may incorporate another table that maintains information about the active developers for the marketing programs 118. Typical fields in this table (table 310) may be user ID, first name, last name, username, password, email address, phone numbers, social media profiles, access permissions, and other such developer related fields. Further, the database may include a table that stores analytics and information relating to social media system member interaction with messages and marketing programs such as number of responses to a message, number of likes, shares, click-throughs to linked pages, etc. As will be understood and appreciated, some "responses" to messages will include social media-specific responses, such as the "like" or "share" option offered by Facebook®. A few exemplary fields are illustrated in table 312 in FIG. 3.

It will be understood that the database 104 may maintain numerous other tables not illustrated here. For example, a table that stores alerts, reminders, and triggers for a certain marketing program or client may be present. Similarly, the database 104 may maintain a table for shortened URLs and their corresponding actual/longer URLs. As will be understood and appreciated, the specific tables and corresponding data items shown in FIG. 3 are presented for illustrative purposes only, and other types of data as will occur to one of ordinary skill in the art may be utilized according to various embodiments of the present system.

The database 104 may be updated in real time or on an intermittent basis. As will be further understood, the specific database shown and described is intended to be illustrative only and actual embodiments of the SRM 101 may include various database structures, schemas, etc.

Exemplary Method(s)

The following sections describe exemplary methods for carrying out one or more embodiments of the present disclosure. The methodology described herein is generally intended to describe various features and functionality of various system components described previously. The order in which the methods are described is not intended to be construed as a limitation and any number of the described method steps can be combined in any order to implement the method, or an alternate method. Additionally, individual steps may be deleted from the methods without departing from the spirit and scope of the subject matter described herein. Furthermore, the method can be implemented in any suitable hardware, software, firmware, or combination thereof.

FIG. 4 illustrates an exemplary method 400 for managing one or more marketing programs 118 on multiple social media systems 110. The method begins at step 402 where a client 106 representative (such as a lead marketing developer) accesses one or more marketing programs 118 present on multiple social media systems. A developer 114 may log into the SRM 101 via the user interface 201 by providing identification details. FIG. 5 illustrates an exemplary "login" or user identification screen, which requests developer information. The developer 114 may directly log in using a username (or email address) and a password, or through their social media system credentials.

The marketing programs 118 may already exist, or the client may create these programs as required. According to one embodiment, "creation" of a marketing program simply represents the designation of basic information about a marketing campaign, such as a name, duration, etc. Once the required marketing programs 118 are created, upon authorization, the developer 114 adds or activates the marketing programs 118 on the SRM 101. FIG. 6 illustrates an exemplary marketing program addition screen. Developers may access their marketing programs to authorize access rights for the given program. Authorization and addition of the marketing programs onto the SRM 101 allows the SRM to publish messages in connection with the program, monitor the program, and extract information about the program as required. As will be understood and appreciated, according to one embodiment of the present system, step 402 in FIG. 4 is optional, and an ovearching marketing program need not be created for all message content to be delivered to various social media systems. For example, a marketer/client/developer may wish to simply post a singular message not associated with an overall marketing program to one or more social media systems. In this case, the message is simply created individually, and is not associated with a marketing program.

Once the desired marketing programs are added, a homepage greets the developer 114. FIG. 18 illustrates an exemplary SRM system homepage screen 1800. FIG. 21A and FIG. 21B illustrate alternative embodiments of SRM homepage screens 2100A and 2100B. From the home screen, the developer 114 may view multiple items such as published or unpublished messages, flagged responses, message calendars, reminders, tasks due, active marketing programs, or lists of associated developers. In addition, the developer 114 may perform actions such as create a message, change access rights, preview messages, modify unpublished messages, create graphs, and other such management specific actions. As will be understood and appreciated, the homepage 1800 acts as a starting point for managing messages and marketing programs for a client's social media system advertising.

At step 404, the user (i.e., developer) creates a message for use in connection with one or more destination marketing programs 118 to be eventually displayed on one or more social media system portals to social media system members. To create the message, the developer 114 first to logs into the user interface 201, and instructs the user interface 201 to display a message creation interface, or a message modification interface. The message creation interface may include drop down menus, service buttons, or may require the developer to type in a query or response. FIG. 7 illustrates an exemplary message creation interface screen. FIG. 8, FIGS. 10-12, and FIGS. 22-24 show further details and aspects of a message creation screen. The developer 114 may enter text (block 702), embed a URL (radio button 704), or add media (radio button 706), such as images, video, audio, coupons, polls, and others (described in greater detail below in connection with FIGS. 19-31). Further, the developer 114 may select destination marketing programs 118 from a list of active destination programs (radio button 708). In this way, a developer can select a message to be delivered in connection with a marketing program that spans many different social media outlets, all from a singular location. Further, marketers can post messages directly into the social media system member profile pages, assuming those members have enabled such access to the marketer. Additionally, marketers can publish messages into the pages associated with a group or channel, which eventually gets published into members' profile pages (e.g., Facebook® "Walls") affiliated with the group or channel. The interface 201 may also allow developers 114 to alter, modify, or enter new text depending on the destination social media system 110. If, for example, one social media system 110 is more informal than the others, developers 114 may alter the message content to create an informal message. Or, for example, if a given social media system has a character limit on the number of text characters that can be displayed in connection with any one message, the message creation interface 700 may display a "char left" indicator showing how many characters the message has left until it reaches its limit.

At step 406, the user schedules message delivery (e.g., screen shown in FIG. 8). The developer 114 may schedule delivery at a predetermined time or publish immediately. Moreover, the scheduler 204 may permit scheduling different delivery times for the destination marketing programs 118 or the destination social media systems 110. Alternatively, the scheduler 204 may permit developers 114 to configure one delivery time to publish the message on the social media systems. The scheduler 204 may also schedule repeated delivery of a message if desired.

The method proceeds to step 408 where the formatter 206 customizes the message format according to predefined rules corresponding to the destination social media system 110. As described previously, social media system 110 messages may vary based on required standards, such as rules, policies, and formats. For example, such rules or policies include character limits on messages, content requirements, prohibitions on certain types of multimedia content, formatting issues, etc. In addition to these standards, different social media systems 110 may possess unique characteristics; for instance, users of some systems may be accustomed to communicate through short, witty, one-liners (e.g., Twitter®), while users of other systems may be comfortable with longer and fuller messages (e.g., Facebook®), and others may be familiar with formal or professional messages (e.g., Linked In®). In order to publish the most effective messages, in addition to the required standards, developers 114 may also be aware of these system specific nuances and characteristics. The formatter 206 aids developers 114 to publish the most appropriate message for a particular destination social media system 110, by prompting developers 114 to modify messages or by automatically editing messages according to configured rules. The formatter 206 may, for instance, prompt the developer 114 to change the message tone for a particular destination system 110. Alternatively, the formatter 206 may remove attached media from a message if the destination system 110 does not allow multimedia messages. Functionality of the formatter 206 will be described in detail with reference to FIG. 13.

At step 410, the customized message is published on the selected destination social media systems in connection with the corresponding marketing programs 118 at the scheduled time. The publisher 208 may utilize one or more publication techniques, such as interfacing with each social media systems' API to publish the message according to the social media system's protocols and requirements. Moreover, it will be understood that other message publication methods, known in the art, are not beyond the scope of the present disclosure.

Finally, at step 412, the importer 214 may monitor the social media systems for responses to the published messages. The responses may be extracted and stored in the database 104 for analysis. FIG. 14 illustrates these monitoring, tracking, and analyzing functions of the SRM 101 in detail.

FIG. 9 illustrates an exemplary method 900 for creating a message, and FIGS. 7 and 10-12 illustrate exemplary message creation screens. At step 902, the input module 202 determines whether the developer 114 has inserted text. If yes, the method proceeds to step 904; else, the method proceeds to step 906. At step 904, while the developer is entering the text or at a later time (such as before publishing, before scheduling, or immediately after the developer has finished entering the text), the formatter 206 checks whether the message is compatible with the destination social media system's format requirements. If the text adheres to the desired text format, the method proceeds to step 908, else at step 910, the formatter 206 prompts the developer 114 to modify the text in accordance with the format, or automatically modifies the text message according to predefined rules.

The user interface 201 may have different text boxes for different social media systems 110 (as shown in FIG. 7). Alternatively, the user interface 201 may include dropdown menus or checkboxes for selecting the social media systems 110 for which the developer 114 wishes to modify the message. Here, when the social media system 110 is selected, the user interface 201 may open additional text boxes for message alteration. In some embodiments, the developer simply creates a single message for publication on various social media systems, and the SRM system formats the message according to predetermined specifications for each social media system's requirements (i.e., the developer does not create separate messages for each social media system).

At step 908, if the developer 114 does not wish to modify the text message for other destination systems 110, the method proceeds to step 906. Alternatively, if the developer 114 wishes to modify the message for a particular social media system 110, the method 900 proceeds to step 912, where the user interface 201 prompts the developer 114 to insert/modify the text message (as shown in FIG. 7). Next, the formatter 206 checks the text format at step 914. If the format is not correct, the formatter 206 modifies the text at step 916; else, the method goes back to step 908, where the developer 114 may be prompted to include text for the next social media. This process continues until the developer 114 has created or modified messages for all desired social media systems 110.

At step 906, the developer 114 determines whether to insert a URL. If yes, the developer 114 simply embeds the URL, at step 918, as depicted in FIG. 10. If not, the method proceeds to step 920, where the developer 114 decides to add media to the message. FIG. 11 illustrates user interface 201 that permits the developer to select media from multiple media options including images, videos, audio, coupons, forms, banner advertisements, polls, custom media content etc. (as discussed and shown in greater detail below in connection with FIGS. 19-30). Further, a tab, an icon, a dropdown menu, or any other such graphical tool may represent the media options. On selecting a particular media option, the developer 114 may be presented with available media files in that category. Moreover, the developer 114 may be allowed to add new files to the selected media by browsing through files present on the developer's 114 system, server, external drive, or other such system, or by directly browsing through the Internet 108. Multiple files and multiple media types may be added to the message at step 922 (again, as described in greater detail below).

At step 924, the user/developer proceeds to select destination marketing programs 118. FIG. 12 illustrates an exemplary program selector screen 1200. As mentioned previously, marketing programs are high-level categorical delineations used to categorize and group a number of advertising messages associated with each program. Users 116 may select one or more active destination programs for publication. Next, the method proceeds to step 926 where the developer 114 selects between publishing instantaneously or at a scheduled time. If the developer decides to schedule delivery (step 928), the user interface 201 may allow the developer 114 to set schedule times for the marketing programs 118 individually. Alternatively, the scheduler 204 may allow the developer to select one scheduled time to deliver the message to all destination marketing programs 118 (as shown in FIG. 15). Once the message is scheduled, the message is saved at step 930. If the developer 114 wishes to schedule message delivery to individual destination programs, steps 928-932 are repeated for the selected marketing programs 118. If the developer 114, on the other hand, decides to publish instantly (yes path from step 926), the message is published (step 932) and saved (step 930). As will be understood and appreciated, marketers can post messages directly into the social media system member profile pages, assuming those members have enabled such access to the marketer. Additionally, marketers can publish messages into the pages associated with a group or channel, which eventually gets published into members' profile pages (e.g. Facebook® "Walls") affiliated with the group or channel.

FIG. 13 is a flowchart illustrating an exemplary method 1300 for customizing a message according to a destination social media system 110. The formatter 206 may be invoked at a number of times to customize or format the message. In some cases, the formatter 206 may be invoked at the same time the message creation/modification interface is activated. In this manner, the formatter 206 may alert the developer 114 while the text is being created, for example, the formatter 206 may count text characters and alert the developer 114 when the text characters exceed the limit for the specific social media system 110. In other cases, the formatter 206 may be invoked once the message is completed, or before publication. If a message includes a URL and exceeds the word limit by five characters, instead of deleting the last five characters of the URL, the formatter 206 may delete the end of the text just before the URL.

At step 1302, the formatter 206 retrieves rules and policies associated with the selected destination social media system 110. These rules may include format standards required by a particular system and flexible best practices. These factors may be updated at regular periods with advances in technology, social behaviors, and platforms. Moreover, developers 114 may set their own rules to improve messages. For example, a developer (or other client member) may utilize the formatter 206 to create a list of words or other content that are used to screen message tone and content before publishing.

At step 1304, the formatter 206 retrieves the message and subsequently checks if the message includes text at step 1306. If yes, the method proceeds to step 1308, where the formatter 206 determines whether the text is compatible with the defined text rules and standards; else, the method proceeds to step 1310.

At step 1312 (no path from step 1308), the formatter 206 either prompts the developer 114 to modify the text, or modifies the text automatically according to predetermined rules. Once, the text is compatible, the method proceeds to step 1310, where the formatter 206 checks whether the message is a multimedia message. If yes, the formatter 206 checks whether the selected social media system 110 permits multimedia messages at step 1314. In case the selected social media system 110 allows multimedia messages, the method proceeds to check whether another social media system 110 is selected for message delivery. If a certain social media system 110 does not allow multimedia messages, the formatter 206 removes media from the message and saves the message at step 1316. As described in greater detail below, in some system embodiments, marketers can post messages containing application media or multimedia content directly into the social media system member profile pages, assuming those members have enabled such access to the marketer, even when a given social media network has strict policies and protocols for posting such messages. Additionally, marketers can publish messages into the pages associated with a group or channel, which eventually gets published into members' profile pages (e.g. Facebook® "Walls") affiliated with the group or channel. Next, at step 1318, the formatter 206 may create a separate page for the complete multimedia page and the page's URL may be added to the text message. In this manner, developers 114 may display multimedia messages on systems that do not permit multimedia messages. When a user 116 selects the embedded link on the destination system 110, the user 116 will be redirected to the complete multimedia message on a separate page. Users 116 may post comments and responses to the complete message from the redirected page directly.

At step 1320, if multiple destination systems are selected, the method returns to step 1302 and the process is completed for the next system 110, else the formatter 206 saves changes to the message and exits.

FIG. 14 is a flowchart illustrating an exemplary method 1400 for analyzing message insights according to some embodiments of the present invention. As described with relation to FIG. 2, the managing module 102 includes an importer 214 and moderator 212, which along with the controller 210 help analyze responses to published messages. Responses include replies, likes, shares, posts, messages, emails, clickthroughs to embedded URLs, etc. Responses may also include information provided by consumers such as content information, preferences, opinions, and the like along with consumer email addresses, time when response was sent and other useful analytics. The SRM 101 analyzes these responses and provides the information to marketers to improve their marketing strategies, as such responses indicate consumer interest in various products, relative success of types of marketing strategies or messages, and other helpful information.

The method begins at step 1402, where the importer monitors active marketing programs 118. The first step is a continuous step that loops continuously, unless the importer is instructed to stop monitoring. If the importer 214 detects any responses at step 1404, the corresponding response counter is incremented at step 1406.

Embedded URLs are shortened using the "Meta Refresh" technology that first brings the user 116 on the shortened URL webpage, and after a short or no interval, the webpage is refreshed and the user 116 is redirected to the original web page. This redirection through the shortened URL allows the importer 214 to track any click throughs. When a user 116 clicks on the shortened URL, the user 116 first lands on an SRM 101 generated URL, where the number of visits can be recorded. As will be understood and appreciated, embodiments of the present system are not limited solely to use of the known "Meta Refresh" technology to shorten URLs, and other such technologies and methods are used in various embodiments as will occur to one of ordinary skill in the art.

At step 1408, the importer 214 extracts any text responses from the marketing programs 118 and stores the responses in the database 104 for further analysis. Next, the moderator 212, at step 1410, inspects the stored responses. As described previously, the moderator 212 may incorporate multiple message screening word lists (e.g., screenshot FIG. 15), such as abusive language lists, competitor names lists, etc. At step 1412, in case the message text matches with any word in the screening word list, the message is flagged. Moreover, the moderator 212 may check messages for embedded URLs. The message is automatically flagged if the message includes any URLs. FIG. 16 illustrates an exemplary moderation screen 1600 depicting flagged messages.

The moderator 212 may be programmed to take any suitable action against flagged messages at step 1414. For example, on selecting any flagged message, such as message 1602, a new screen (FIG. 17) opens that allows the developers 114 to delete the original message on the marketing campaign, notify the associated developers 114, store the message in the flagged repository, or a combination of these.

If no detrimental issues were uncovered during the moderation, the message is not flagged, but saved in the database 104 for further analysis at step 1416. Here, messages or response counter information from the marketing programs 118 may be collected to generate statistical reports, interactive charts, and drill-down graphs that depict the success or failure of a message to compel users 116 to respond.

Alternative Exemplary Embodiment

As recited previously in this disclosure, embodiments of the present SRM system 101 include functionality for posting or publishing marketing messages 120 to various social media systems 110. An additional system embodiment (described in greater detail below) enables publishing of application media to social media systems, either alone or in connection with a marketing message. As mentioned above, "application media" generally refers to media content with which a user (e.g., SMS member 116) may interact. Examples of application media include online quizzes, polls, electronic games, and other media types in which a user may view information relating to the application media, provide information to or interact with the media, and view subsequent or additional content in connection with the media. For example, in the case of a poll, a SMS member may view poll questions, select a particular answer, and view poll results provided by other members. Further, a user (member) may provide information in fields displayed within the application media, such as the user's contact information, opinions, preferences, and the like, and such information is collected and stored by an embodiment of the SRM for subsequent use. As recited previously, application media may be contrasted to conventional multimedia content, such as videos, audio files, static graphic images, and the like, because such multimedia content does not enable rich interaction between the content and an end user (member). It will be understood and appreciated that some forms of multimedia that enable dynamic user interaction may also be classified as application media.

Conventionally, it has been difficult (or impossible) to readily publish various forms of application media to social media systems 110. This is generally because most social media systems incorporate strict protocols and formatting requirements that restrict or prevent certain types of content from being inserted or published to their respective sites. Embodiments of the present system 101, however, include functionality that enables application media to be easily developed, configured, and published to respective social media systems by overcoming many of the protocols and formatting requirements present in many social media systems.

Turning again to the figures, FIG. 19 (represented herein by FIGS. 19A and 19B), illustrates an exemplary process 1900 for creating application media for inclusion in a marketing message 120 to be displayed to social media system members 116. As recited below, the actions performed in process 1900 are generally performed by an embodiment of the SRM 101 in response to receipt of information from a marketer 106 or developer 114 that wishes to create application media within a marketing message. As will be understood and appreciated by those of ordinary skill in the art, the steps and processes shown in process 1900 are presented for illustrative purposes only, and are not intended to limit the scope of the present disclosure in any way.

Beginning at step 1901, an embodiment of the SRM 101 receives information from a marketer 106 or developer 114 corresponding to the marketer's request to create and/or insert application media into a marketing message. The request may come in the form of a marketer selecting an "ADD APPLICATION MEDIA" button in a message creation interface, or by a marketer simply accessing an interface page that enables creation of application media, or by some other similar action. At step 1903, an embodiment of the SRM 101 displays various application media categories to the marketer (see, e.g., region 2202 in FIG. 22). As described previously, the displayed application media categories may include customizable quizzes, polls, marketer coupons, interactive games, or other similar media types. The application media categories may also include a custom media category, in which a marketer can provide custom-generated application media to the SRM 101 for inclusion in a marketing message.

At step 1905, the SRM 101 receives selection from the marketer of a particular application media category or type. This selection may comprise a marketer "clicking" on an image of an application media type within a user interface, or selecting a marketing type from a dropdown menu, or typing the name of a particular media type, or otherwise selecting a media type via some other conventional selection mechanism. Once a selection of a particular application media category is received by the SRM 101, the system displays pre-stored application media to the marketer (step 1907) (see, e.g., FIGS. 22-24). The pre-stored media may include previous application media files that were generated by the marketer 106 or other developers 114 within the marketer's organization. The pre-stored media may also include default media types provided by an embodiment of the SRM. As will be understood and appreciated, a marketer or developer may choose to utilize a pre-stored application media file to streamline the marketing message creation process and avoid creation of an entirely new application media file.

Still referring to FIG. 19, at step 1909, the SRM determines whether the given marketer or developer has selected pre-stored media for inclusion in a marketing message. If not, and instead the marketer has indicated a request to create a new application media file, then the embodiment of the SRM initiates and runs an application media configuration program for the application media type selected at step 1905 (step 1911). In one embodiment, the application media configuration program is a generic application media template that requests certain application-specific information from a user (marketer) to generate a specific application media file (described in greater detail below). In one embodiment, this generic application media template comprises a proprietary algorithm with specific instructions and requests for information for a given application media type.

At step 1913, the SRM receives information from the marketer or developer relating to application media specifics or preferences. For example, assuming the application media type is a poll, the marketer may provide information corresponding to a question for use in the poll, possible answers for display in the poll that may be selected by SMS members, whether the poll will include more than one question, whether the poll will include dynamic text, an image or audio file to be displayed during member interaction with the poll, and various other types of information. After receipt of this applications-specific information from an advertiser, the SRM system stores the application media information as a unique application configuration file in a database 104 (step 1915). In one embodiment, the unique application configuration file includes information corresponding to the unique instance of the application media the marketer has created. In one embodiment of the present system, the unique application configuration file is stored as an extensible markup language (XML) file, as this type of file is easily usable and manipulable by other subsequent programs. In other various embodiments, the unique application configuration file comprises a hypertext markup language (HTML) file, or other similar type of file.

Still referring to FIG. 19, at step 1919, the marketer 106 is prompted by the SRM 101 regarding whether the marketer wishes to insert the application media into a marketing message. Referring previously to step 1909, if a marketer indicated that he or she desired to use pre-stored media (as opposed to creating a new application media file), then the SRM retrieves the selected, pre-stored application configuration file (e.g., XML file) that corresponds to the pre-stored media selected by the marketer, and also proceeds to decision step 1919. At this stage, if a marketer wishes to insert the application media (either pre-stored or newly-created) into a marketing message, then the SRM receives from the marketer (or retrieves pre-stored) additional message information (step 1921) (see, e.g., FIGS. 7-12 and corresponding discussion regarding message creation). As mentioned above, this additional message information may include a name for the message, text to be included in the message, expiration dates for the message, a URL to be included with the message, multimedia to be attached to the message, and the like. If a marketer or developer does not wish to insert the application media into a marketing message at this time, then process 1900 ends, and the unique application configuration file is stored in a database 104 for subsequent use.

Assuming a marketer does desire to insert application media into a marketing message, at step 1923, the SRM associates the received (or retrieved) additional message information and the unique application configuration file with a unique marketing message file in the database 104. In one embodiment, the marketing message file comprises a metadata document that includes a collection of information and instructions that relate together all of the data and information for a particular marketing message. As will be understood and appreciated, embodiments of the marketing message file are not limited to metadata documents, and other types of files may be used as marketing message files as will occur to one of ordinary skill in the art. If the marketer wishes to publish the marketing message at that time (step 1925), then the SRM provides the unique marketing message file (e.g., metadata document) for the unique instance of the particular marketing message to respective social media systems (SMS) for insertion into SMS profile pages (e.g., Facebook® Walls), accounts, displays, and the like according to marketing message criteria and specifics. As described elsewhere herein, to publish the marketing messages the respective social media systems read the metadata document (or other marketing message file type) and execute instructions contained within the marketing message file to display the marketing message on their respective social media platforms.

Reference will now be made to FIG. 32, which illustrates a process 3200 for displaying application media to SMS members 116 within a respective SMS page, profile, or account. It should be noted that although FIG. 32, represented herein by FIGS. 32A and 32B, is the last figure shown in the present disclosure, it will be discussed currently for ease of reference and to clarify the understanding of the present system. Starting at step 3201, a marketing message file (e.g., metadata document) corresponding to a specific marketing message (including application media information) is published to a respective SMS 110. Once published, certain content associated with the marketing message is displayed to SMS members 116 via their respective SMS profile pages or accounts, or those pages or accounts for groups or channels for which the SMS members are subscribers.

One exemplary type of content that is displayed to SMS members is a "starter image" or other indicator that enables a SMS member to launch application media. If a SMS member clicks or interacts with a starter indicator, the respective SMS receives this request as request information indicating a desire to view and/or interact with application media (step 3203). If such a request is received, a universal resource locator (URL) for an application media container file is loaded to retrieve application media content (step 3205). In one embodiment, the application media container file is a Shockwave/Flash file (SWF file), which enables transmission of various types of content. As will be understood and appreciated however, embodiments of the present system are not limited to use of SWF files, and various other files types may be used to accomplish the functions of the present system. In one embodiment, the URL for the application media container file is associated with the marketing message file, and member interaction with that file causes loading of the URL.

Still referring to FIG. 32, once loaded, the application media container file retrieves and loads the respective unique application configuration file (e.g., XML file) for the associated application media content (step 3207). In one embodiment, use of an application media container file enables retrieval and display of application media content to SMS members on SMS platforms that would not otherwise support such content. At step 3209, the application media container file identifies the application media type for the specific requested application media based on media type information included in the unique application configuration file. This identification causes the SRM to retrieve a secondary application module file (e.g., another SWF file) for the identified application media type (step 3211), apply the unique application configuration file to the retrieved application module file (step 3213), and, based on information in the unique application configuration file, transmit information in the application module file to the respective SMS for display to SMS members (step 3215). In one embodiment, the secondary application module file includes specific instructions and/or information for a given application media type, which enables display of that particular type of application media to SMS members.

After the application media has been presented or displayed to an SMS member via the member's social media system profile page, account, or the like, a member may interact with the application media. In one embodiment, such interaction includes providing information about the member, such as contact information, opinions, preferences, or the like. In another embodiment, such interaction includes clicking various application media features, playing an application media game, and various other types of interactions. If a member interacts with application media (step 3217), then information about that interaction is received at the respective SMS and is transmitted back to the SRM 101 for storage, analysis, and reporting to the marketer 106 (step 3219). As described in greater detail elsewhere herein, this application media interaction information (such as member contact information, member opinions, etc.) can be used by marketers to update or improve their marketing programs, products, and the like. If a SMS member does not interact with the application media (e.g., ignores it), then process 3200 ends.

As described above in connection with FIGS. 19 and 32, an embodiment of the present system enables creation and display of various types of application media to social media system members. As will be understood and appreciated, however, such display is not limited to application media, but may also include conventional multimedia as well. For example, if a marketer 106 wishes to utilize a "custom" media category, and provides a conventional video or audio file for use as media to be inserted into a marketing message, then embodiments of the present system may still use application media container files to display that content to SMS members (and thus overcome potential formatting restrictions inherent in a given social media system).

FIG. 20 is a sequence diagram illustrating the steps involved in the interactions between various components of the system, according to an exemplary embodiment of the present system. As explained in greater detail below, the components of the system are the elements involved in the creation, execution, display and subsequent consumer data collection (and evaluation of the effectiveness of a marketing program) in connection with a marketing message containing application media. Starting at step 1, a marketer 114 (or 106) initiates a marketing campaign by logging on (see FIG. 5) SRM 101 from a computer or smartphone device and creating messages containing application media (see FIGS. 5-12, 21-25 for illustrations, and FIG. 19 for a detailed flowchart and discussions) targeted for delivery at a particular time, location, or demographic to consumers or members 114 of a social media system 110. At step 2, SRM system 101 generates a unique application configuration file from a message 120 created by a marketer 114 and stores it in SRM database 101. In one embodiment, the unique application configuration file includes information corresponding to the unique instance of the application media a marketer has created. In one embodiment of the present system, the unique application configuration file is stored as an extensible markup language (XML) file, as this type of file is easily usable and manipulable by other subsequent programs and systems. In other embodiments, the unique application configuration file comprises a hypertext markup language (HTML) file, or other similar file formats.

At step 3, SRM system 101 associates the unique application configuration file with a unique marketing message file in the database 104 and provides this marketing message file to a respective social media system 110 (e.g., Facebook®). In one embodiment, the marketing message file comprises a metadata document that includes a collection of information and instructions that relate together all of the data and information for a particular marketing message. At step 4, the respective social media system reads the metadata document (or other marketing message file type) and executes instructions contained within the marketing message file and caches information in its servers for faster access and delivery prior to displaying the marketing message on their respective social media platforms. At step 5, the respective social media system publishes the marketing message (including accompanying application media or multimedia content) on the profile page or accounts of members or consumers who subscribe to a specific group or channel affiliated with the marketer (see FIGS. 26-29 for exemplary screenshots). Social media system friends of such a consumer who may not subscribe to this group or channel are able to view and appreciate such interaction.

At next step 6, consumers initiate interaction (without having to leave their social media system profile page or account) with the marketing message containing application media by clicking on some type of content associated with the message. One exemplary type of content that is displayed to SMS members is a "starter image" or other indicator that enables a SMS member to launch application media. If a SMS member clicks or interacts with a starter indicator, the respective SMS receives this request and transmits this request at step 7 to SRM 101 by retrieving and loading a universal resource locator (URL) for an application media container file from SRM database. In one embodiment, the application media container file is a Shockwave/Flash or "small web format" file (SWF file), which enables transmission of various types of content. As will be understood and appreciated however, embodiments of the present system are not limited to use of SWF files, and various other files types may be used to accomplish the functions of the present system.

Still referring to FIG. 20, next, at step 8, the application media container file retrieves and loads the respective unique application configuration file (e.g., XML file) that identifies the associated application media instance. This identification causes the SRM 101 to retrieve a secondary application module file (e.g., another SWF file) at step 9 for the identified application media instance, and apply the unique application configuration file to the retrieved application module file. At step 10, SRM 101 transmits information in the application module file to the respective SMS for display to SMS members' profile pages or accounts. Accordingly, the respective SMS displays this information at step 11, which hence enables members or consumers to interact with this message at step 12. In one embodiment, such interaction includes providing information about the member, such as contact information, opinions, preferences, or the like. In another embodiment, such interaction includes clicking various application media features, playing an application media game, participating in a poll and various other types of interactions. If a member interacts with application media, then information about that interaction is transmitted (at step 13) by the SMS and collected at SRM 101 for storage, analysis, and reporting to the marketer 106 or 114. As will be understood, if a SMS member does not interact with the application media (e.g., ignores it), then no action is taken by the system in that case. Eventually at step 14, marketers 106 or 114 can log in SRM and extract analytics of the consumers' interactions with the marketing program (see FIGS. 30, 31).

In the following discussion, exemplary screenshots are shown in connection with the developer 114 of a fictitious company Acme Coffee that is promoting a fictitious local band, The John Benjamin Band, by publishing a message 120 for its consumers 116 on the band's social media profile page. In the example screenshots, a fictitious social media system 110, Eye Text is shown.

FIG. 21A and FIG. 21B illustrate exemplary screen views 2100A and 2100B of an embodiment of the SRM 101 that are visible to a developer 114 for message creation (see additional FIGS. 9, 13, 19 for detailed flowcharts), message review summary and analysis purposes. Referring first to FIG. 21A, the region 2101 shows the name of the company, next to a field "ACCOUNT", which in this example is Acme Coffee. In this exemplary interface, there is a drop down menu 2102 which shows the destination marketing program 118, named as "TESTAPP" in this example. Next to menu 2102 is status button 2104 which can be selected to indicate the view corresponding to the status of the messages 120 that have been published or, are yet to be published. Tabs 2110 and 2112 are for the purpose of moderating a message 120 (refer to FIG. 16 for an exploded view) and creating a new message or post 120 (refer to FIGS. 7, 9 and others for an exploded view) respectively. Region 2114 can be expanded to reveal a summary of the post 120 that is highlighted in region 2113.

In FIG. 21B, the region 2114 has been expanded to reveal a summary of this post for review. This figure reveals a summary of an exemplary published message 120, associated with an exemplary report name "GOOGLE".

FIG. 22 illustrates an exemplary message creation screen 2200 for inserting a video into a message 120. At the top of the screen 2200, option box ("ADD A LINK/CAPTION") 2201 enables a marketer to select whether he or she wishes to provide a web link, or, add a caption to this video (e.g., as shown in FIG. 10). Region 2202 ("ATTACH MEDIA TO THIS POST") displays several icons for choosing different categories of application media or multimedia content, such as polls, videos, coupons, audio, etc. and even, custom application media in a format compatible with the social media network 110. In this example, region 2202 reveals that an icon showing a video camera has been highlighted in the screen 2200, indicating that the application media selected is a video. Region 2203 shown below a "VIDEO" field displays pre-stored videos available to a developer 114 based on videos stored in a marketing program information database 104. The number six (6) is reported next to the "VIDEO" field to indicate that there are six (6) pre-stored videos available for developers 114 of Acme Coffee in the SRM database 104. As shown, these videos are displayed as thumbnails for selection by a developer or marketer. However, as will be understood and appreciated, any conventional video display mechanism can be used for region 2203, such as drop down menus, etc. As shown in this example, "VIDEO 3" is selected in region 2203. In the embodiment shown, when a video is selected, it is displayed in region 2214 for preview. As will be understood by a person of ordinary skill in the art, such a preview on a miniature frame is associated with a play/pause button and a volume bar. In the embodiment shown, the duration of the video in region 2214 is indicated next to a volume bar and there is an option to replay that video as well. If developer 114 wishes to upload a new video from developer's computer or smartphone into the SRM database 104, "ADD NEW VIDEO" button 2207 provides such functionality. On clicking button 2207, a clickable selection box is displayed (not shown here) which allows to browse and choose a video file from a location in the developer's computer or smartphone. Because the same message 120 can be scheduled to be published at different times (see FIG. 8) or different geographical locations, consumer activity associated with each such marketing program is collected in a report for analysis by the developer 114. As a result, text insertion box 2209 below field "REPORTING NAME" is provided for entering the report name corresponding to message 120.

In FIG. 23, an exemplary screen 2300 is shown for inserting a coupon into a message 120. As will be understood and appreciated, screen 2300 is accessible by a marketer or developer 114 by selecting or clicking on a coupon icon in region 2202 in screenview 2300. In this screen, region 2202 reveals that the icon showing a coupon icon has been highlighted, indicating that the application media selected is a coupon. As shown, region 2303 below a "COUPON" field lists pre-stored coupon files available in database 104 for selection by a marketer 114. In this exemplary screenview, the number four (4) next to the "COUPON" field indicates that there are four (4) pre-stored coupon files available for developers 114 of Acme Coffee in the SRM database 104. As will be understood, these pre-stored coupon files may have been created previously by the marketer or by a system administrator etc. In this example screen 2300, a pre-stored coupon file 2311 (named "TESTCOUP") is shown as having been selected by a marketer 114 that has a potential expiration date of Sep. 28, 2010.

Preview region 2309 shows the specifics (logos, text, disclaimers, etc.) of the selected coupon 2311.

To enable collection of consumer information, and to allow consumers 116 to participate in email marketing campaigns and other consumer-specific campaigns, text box 2311 ("ENTER EMAIL ADDRESS") inside the region 2309 is provided for consumers 116 to type their email address and press a "SUBMIT" button. When the "SUBMIT" button is pressed by a consumer 116 viewing the coupon in a social media profile page or account (see FIG. 28 for illustration), the information entered by the consumer 116 is stored in database 104. As mentioned previously, this information is collected by marketers for future marketing purposes, or to assess and improve the effectiveness of their marketing programs, or the like. As will be understood and appreciated, other information such as opinions, preferences, may additionally be requested and collected.

Still referring to FIG. 23, instead of inserting a pre-stored coupon in database 104 (and displayed in region 2303), if developer 114 wishes to add a new coupon, button 2307 ("ADD NEW COUPON") is provided to enable such functionality. Although not shown here, clicking on button 2307 causes SRM system 101 to display a screen for coupon creation. The process for creating a custom coupon is very similar to creating a custom poll, which is illustrated in FIGS. 25A, 25B, 25C. The process of creating a custom coupon (an example of application media) offered by a marketer for insertion in a marketing message, are illustrated in detail with a flowchart in FIG. 19 (represented herein by FIGS. 19A, 19B).

FIG. 24 illustrates an exemplary screen 2400 for inserting a poll into a message 120. As will be understood and appreciated, screen 2400 is accessible by a marketer or developer 114 by selecting or clicking on a poll icon in region 2202 in screenview 2400. As shown, region 2403 lists pre-stored poll files available in database 104 for selection by a marketer 114. As will be understood, these pre-stored poll files may have been created previously by the marketer or by a system administrator etc. In this example screen 2400, a pre-stored poll file 2411 "MORELLI_POLL (08/23/2010)" is shown as having been selected by a marketer 114. The date "08/23/2010" next to the poll file name is a fictitious date indicating the date when this poll was created. In this exemplary screenview, the number two (2) is reported next to the "POLL" field to indicate that there are two (2) pre-stored poll files available for developers 114 of Acme Coffee in the SRM database 104. A preview of poll file 2411 asking for consumers' preferred ice-cream flavors, is shown in region 2409, adjacent to a "VOTE" button (to be pressed by a consumer 116 participating in the poll). As will be understood, preview region 2409 may additionally contain graphics, logos, text, disclaimers, etc. of a selected poll file. As described in greater detail below, when a consumer views a displayed poll (via a social media system profile page or account), selects an answer and clicks the "VOTE" button, the results of the poll are displayed to the member (see FIGS. 26, 27). Further, this information is collected by marketers for future marketing purposes, or to assess and improve the effectiveness of their marketing programs, or the like. As will be understood and appreciated, other information such as opinions, preferences, may additionally be requested and collected. In many circumstances, a marketer wishes to creates a custom poll for insertion in a message. To enable such a functionality, button 2407 ("ADD NEW POLL") is provided. Clicking on button 2407 causes the SRM system 101 to display the poll creation screens (see FIGS. 25A, 25B, 25C).

FIG. 25 illustrates an exemplary screen that enables creation of a new poll. In a first step in poll creation, depicted in screenview 2500A (shown in FIG. 25A), the system 101 asks a developer 114 to associate an image with the poll. This image is a "starter image" or other such indicator that enables a SMS member or consumer to launch application media that is included in a marketing message. A developer 114 has the choice of uploading an image from his or her computer/smartphone by pressing button 2503 ("UPLOAD IMAGE"), or, choosing tab button 2505 ("WEB IMAGE") for attaching an image available in the worldwide web. If the image that the developer wishes to attach to the poll already exists in SRM database 104, the developer can press button 2507 ("EDIT/COPY EXISTING") to choose such an image for copying and editing purposes. After the image has been chosen, the image appears (not shown here) as an icon in the background of a "PLAY" button 2501. Once an image has been selected, then the marketer performs a second step in the poll creation process (e.g. by clicking button 2509).

In a second step of the poll creation process shown in exemplary screenview 2500B (shown in FIG. 25B), a developer 114 can configure the poll that is inserted into a marketing message. In the example shown, the screen view 2500 displays a first tab—a "QUESTION & ANSWERS" tab 2522 within an embodiment of the present system. A second "START VIEW" tab 2521 allows a developer 114 to view the manner in which this interactive poll will be initially displayed to consumers 116. Developers 114 are able to customize the poll with various visual aesthetics, such as different fonts, colors, layout styles, background logos, displays of total vote count etc. "RESULTS VIEW" tab 2523 further allows developers 114 to customize the visual aesthetics associated with the results of this interactive poll, as would be visible to a consumer 116, after the consumer has participated in the poll. As will be understood and appreciated, such customization for visual aesthetics in connection with a poll is optional within embodiments of the present system.

Still referring to FIG. 25B, a text box 2511 enables a developer 114 to type a question related to the poll. In screenview 2500B, the exemplary poll question asked is related to the consumer's favorite ice-cream flavor. In region 2517, a developer 114 enters the possible choices for the answers to the question of this poll. In this example screenview, five (5) different flavors of ice-cream are listed for the consumer 116 to choose from. As will be understood and appreciated, developer 114 can add more flavors to this list by pressing the "+" icon, and edit the names of the flavors or remove them selectively by clicking the "x" icon next to each flavor. The region below text box 2511 enables further customization of this poll. Region 2513 is for indicating whether the poll will expire by a certain date. Developer 114 may choose to keep the poll in a dynamic state which means it can be reused by franchises and other subsidiaries, who may further customize it based on their requirements. This exemplary system aspect enables greater flexibility for marketers in terms of customizing their marketing programs to suit a particular time of the year, consumer demographic, geographical location, and other such factors. "BACK" button 2515 enables the developer 114 to be able to go back to the previous screen view 2500A. Clicking on button 2519 displays screenview 2500C to preview and save the poll. As will be understood and appreciated, information selected by a marketer through screenview 2500B (or similar screens) is associated with a poll file and stored in the SRM database 104 for insertion into a marketing message on consumers' social media system pages or accounts. As will be further understood, the information entry and customization fields shown in FIG. 25B are provided for exemplary purposes only, and are not intended to limit the scope of the present disclosure in any way.

FIG. 25C illustrates an exemplary screenview 2500C where developer 114 can preview the created poll inside region 2531, name such poll in text box 2535, and save the poll file in database 104 by clicking on "SAVE YOUR POLL" button 2533. In this exemplary screenview, a fictitious name "MORELLI_POLL" is chosen for the created poll file. Once a poll is created and saved by a marketer in SRM database 104, the marketer is able to insert that poll into a marketing message 120 for subsequent publication on the social media system profile page or account of consumers (see FIG. 26, FIG. 27 for details). As will be understood, this poll can also be reused for another marketing program (see FIG. 24).

As described previously, after a poll, video, interactive coupon, or other application media has been created and/or selected for insertion into a marketing message, a marketer or developer can publish that message (along with associated content) to one or more social media systems. The steps involved in insertion of an application media (e.g. poll, coupon, games etc.), in a marketing message, are illustrated in detail with a flowchart in FIG. 19 (represented herein by FIGS. 19A, 19B). Consumers or members of social media systems are also able to selectively choose their social media system friends with whom they would like to share these messages.

An exemplary screenshot 2600 of a consumer's social media profile page displaying an exemplary marketing poll attached with a message 120 is shown in FIG. 26. In this example and as previously recited, hypothetical company Acme Coffee is promoting a local band, "The John Benjamin Band" by displaying a poll on the band's social media profile page (e.g. the band's "Wall" page of a hypothetical social media system "Eyetext" Wall). The screenshot displays customary social media system fields, links to other pages, logos, etc. There are also additional tabs—"INFO" tab provides information about the band, "REVIEWS" tab displays reviews that have been posted by members who subscribe to this band's channel on the social media system. Eyetext. Members can also participate in discussions concerning a topic by clicking on the "DISCUSSIONS" and posting material. As shown, a marketing poll is displayed. As referred to previously, a marketing poll constitutes a type of application media, and thus members are able to block this application by clicking the "BLOCK APP" button. Additionally, members are also able to suggest this application to their social media friends or even add this application to their personal profile pages. If a member likes the postings associated with the band's profile page, they can choose to indicate that by clicking on the "LIKE" button.

As shown in FIG. 26, the poll displayed in region 2601 corresponds to the poll created previously as shown in FIG. 25. As will be understood and appreciated, this poll may be published not only on the friends and fans of this band who subscribe to this page (e.g. followers or members of the group or channel associated with this band), but also on the marketer's social media profile page, including pages of consumers or organizations that are affiliated with the marketer (e.g. that subscribe to the marketer's channel). Members who view this published poll will be able to vote in this poll by clicking on the button 2603. The computer-implemented process involved in displaying application media to SMS members within a respective SMS page, profile, or account, are illustrated with a detailed flowchart in FIG. 32.

Another exemplary screenview 2700 of a poll is shown in FIG. 27. As described previously, the screenshot displays customary social media system fields, links to other pages, logos, etc. After a member presses the "VOTE" button 2603 in screenview 2600, region 2601 modifies into region 2701 of screenview 2700. As can be understood, the poll displayed in region 2701 corresponds to the poll created previously as shown in FIG. 25. Inside region 2701, the choice of a consumer 116 is highlighted and, a text box 2703 appears wherein the consumer 116 can type his or her email address. As will be understood and appreciated, other information such as opinions, preferences, may additionally be requested and collected. A "SUBMIT" button 2705 is placed adjacent to text box 2703 that upon clicking causes the social media system to transmit the email address (or other consumer-entered information) that gets stored in an embodiment of the present SRM database 104 for collection of consumer statistics. It will be understood and appreciated that consumers 116 can participate in this poll interactively, without requiring them to leave their profile page on the social media system 101. Friends and fans (e.g. other social media system members connected to a given member) of the member will be able to view this interaction as well. If a member doesn't participate in a marketing poll, the screenview displays the poll, but, no action is taken.

Referring to FIG. 28 an exemplary screenshot 2800 is illustrated with a coupon offered by the marketer 114 attached to a message 120 and displayed on a social media profile screen of a consumer 116. As can be understood, the coupon displayed in region 2801 corresponds to the coupon created previously (for insertion in a marketing message 120) as shown in FIG. 23. As described previously, the coupon appears inside region 2801 possibly accompanied by logos, background images, disclaimers, etc. Additionally, there is a text box 2805 for the consumer 116 to receive direct marketing offers in his or email inbox, alongside a "SUBMIT" button 2803 which he clicks to provide his email to the marketer 114. The computer-implemented steps involved in displaying application media to SMS members within a respective SMS page, profile, or account, are illustrated with a detailed flowchart in FIG. 32.

FIG. 29 depicts yet another screenview 2900 of a consumer's social media profile page, with an attached video to a message 120 and shown inside the region 2901 of the screen 2900. As can be understood, the video displayed in region 2901 corresponds to the video created previously as shown in FIG. 22 for insertion in a marketing message 120.

Referring now to FIG. 30, another embodiment of a developer's or marketer's summary screen 3000 is shown. This screen summarizes the statistics collected from consumers' activities after they have interacted with a message published by developer 114. As can be seen in region 3021, status of the posts along with consumer activities associated with the published posts or messages 120 are displayed. An exemplary published post having a report name "TEST_1_TDG" is highlighted in region 3021. Although not shown here explicitly, this exemplary report "TEST_1_TDG" was generated as a result of interaction of members of a social media system with a message that contained a video. Because no actions were taken by a member of a social media system when this video was viewed, number of actions (indicated by button 3015 "ACTIONS") taken are shown as zero (0). Similarly, number of entries made by consumers to this post as indicated by button 3017 ("ENTRIES") are displayed as one (1). Further, because the given post involved viewing a video, number of times the given video was viewed/played (indicated by button 3019 "PLAYS") is shown to be three (3). A developer 114 has the option to review the consumer statistics as a text or graphically or via some other statistical data visualization tool. In screenview 3000, an "ANALYZE" tab 3003 (also shown previously inside region 2114 in FIG. 21B) is selected that causes the results to be displayed graphically inside region 3009. Statistics collected from consumers' interactions with a post are viewable over a time period (e.g. weekly, daily, hourly, yearly, etc.). Settings for adjusting the viewing time range are provided by the buttons 3013 and 3011. Although not shown here, a "REVIEW" tab 3001, located adjacent to an "ANALYZE" tab 3003 displays a textual summary of the given report, including the name of the report, the name of the marketing program 118 where it will be published, and the contents of the message 120. As can be understood and appreciated, various other consumer statistics can be collected and combined for display in various reports, formats or screens. The description of the embodiments discussed is presented for illustration purposes only, and is not intended to limit the disclosure presented herein.

In many circumstances, a marketer wishes to obtain a document that details consumer statistics (collected from members' or consumers' interactions with a marketing message on a social media system), and that also enables saving in a computer or smartphone device, and further sharing with other persons as a printed document or electronically. Such an exemplary report 3100 is shown in FIG. 31, generated from the interactions of a fictitious consumer (John Doe) to a poll created by the marketer 114, enquiring the consumer's preferred ice-cream as shown previously in FIGS. 24, 25. Report 3100 can be downloaded as a Microsoft Word® or Microsoft Excel® document (or other document formats) by the developer 114 by clicking a button 3005 ("ENTRY DATA") in screenview 3000. Clicking button 3007 also produces report 3100 in addition to details of the actions taken by a consumer 116. Report 3100 contains an exemplary response of the consumer in column 3101, consumer's email address in column 3103, time when he responded in column 3105, and also an IP address of the device where this response was collected from, in column 3107 (shown blank in report 3100). As will be understood and appreciated, the reports shown are exemplary and are not intended to limit the types of data that can be tracked for collection of consumer statistics. In addition, various kinds of reports showing different statistics can be created.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the systems and their practical application to enable others skilled in the art to utilize the systems and various embodiments and with various modifications as are suited to the particular use contemplated. Alternative embodiments will become apparent to those skilled in the art to which the present disclosure pertains without departing from their spirit and scope. Accordingly, the scope of the present inventions is defined by the appended claims rather than the foregoing description and the exemplary embodiments described therein.

What is claimed is:

1. A method comprising:
receiving, by a management system for managing interactions with a plurality of social media systems, a message comprising media content to publish on a social media system selected from the plurality of social media systems,
wherein each of the plurality of social media systems has one or more associated message rules,
wherein the management system is configured to manage interactions with each of the plurality of social media systems according to the one or more associated message rules;
retrieving, by the management system, one or more message rules adopted by the social media system;
assessing, by the management system, the media content according to the one or more message rules adopted by the social media system;
based upon the assessing, determining that the media content is not supported by the social media system, wherein the media content is supported by at least one of the plurality of social media systems with which the management system manages interactions;
generating, by the management system, based upon determining that the media content is not supported by the social media system, a new web page comprising the media content;
modifying the message, by the management system, by replacing the media content with a uniform resource locator (URL) of the new web page comprising the media content, to obtain a formatted message;
transmitting the formatted message to the social media system for display to a social media system member; and
receiving, by the management system, a response from the social media system corresponding to an interaction by the social media system member with the formatted message to select the URL, wherein selection of the URL results in display of the media content on the new web page.

2. The method of claim 1, wherein the formatted message comprises a metadata file including instructions to retrieve the media content.

3. The method of claim 1, further comprising: filtering the response from the social media system corresponding to the interaction by the social media system member with the formatted message.

4. The method of claim 3, wherein filtering the response from the social media system comprises one or more of: flagging the response, removing content from the response, and removing the response.

5. The method of claim 1, wherein the formatted message comprises a starter image, wherein the interaction by the social media system member with the formatted message comprises interaction with the starter image.

6. The method of claim 1,
wherein to manage interactions with each of the plurality of social media systems according to the one or more associated message rules, the management system maintains a relational database comprising a plurality of linked database tables, wherein at least one database table selected from the plurality of linked database tables comprises a first column identifying the plurality of social media systems, a second column identifying the one or more associated message rules, and a plurality of rows associating the first column and the second column for each of the plurality of social media systems.

7. The method of claim 1, further comprising:
receiving, by the management system, a request from a marketer to generate the media content via an Internet-accessible portal operatively coupled to the management system; and
generating, by management system, the media content responsive to receiving the request.

8. The method of claim 1, wherein modifying the message to obtain the formatted message is performed in compliance with a protocol defined by an application programming interface (API) of the social media system.

9. The method of claim 1, wherein the response from the social media system comprises one or more of: information corresponding to application media views, information corresponding to application media clicks, information corresponding to URL clicks, information corresponding to comment posts, social media system member contact information, and social media system specific responses.

10. The method of claim 1, further comprising:
generating, by the management system, the message comprising the media content, wherein generating the message comprises:
retrieving an application media file corresponding to the media content, and
retrieving an application configuration file comprising application media preferences, corresponding to a unique instance of the application media file.

11. The method of claim 10, wherein the application configuration file comprises one or more of: extensible markup language (XML) file and hypertext markup language (HTML).

12. The method of claim 10, wherein the application media file comprises a Shockwave/Flash (SWF) file.

13. The method of claim 10, wherein generating the message further comprises:
retrieving an application module file comprising instructions for enabling display of the media content; and
applying the application configuration file to the application module file.

14. The method of claim 13, wherein the instructions of the application module file for enabling display of the media content correspond to a specific application media type.

15. The method of claim 13, wherein the application module file comprises a Shockwave/Flash (SWF) file.

16. A non-transitory computer-readable storage medium comprising instructions which, when executed by one or more hardware processors, cause performance of operations comprising:
receiving, by a management system for managing interactions with a plurality of social media systems, a message comprising media content to publish on a social media system selected from the plurality of social media systems,
wherein each of the plurality of social media systems has one or more associated message rules,
wherein the management system is configured to manage interactions with each of the plurality of social media systems according to one or more associated message rules;
retrieving, by the management system, one or more message rules adopted by the social media system,
assessing, by the management system, the media content according to the one or more message rules adopted by the social media system;
based upon the assessing, determining that the media content is not supported by the social media system, wherein the media content is supported by at least one of the plurality of social media system with which the management system manages interactions;
generating, by the management system, based upon determining that the media content is not supported by the social media system, a new web page comprising the media content;
modifying the message, by the management system, by replacing the media content with a uniform resource locator (URL) of the new web page comprising the media content, to obtain a formatted message;
transmitting the formatted message to the social media system for display to a social media system member; and
receiving, by the management system, a response from the social media system corresponding to an interaction by the social media system member with the formatted message to select the URL, wherein selection of the URL results in display of the media content on the new web page.

17. The medium of claim 16, wherein the operations further comprise:
generating, by the management system, the message comprising the media content, wherein
generating the message comprises:
retrieving an application media file corresponding to the media content, and;
retrieving an application configuration file comprising application media preferences, corresponding to a unique instance of the application media file.

18. The medium of claim 17, wherein the application configuration file comprises one or more of: application media type, application media format, application media specifics, expiration date, graphics, audio information, SMS member capabilities, and information retrieval fields.

19. The medium of claim 17, wherein the application configuration file comprises one or more of: extensible markup language (XML) and hypertext markup language (HTML).

20. The medium of claim 17, wherein the operations further comprise storing the application configuration file in a database maintained by the management system, for subsequent use by the management system.

21. The medium of claim 16,
wherein to manage interactions with each of the plurality of social media systems according to the one or more associated message rules, the management system maintains a relational database comprising a plurality of linked database tables, wherein at least one database table selected from the plurality of linked database tables comprises a first column identifying the plurality of social media systems, a second column identifying the one or more associated message rules, and a plurality of rows associating the first column and the second column for each of the plurality of social media systems.

22. The medium of claim 16, wherein the media content comprises pre-stored application media retrieved from a database maintained by the management system.

23. The medium of claim 16, wherein the message comprising media content comprises one or more of:
    (a) a social media system identifier associated with the social media system,
    (b) date information corresponding to one or more display dates for publishing the message on the social media system,
    (c) a message identifier,
    (d) time information corresponding to a specific time for publishing the message on the social media system,
    (e) a developer identifier corresponding to a specific developer that generated the media content, and
    (f) a schedule for repeat displays of the message information.

24. The medium of claim 16, wherein the message comprises a metadata file including instructions to retrieve the media content.

25. The medium of claim 16, wherein modifying the message to obtain the formatted message is performed in compliance with a protocol defined by an application programming interface (API) of the social media system.

26. A system comprising:
a management system for managing interactions with a plurality of social media systems,
    wherein each of the plurality of social media systems has one or more associated message rules,
    wherein the management system is configured to manage interactions with each of the plurality of social media systems according to the one or more associated message rules; and
a database maintained by the management system for storing management system content,
wherein the management system is configured to execute instructions causing performance of operations comprising:
receiving a message comprising media content to publish on a social media system selected from the plurality of social media systems,
retrieving one or more message rules adopted by the social media system, assessing the media content according to the one or more message rules adopted by the social media system,
based upon the assessing, determining that the media content is not supported by the social media system, wherein the media content is supported by at least one of the plurality of social media systems with which the management system manages interactions,
generating, based upon determining that the media content is not supported by the social media system, a new web page comprising the media content,
modifying the message by replacing the media content with a uniform resource locator (URL) of the new web page comprising the media content, to obtain a formatted message,
transmitting the formatted message to the social media system for display to a social media system member, and
receiving a response from the social media system corresponding to an interaction by the social media system member with the formatted message to select the URL, wherein selection of the URL results in display of the media content on the new web page.

27. The system of claim 26,
wherein the database is a relational database comprising a plurality of linked database tables wherein at least one database table selected from the plurality of linked database tables comprises a first column identifying the plurality of social media systems, a second column identifying the one or more associated message rules, and a plurality of rows associating the first column and the second column for each of the plurality of social media systems.

* * * * *